US 8,775,526 B2

(12) United States Patent
Lorch et al.

(10) Patent No.: US 8,775,526 B2
(45) Date of Patent: Jul. 8, 2014

(54) ICONIC COMMUNICATION

(75) Inventors: Yoav Lorch, Ramat-HaSharon (IL);
Ehud Spiegel, Petach-Tikva (IL); Amir Yagil, Tel-Aviv (IL); Andrew Weinstein, Efrat (IL)

(73) Assignee: Zlango Ltd., Tel-Aviv (IL)

( * ) Notice: Subject to any disclaimer, the term of this patent is extended or adjusted under 35 U.S.C. 154(b) by 116 days.

(21) Appl. No.: 12/087,782

(22) PCT Filed: Jan. 16, 2007

(86) PCT No.: PCT/IB2007/050143
§ 371 (c)(1),
(2), (4) Date: Jul. 15, 2008

(87) PCT Pub. No.: WO2007/080559
PCT Pub. Date: Jul. 19, 2007

(65) Prior Publication Data
US 2010/0179991 A1    Jul. 15, 2010

Related U.S. Application Data

(63) Continuation-in-part of application No. PCT/IL2006/000061, filed on Jan. 16, 2006, and a continuation of application No. PCT/IL2006/000062, filed on Jan. 16, 2006.

(60) Provisional application No. 60/807,855, filed on Jul. 20, 2006, provisional application No. 60/807,863, filed on Jul. 20, 2006.

(30) Foreign Application Priority Data

Jan. 16, 2006   (IL) .......................................... 173169

(51) Int. Cl.
*G06F 3/048*         (2013.01)

(52) U.S. Cl.
USPC ........... 709/206; 709/204; 715/752; 715/753; 715/763; 455/556.1

(58) Field of Classification Search
USPC .................. 709/204–206; 715/763, 752, 753; 455/556.1
See application file for complete search history.

(56) References Cited

U.S. PATENT DOCUMENTS 3,100,434 A   8/1963   Bunn
3,218,175 A   11/1965  Siegel et al.
(Continued)

FOREIGN PATENT DOCUMENTS

CH   456885     5/1968
DE   3412445    10/1985
(Continued)

OTHER PUBLICATIONS

Communication Pursuant to Article 94(3) EPC Dated Jan. 14, 2008 From the European Patent Office Re.: Application No. 05703094.2.
(Continued)

*Primary Examiner* — Saleh Najjar
*Assistant Examiner* — Joseph Pan

(57) ABSTRACT

A method of controlling an external display using a personal communication device, comprising:
  providing an external display;
  processing an iconic message on a personal communication device to generate at least one instruction for said display;
  transmitting said at least one instruction from said personal communication device to said external display responsive to said processing; and
  displaying on external display in response to said at least one instruction.

32 Claims, 22 Drawing Sheets

(56) References Cited

U.S. PATENT DOCUMENTS

| | | |
|---|---|---|
| 3,352,460 A | 11/1967 | Herring |
| 3,634,107 A | 1/1972 | Cornelius |
| 3,791,932 A | 2/1974 | Schuurs et al. |
| 3,839,153 A | 10/1974 | Schuurs et al. |
| 3,850,578 A | 11/1974 | McConnell |
| 3,850,752 A | 11/1974 | Schuurs et al. |
| 3,853,987 A | 12/1974 | Dreyer |
| 3,867,517 A | 2/1975 | Ling |
| 3,879,262 A | 4/1975 | Schuurs et al. |
| 3,901,654 A | 8/1975 | Gross |
| 3,935,074 A | 1/1976 | Rubenstein et al. |
| 3,984,533 A | 10/1976 | Uzgiris |
| 3,996,345 A | 12/1976 | Ullman et al. |
| 4,034,074 A | 7/1977 | Miles |
| 4,098,876 A | 7/1978 | Piasio et al. |
| 4,626,540 A | 12/1986 | Capps et al. |
| 4,651,862 A | 3/1987 | Greenfield |
| 4,666,828 A | 5/1987 | Gusella |
| 4,683,202 A | 7/1987 | Mullis |
| 4,753,370 A | 6/1988 | Rudick |
| 4,801,531 A | 1/1989 | Frossard |
| 4,873,316 A | 10/1989 | Meade et al. |
| 4,879,219 A | 11/1989 | Wands et al. |
| 4,970,233 A | 11/1990 | McHugh |
| 4,993,593 A | 2/1991 | Fabiano |
| 5,011,771 A | 4/1991 | Bellet et al. |
| 5,192,659 A | 3/1993 | Simons |
| 5,260,795 A | 11/1993 | Sakai et al. |
| 5,272,057 A | 12/1993 | Smulson et al. |
| 5,281,521 A | 1/1994 | Trojanowski et al. |
| 5,319,386 A | 6/1994 | Gunn et al. |
| 5,367,626 A | 11/1994 | Morioka et al. |
| 5,445,287 A | 8/1995 | Center et al. |
| 5,498,757 A | 3/1996 | Johnson et al. |
| 5,556,744 A | 9/1996 | Weiner et al. |
| 5,570,816 A | 11/1996 | LaBarbera, Jr. |
| 5,584,070 A | 12/1996 | Harris et al. |
| 5,659,041 A | 8/1997 | Pollak et al. |
| 5,666,159 A | 9/1997 | Parulski et al. |
| 5,688,561 A | 11/1997 | Ichikawa et al. |
| 5,729,289 A | 3/1998 | Etoh |
| 5,778,189 A | 7/1998 | Kimura et al. |
| 5,797,313 A | 8/1998 | Rothley |
| 5,808,276 A | 9/1998 | Padilla |
| 5,817,231 A | 10/1998 | Souza |
| 5,858,437 A | 1/1999 | Anson |
| 5,880,731 A | 3/1999 | Liles et al. |
| 5,975,365 A | 11/1999 | Hsieh |
| 5,991,807 A | 11/1999 | Schmidt et al. |
| 5,999,541 A | 12/1999 | Hinchey et al. |
| 6,022,222 A | 2/2000 | Guinan |
| 6,044,248 A | 3/2000 | Mochizuki et al. |
| 6,104,430 A | 8/2000 | Fukuoka |
| 6,118,933 A | 9/2000 | Roberson |
| 6,121,965 A | 9/2000 | Kenney et al. |
| 6,148,717 A | 11/2000 | Lassota |
| 6,166,734 A | 12/2000 | Nahi et al. |
| 6,167,441 A | 12/2000 | Himmel |
| 6,173,117 B1 | 1/2001 | Clubb |
| 6,188,431 B1 | 2/2001 | Oie |
| 6,370,119 B1 | 4/2002 | Basso et al. |
| 6,397,089 B1 | 5/2002 | Kabe |
| 6,400,729 B1 | 6/2002 | Shimadoi et al. |
| 6,434,564 B2 | 8/2002 | Ebert |
| 6,456,841 B1* | 9/2002 | Tomimori ............ 455/412.2 |
| 6,477,274 B1* | 11/2002 | Kim et al. ............ 382/187 |
| 6,654,725 B1 | 11/2003 | Langheinrich et al. |
| 6,785,730 B1 | 8/2004 | Taylor |
| 6,810,149 B1 | 10/2004 | Squilla et al. |
| 6,961,567 B1 | 11/2005 | Kuhn |
| 6,963,762 B2* | 11/2005 | Kaaresoja et al. ......... 455/567 |
| 6,987,991 B2* | 1/2006 | Nelson ................ 455/566 |
| 6,990,452 B1* | 1/2006 | Ostermann et al. ......... 704/260 |
| 6,996,370 B2 | 2/2006 | De Loye et al. |
| 7,035,387 B2 | 4/2006 | Russell et al. |
| 7,035,803 B1* | 4/2006 | Ostermann et al. ......... 704/260 |
| 7,043,530 B2* | 5/2006 | Isaacs et al. ........... 709/206 |
| 7,052,396 B2 | 5/2006 | Comair |
| 7,081,905 B1* | 7/2006 | Raghunath ............ 345/684 |
| 7,113,803 B2 | 9/2006 | Dehlin |
| 7,315,613 B2* | 1/2008 | Kleindienst et al. ....... 379/88.13 |
| 7,412,044 B2 | 8/2008 | Chavez et al. |
| 7,474,899 B1 | 1/2009 | Balasubramaniam |
| 7,503,009 B2 | 3/2009 | Peters |
| 7,505,762 B2 | 3/2009 | Onyon et al. |
| 7,515,936 B2 | 4/2009 | Feller |
| 7,548,849 B2 | 6/2009 | Fux et al. |
| 7,565,404 B2* | 7/2009 | Gwozdz ............... 709/206 |
| 7,571,213 B2* | 8/2009 | Walkush et al. ........... 709/206 |
| 7,624,149 B2* | 11/2009 | Sheppard et al. .......... 709/206 |
| 7,647,560 B2 | 1/2010 | Macauley et al. |
| 7,669,135 B2* | 2/2010 | Cunningham et al. ....... 715/758 |
| 7,792,981 B2 | 9/2010 | Taylor |
| 7,835,729 B2* | 11/2010 | Hyon ................. 455/418 |
| 7,844,228 B2 | 11/2010 | Kitakado |
| 2001/0049283 A1 | 12/2001 | Thomas |
| 2001/0050914 A1 | 12/2001 | Akahane et al. |
| 2002/0001295 A1 | 1/2002 | Park |
| 2002/0032582 A1 | 3/2002 | Feeney, Jr. et al. |
| 2002/0065088 A1 | 5/2002 | Seignol et al. |
| 2002/0111177 A1* | 8/2002 | Castres et al. ........... 455/466 |
| 2002/0152896 A1 | 10/2002 | Young et al. |
| 2002/0163538 A1* | 11/2002 | Shteyn ............... 345/752 |
| 2003/0017825 A1* | 1/2003 | De Loye et al. .......... 455/418 |
| 2003/0025802 A1 | 2/2003 | Mayer, Jr. et al. |
| 2003/0045355 A1 | 3/2003 | Comair |
| 2003/0084121 A1 | 5/2003 | De Boor et al. |
| 2003/0130484 A1 | 7/2003 | Gordon et al. |
| 2003/0174242 A1 | 9/2003 | Carmi et al. |
| 2003/0225155 A1 | 12/2003 | Fernandez-Pol et al. |
| 2004/0015547 A1 | 1/2004 | Griffin et al. |
| 2004/0052928 A1 | 3/2004 | Gazit |
| 2004/0192312 A1 | 9/2004 | Li et al. |
| 2005/0020809 A1 | 1/2005 | Gazit |
| 2005/0071364 A1 | 3/2005 | Xie et al. |
| 2005/0101338 A1 | 5/2005 | Kraft |
| 2005/0116956 A1* | 6/2005 | Beardow ............... 345/473 |
| 2005/0150393 A1 | 7/2005 | Biderman et al. |
| 2005/0176454 A1 | 8/2005 | Chakraborty et al. |
| 2005/0192078 A1 | 9/2005 | Jawaharlal |
| 2006/0015560 A1 | 1/2006 | MacAuley et al. |
| 2006/0025220 A1 | 2/2006 | Macauley et al. |
| 2006/0094453 A1* | 5/2006 | Rhyu ................. 455/466 |
| 2006/0150821 A1 | 7/2006 | Paul et al. |
| 2006/0157463 A1 | 7/2006 | Wiele et al. |
| 2006/0234947 A1 | 10/2006 | Gazit |
| 2006/0278093 A1 | 12/2006 | Biderman et al. |
| 2006/0282503 A1 | 12/2006 | Gwozdz |
| 2007/0021345 A1 | 1/2007 | Gazit |
| 2007/0135334 A1 | 6/2007 | Gazit |
| 2007/0138007 A1 | 6/2007 | Yemini et al. |
| 2008/0082678 A1 | 4/2008 | Lorch et al. |
| 2008/0216022 A1 | 9/2008 | Lorch |
| 2009/0013087 A1 | 1/2009 | Lorch et al. |
| 2009/0156471 A1 | 6/2009 | Gazit et al. |
| 2010/0240350 A1 | 9/2010 | Ilkanaev et al. |
| 2011/0004694 A1 | 1/2011 | Taylor |
| 2013/0254678 A1 | 9/2013 | Lorch et al. |
| 2014/0094155 A1 | 4/2014 | Ilkanaev et al. |

FOREIGN PATENT DOCUMENTS

| | | |
|---|---|---|
| DE | 3511159 | 10/1986 |
| DE | 10043282 | 3/2002 |
| DE | 10321094 | 11/2004 |
| EP | 0081122 | 6/1983 |
| EP | 0264166 | 4/1988 |
| EP | 629947 | 12/1994 |
| EP | 0650125 | 4/1995 |
| EP | 0472361 | 4/1996 |
| EP | 0771096 | 5/1997 |
| EP | 0869464 | 10/1998 |
| EP | 0885904 | 12/1998 |
| EP | 0975132 | 1/2000 |

(56) References Cited

FOREIGN PATENT DOCUMENTS

| | | |
|---|---|---|
| EP | 1215867 | 6/2002 |
| GB | 2019813 | 11/1979 |
| GB | 2289555 | 11/1995 |
| GB | 2405602 | 3/2005 |
| JP | 59-044313 | 3/1984 |
| JP | 02-295923 | 12/1990 |
| JP | 2000-193661 | 7/2000 |
| JP | 2001-504334 | 4/2001 |
| WO | WO 2005/081552 | 9/2005 |
| WO | WO 2005096217 A1 * | 10/2005 |
| WO | WO 2006/075334 | 7/2006 |
| WO | WO 2006/075335 | 7/2006 |
| WO | WO 2007/080557 | 7/2007 |
| WO | WO 2007/080558 | 7/2007 |
| WO | WO 2007/080559 | 7/2007 |

OTHER PUBLICATIONS

Communication Pursuant to Article 94(3) EPC Dated Apr. 21, 2009 From the European Patent Office Re.: Application No. 05703094.2.
Communication Pursuant to Article 94(3) EPC Dated Nov. 26, 2008 From the European Patent Office Re.: Applciation No. 05703094.2.
Communication Pursuant to Article 94(3) EPC Dated Jun. 30, 2008 From the European Patent Office Re.: Application No. 05703094.2.
Examination Report Dated Jan. 8, 2008 From the Government of India, Patent Office Re.: Application No. 1671/CHENP/2004.
Examination Report Dated Jun. 19, 2007 of the Government of India, Patent Office Re.: Application No. 1671/CHENP/2004.
Examiner's Report Dated Feb. 17, 2009 From the Australian Government, IP Australia Re.: Application No. 2004203461.
Examiner's Report Dated Feb. 22, 2008 From the Australian Government, IP Australia Re.: Application No. 2004203461.
Examiner's Report Dated Jun. 22, 2009 From the Australian Government, IP Australia Re.: Application No. 2004203461.
International Search Report Dated Mar. 5, 2009 From the International Searching Authority Re.: Application No. PCT/IB07/50143.
International Preliminary Report on Patentability Dated Apr. 9, 2009 From the International Bureau of WIPO Re.: Application No. PCT/IL2007/000982.
International Preliminary Report on Patentability Dated Jan. 22, 2009 From the International Bureau of WIPO Re.: Application No. PCT/IL2004/000577.
International Preliminary Report on Patentability Dated Jan. 25, 2007 From the International Bureau of WIPO Re.: Application No. PCT/IL2005/000754.
International Preliminary Report on Patentability Dated Jul. 27, 2006 From the International Bureau of WIPO Re.: Application No. PCT/IL2005/000051.
International Search Report and the Written Opinion Dated Jul. 3, 2007 From the International Searching Authority Re.: Application No. PCT/IB2007/050141.
International Search Report and the Written Opinion Dated Oct. 5, 2005 From the International Searching Authority Re.: Application No. PCT/IL05/00051.
International Search Report and the Written Opinion Dated Aug. 7, 2008 From the International Searching Authority Re: Application No. PCT/IB07/50143.
International Search Report and the Written Opinion Dated Jun. 13, 2008 From the International Searching Authority Re.: Application No. PCT/IL07/00982.
International Search Report and the Written Opinion Dated Aug. 15, 2008 From the International Searching Authority Re.: Application No. PCT/IB07/50142.
International Search Report and the Written Opinion Dated Jun. 26, 2007 From the International Searching Authority Re.: Application No. PCT/IL06/00061.
International Search Report Dated Jul. 19, 2004 From the International Searching Authority Re.: Application No. PCT/IL03/01045.
Notice of Allowance Dated Apr. 21, 2009 From the US Patent and Trademark Office Re.: U.S. Appl. No. 10/755,289.
Office Action Dated Feb. 1, 2009 From the Israeli Patent Office Re.: Application No. 163285 and Its Translation Into English.
Office Action Dated Jun. 4, 2008 From the Israeli Patent Office Re.: Application No. 163285.
Office Action Dated Nov. 5, 2009 From the Israel Patent Office Re. Application No. 172788 and Its Translation Into English.
Office Action Dated Jan. 8, 2009 From the Israeli Patent Office Re.: Application No. 172788 and Its Translation Into English.
Office Action Dated Jan. 23, 2009 From the State Intellectual Property Office of the People's Republic of China Re.: Application No. 200580008115.4.
Official Action Dated May 2, 2008 From the US Patent and Trademark Office Re.: U.S. Appl. No. 11/656,542.
Official Action Dated Sep. 2, 2008 From the US Patent and Trademark Office Re.: U.S. Appl. No. 11/471,657.
Official Action Dated Jul. 5, 2007 From the US Patent and Trademark Office Re.: U.S. Appl. No. 11/471,657.
Official Action Dated Sep. 10, 2007 From the US Patent and Trademark Office Re.: U.S. Appl. No. 11/471,657.
Official Action Dated Jan. 11, 2010 From the US Patent and Trademark Office Re.: U.S. Appl. No. 12/087,783.
Official Action Dated Dec. 12, 2008 From the US Patent and Trademark Office Re.: U.S. Appl. No. 11/656,542.
Official Action Dated May 15, 2009 From the US Patent and Trademark Office Re.: U.S. Appl. No. 11/471,657.
Official Action Dated Dec. 16, 2008 From the US Patent and Trademark Office Re.: U.S. Appl. No. 10/562,852.
Official Action Dated Apr. 19, 2006 From the US Patent and Trademark Office Re.: U.S. Appl. No. 10/901,243.
Official Action Dated Dec. 20, 2005 From the US Patent and Trademark Office Re.: U.S. Appl. No. 10/755,289.
Official Action Dated Aug. 21, 2009 From the US Patent and Trademark Office Re.: U.S. Appl. No. 10/562,852.
Official Action Dated Feb. 23, 2006 From the US Patent and Trademark Office Re.: U.S. Appl. No. 10/235,852.
Official Action Dated Nov. 28, 2009 From the US Patent and Trademark Office Re.: U.S. Appl. No. 11/499,690.
Response Dated Feb. 7, 2010 to Notice of the Reason for Rejection of Oct. 22, 2009 From the Korean Intellectual Property Office Re.: Application No. 2004-7011868.
Response Dated Jan. 14, 2010 to Notice of the Reason for Rejection of Oct. 22, 2009 From the Korean Intellectual Property Office Re.: Application No. 2004-7011868.
Response Dated Mar. 15, 2010 to Supplementary European Search Report and the European Search Opinion of Dec. 22, 2009 From the European Patent Office Re.: Application No. 06700649.4.
Search Results: STN File, Registry, RN 379722-40-4 and Following Dated Dec. 31, 2001 for the Australian Patent Application No. 2004203461.
Supplementary European Search Report and the European Search Opinion Dated Nov. 11, 2009 From the European Patent Office Re.: Application No. 07790037.1.
Supplementary European Search Report Dated Apr. 18, 2006 From the European Patent Office Re.: Application No. 03704977.2.
Supplementary European Search Report Dated Dec. 22, 2009 From the European Patent Office Re.: Application No. 06700649.4.
Supplementary European Search Report Dated Jul. 31, 2007 From the European Patent Office Re.: Application No. 05703094.2.
Supplementary Partial European Search Report Dated Mar. 26, 2007 From the European Patent Office re.: Appliction No. 05703094.2.
Translation of Notice of the Reason for Rejection Dated Oct. 22, 2009 From the Korean Intellectual Property Office Re.: Application No. 2004-7011868.
Translation of the Notice of Reason of Rejection Dated Jul. 11, 2008 From the Japanese Patent Office Re.: Application No. 2003-563456.
Anguiano et al. "Protofibrillar Islet Amyloid Polypeptide Permeabilizes Synthetic Vesicles by a Pore-Like Mechanism That May Be Relevant to Type II Diabetes", Biochemistry, 41: 11338-11343, 2002.
Arvinte et al. "The Structure and Mechanism of Formation of Human Calcitonin Fibrils", The Journal of Biological Chemistry, 268(9): 6415-6422, 1993.

(56) References Cited

OTHER PUBLICATIONS

Austin et al. "Medical Progress: Calcitonin. Physiology and Pathophysiology", The New England Journal of Medicine, 304(5): 269-278, 1981.
Balbach et al. "Supramolecular Structure in Full-Length Alzheimer's β-Amyloid Fibrils: Evidence for a Parallel β-Sheet Organization From Solid-State Nuclear Magnetic Resonance", Biophysical Journal, 83: 1205-1216, 2002.
Baltzer et al. "De Novo Design of Proteins—What Are the Rules?", Chemical Reviews, 101(10): 3153-3163, 2001.
Banerji et al. "A Lymphocyte-Specific Cellular Enhancer Is Located Downstream of the Joining Region in Immunoglobulin Heavy Chain Genes", Cell, 33: 729-740, 1983.
Bauer et al. "Interfacial Adsorption and Aggregation Associated Changes in Secondary Structure of Human Calcitonin Monitored by ATR-FTIR Spectroscopy", Biochemistry, 33: 12276-12282, 1994.
Benvenga et al. "Homology of Calcitonin With the Amyloid-Related Proteins", Journal of Endocrinological Investigation, 17: 119-122, 1994.
Berger et al. "Calcitonin-Like Immunoreactivity of Amyloid Fibrils in Medullary Thyroid Carcinomas", Virchows Archiv A Pathological Anatomy and Histopathology, 412: 543-551, 1988.
Bird et al. "Single-Chain Antigen-Binding Proteins", Science, 242(4877): 423-426, 1988.
Boerner et al. "Production of Antigen-Specific Human Monoclonal Antibodies From in Vitro-Primed Human Splenocytes", The Journal of Immunology, 147(1): 86-95, 1991.
Booth et al. "Instability, Unfolding and Aggregation of Human Lysozyme Variants Underlying Amyloid Fibrillogenesis", Nature, 385: 787-793, 1997. Not to Be IDS'd as per Hadassa (Not Relevant): May 4, 2006.
Bursavich et al. "Designing Non-Peptide Peptidomimetics in the 21st Century: Inhibitors Targeting Comformational Ensembles", Journal of Medical Chemistry, 45(3): 541-558, 2002.
Byrne et al. "Mutiplex Gene Regulation: A Two-Tiered Approach to Transgene Regulation in Transgenic Mice", Proc. Natl. Acad. Sci. USA, 86: 5473-5477, 1989. Not to Be IDS'd as per Hadassa (Not Relevant): May 4, 2006.
Calame et al. "Transcriptional Controlling Elements in the Immunoglobulin and T Cell Receptor Loci", Advances in Immunology, 43: 235-275, 1988. Not to Be IDS'd as per Hadassa (Not Relevant): May 4, 2006.
Cherny et al. "The Formation of *Escherichia coli* Curli Amyloid Fibrils is Mediated by Prion-Like Peptide Repeats", Journal of Molecular Biology, 352(2): 245-252, 2005.
Chopin et al. "Analysis of Six Prophages in *Lactococcus lactis* IL1403: Different Genetic Structure of Temperate and Virulent Phage Populations", Nucleic Acids Research, 29(3): 644-651, 2001.
Choplin "Computers and the Medicinal Chemist", Comprehensive Medicinal Chemistry, 4(Chap.17.2): 33-58, 1990.
Chou et al. "Conformational Parameters for Amino Acids in Helical, β-Sheet, and Random Coil Regions Calculated From Proteins", Biochemistry, 13(2): 211-222, 1974.
Claessens et al. "Review Commentary: π-π Interactions in Self-Assembly", Journal of Physical Organic Chemistry, 10: 254-272, 1997.
Cole et al. "Human Monoclonal Antibodies", Molecular &. Cellular Biochemistry, 62(2): 109-120, 1984. Not to Be IDS'd as per Hadassa (Not Relevant): May 4, 2006.
Cole et al. "The EBV-Hybridoma Technique and Its Application to Human Lung Cancer", Monoclonal Antibodies and Cancer Therapy, Proceedings of the Roche-UCLA Symposium, Park City, Utah, p. 77-96, 1985.
Cooper "Selective Amyloid Staining As A Function of Amyloid Composition and Structure. Histochemical Analysis of the Alkaline Congo Red. Standardized Toluidine Blue, and Iodine Methods", Laboratory Investigation, 31(3): 232-238, 1974. Not to Be IDS'd as per Hadassa (Not Relevant): May 4, 2006.
Copp "Endocrine Regulation of Calcium Metabolism", Annual Reviews in Physiology, 32: 61-86, 1970.
Cote et al. "Generation of Human Monoclonal Antibodies Reactive With Cellular Antigens", Proc. Natl. Acad. Sci. USA, 80: 2026-2030, 1983. Not to Be IDS'd as per Hadassa (Not Relevant): May 4, 2006.
Coughlan et al. "Factors Influencing the Processing and Function of the Amyloid Beta Precursor Protein—A Potential Therapeutic Target in Alzheimer's Disease?", Pharmacology and Therapeutics, 86: 111-144, 2000. Not to Be IDS'd as per Hadassa (Not Relevant): May 4, 2006.
Damas et al. "Review: TTR Amyloidosis—Structural Features Leading to Protein Aggregation and Their Implications on Therapeutic Strategies", Journal of Structural Biology, 130: 290-299, 2000. Not to Be IDS'd as per Hadassa (Not Relevant): May 4, 2006.
Edlund et al. "Cell-Specific Expression of the Rat Insuline Gene: Evidence for Role of Two Distinct 5' Flanking Elements", Science, 230(4278): 912-916, 1985. Not to Be IDS'd as per Hadassa (Not Relevant): May 4, 2006.
Ferrannini "Insulin Resistance Versus Insulin Deficiency in Non-Insulin-Dependent Diabetes Mellitus: Problems and Prospects", Endocrine Reviews, 19(4): 477-490, 1998. Not to Be IDS'd as per Hadassa (Not Relevant): May 4, 2006.
Findeis "Approaches to Discovery and Characterization of Inhibitors of Amyloid Beta-Peptide Polymerization", Biochimica et Biophysica Acta, 1502: 76-84, 2000. Not to Be IDS'd as per Hadassa (Not Relevant): May 4, 2006.
Findeis et al. "Modified-Peptide Inhibitors of Amyloid β-Peptide Polymerization", Biochemistry, 38: 6791-6800, 1999.
Fingl et al. "Inroduction: General Principles", The Pharmacological Basis of Therapeutics, 5th Ed., Sec.I(Chap.1): 1-53, 1975.
Fishwild et al. "High-Avidity Hum IgGκ Monoclonal Antibodies From A Novel Strain of Minilocus Transgenic Mice", Nature Biotechnology, 14: 845-851, 1996.
Forloni et al. "Anti-Amyloidogenic Activity of Tetracyclines: Studies in Vitro", FEBS Letters, 487(3): 404-407, 2001. Figs. 1,3.
Freshney "Animal Cell Culture—A Practical Approach", IRL Press. Not to Be IDS'd as per Hadassa (Not Relevant): May 4, 2006.
Friedman "Chemistry, Nutrition, and Microbiology of D-Amino Acids", Journal of Agriculture and Food Chemistry, 47(9): 3457-3479, 1999.
Gait "Oligonucleotide Synthesis—A Practical Approach", IRL Press. Not to Be IDS'd as per Hadassa (Not Relevant): May 4, 2006.
Gajdusek "Unconventional Viruses and the Origin and Disappearance of Kuru", Science, 197(4307): 943-960, 1977. Not to Be IDS'd as per Hadassa (Not Relevant): May 4, 2006.
Gazit "A Possible Role for 'Phi'-Stacking in the Self-Assembly of Amyloid Fibrils", The FASEB Journal, 16: 77-83, 2002.
Gazit "Global Analysis of Tandem Aromatic Optapeptide Repeats: The Significance of the Aroma-Glycine Motif", Bioinformatics Discovery Note, 18(6): 880-883, 2002. Not to Be IDS'd as per Hadassa (Not Relevant): May 4, 2006.
Gazit "The 'Correctly Folded' State of Proteins: Is it A Metastable State?", Angewandte Chemie, International Edition, 41(2): 257-259, 2002. Not to Be IDS'd as per Hadassa (Not Relevant): May 4, 2006.
Gillard et al. "Controlling Self-Assembly", Chemical European Journal, 3(12): 1933-1940, 1997.
Gillmore et al. "Amyloidosis A Review of Recent Diagnostic and Therapeutic Developments", British Journal of Haematology, 99: 245-256, 1997.
Glenner "Amyloid Deposits and Amyloidosis. The Beta-Fibrilloses (First of Two Parts)", The New England Journal of Medicine, 302(23): 1283-1292, 1980.
Gorman et al. "Alzheimer Beta-Amyloid Peptides, Structures of Amyloid Fibrils and Alternate Aggregation Products", Biopolymers, 60: 381-394, 2001. Claims 1-16, 22-26, 70-80, 91-100.
Grateau "Le Curli du Coli: Une Variété Physiologique d'Amilose [Coli's Curli or How Amyloid Can be Physiological]", Médecine Sciences, 18(6-7): p. 664, 2002.
Häggqvist et al. "Medin: An Integral Fragment of Aortic Smooth Muscle Cell-Produced Lactadherin Forms the Most Common Human Amyloid", Proc. Natl. Acad. Sci. USA, 96: 8669-8674, 1999.
Han et al. "Technetium Complexes for the Quantitation of Brain Amyloid", Journal of the American Chemical Society, 118: 4506-4507, 1996.

(56) References Cited

OTHER PUBLICATIONS

Harlow et al. "Antibodies: A Laboratory Manual", Cold Spring Harbor Laboratory, p. III-IX, 1988.
Harrison et al. "Amyloid Peptides and Proteins in Review", Reviews in Physiology, Biochemistry and Pharmacology, 159: 1-77, 2007.
Hayden et al. "'A' Is for Amylin and Amyloid in Type 2 Diabetes Mellitus", JOP Journal of the Pancreas (Online), 2(4): 124-139, 2001.
Hoogenboom et al. "By-Passing Immunisation. Human Antibodies From Synthetic Repertoires of Germline $V_H$ Gene Segments Rearranged in Vitro", Journal of Molecular Biology, 227: 381-388, 1992.
Höppener et al. "Islet Amyloid and Type 2 Diabetes Mellitus", The New England Journal of Medicine, 343(6): 411-419, 2000.
Inbar et al. "Localization of Antibody-Combining Sites Within the Variable Portions of Heavy and Light Chains", Proc. Natl. Acad. Sci. USA, 69(9): 2659-2662, 1972.
Inglot "Comparison of the Antiviral Activity in Vitro of Some Non-Steroidal Anti-Inflammatory Drugs", Journal of General Virology, 4(2): 203-214, 1969.
Inouye et al "Synthesis and Biological Properties of the 10-Substituted Analogues of ACTH-(1-18)-NH2", Shionogi Research Laboratory, Fukushima-Ku, Osaka, p. 177-182, 1978.
Jelokhani-Niaraki et al "Changes in Conformation and Antimicrobial Properties Caused by Replacement of D-Amino Acids With α-Aminoisobutyric Acid in the Gramicidin Backbbone: Synthesis and Circular Dichroic Studies", Journal of the Chemical Society Perkin Transactions, 2: 1 187-1193, 1992.
Johnson et al. "Islet Amyloid, Islet-Amiloid Polypeptide, and Diabetes Mellitus", The New England Journal of Medicine, 321(8): 513-518, 1989.
Jones et al. "Replacing the Complementarity-Determining Regions in A Human Antibody With Those From A Mouse", Nature, 321: 522-525, 1986.
Kahn et al. "Islet Amyloid: A Long-Recognized But Underappreciated Pathological Feature of Type 2 Diabetes", Diabetes, 48: 241-253, 1999.
Kamihira et al. "Conformational Transitions and Fibrillation Mechanism of Human Calcitonin as Studied by High-Resolution Solid-State 13C NMR [in Process Citation]", Protein Science, 9: 867-877, 2000.
Kanaori et al. "Study of human Calcitonin Fibrillation by Proton Nuclear Magnetic Resonance Spectroscopy", Biochemistry, 34: 12138-12143, 1995.
Kapurniotu et al. "Structure-Based Design and Study of Non-Amyloidogenic, Double N-Methylated IAPP Amyloid Core Sequences as Inhibitors of IAPP Amyloid Formation and Cytotoxicity", Journal of Molecular Biology, 315: 339-350, 2002.
Kapurniotu et al. Database, Accession No. AAW93015, 1991.
Kane et al. "Structural Characteristics of α-Helical Peptide Molecules Contianing Aib Residues", Biochemistry, 29(29): 6747-6756, Jul. 24, 1990.
Kedar et al. "In Vitro Synthesis of 'Amyloid' Fibrils From Insulin, Calcitonin and Parathormone", Israel Journal of Medical Science, 12(10): 1137-1140, 1976.
Kilkarni et al. "Investigation of the Effect of Antisense Oligodeoxynucleotides to Islet Amyloid Polypeptide mRNA on Insulin Release, Content and Expression", Journal of Endocrinology, 151: 341-348, 1996.
Kohler et al. "Continuous Cultures of Fused Cells Secreting Antibody of Predefined Specifity", Nature, 256: 495-497. 1975.
Kozbor et al. "Specific Immunoglobulin Production and Enhanced Tumorigenicity Following Ascites Growth of Human Hybridomas", Journal of Immunological Methods, 81: 31-42, 1985.
Kuner et al. "Controlling Polmerization of Beta-Amyloid and Prion-Derived Peptides With Synthetic Smal Molecule Ligands", Journal of Biological Chemistry, 275(3): 1673-1678, 2000.
Kyte et al. "A Simple Method for Displaying the Hydropathic Character of A Protein", Journal of Molecular Biology, 157: 105-132, 1982.
Lansbury "Following Nature's Anti-Amyloid Strategy", Nature Biotechnology, 19(2): 112-113, 2001. p. 112, Left-Hand Col., Paragraph 1-Middle Col., Paragraph 1.
Larrick et al. "PCR Amplification of Antibody Genes", Methods: A Companion to Methods in Enzymology, 2(2): 106-110, 1991.
Lonberg et al. "Antigen-Specific Human Antibodies From Mice Comprising Four Distinct Genetic Modifications", Nature, 368(6474): 856-859, 1994.
Lonberg et al. "Human Antibodies From Transgenic Mice", International Review of Immunology, 13: 65-93, 1995.
Lowe et al. "Structure-Function Relationships for Inhibitors of β-Amyloid Toxicity Containing the Recognition Sequence KLVFF", Biochemistry, 40: 7882-7889, 2001.
Lyon et al. "Self-Assembly and Gelation of Oxidized Gluthathione in Organic Solvents", Journal of the American Chemical Society, 123: 4408-4413, 2001.
Marks et al. "By-Passing Immunization—Human Antibodies From V-Gene Libraries Displayed on Phage", Journal of Molecular Biology, 222: 581-597, 1991.
Marks et al. "By-Passing Immunization: Building High Affinity Human Antibodies by Chain Shuffling", Bio/Technology, 10: 779-783, 1992.
Maury et al. "Creation of Amyloid Fibrils From Mutant ASN187 Gelsolin Peptides", Biochemical and Biophysical Research Communications, 183(1): 227-231, 1992.
Mazor et al. "Identification and Characterization of a Novel Molecular-Recognition and Self-Assembly Domain Within the Islet Amyloid Polypeptide", Journal of Molecular Biology, 322: 1013-1024, 2002.
McGaughey et al. "π-Stacking Interactions", The Journal of Biological Chemistry, 273(25): 15458-15463, 1998.
Medore et al. "Fatal Familial Insomnia, A Prion Disease With a Mutation at Codon 178 of the Prion Protein Gene", The New England Journal of Medicine, 326(7): 444-449, 1992.
Merlini et al. "Intereaction of the Anthracycline 4'-Iodo-4'-Deoxydoxorubicin With Amyloid Fibrils: Inhibition of Amyloidogenesis", Proc. Natl. Acad. Sci. USA, 92: 2959-2963, 1995.
Moriatry et al. "Effects of Sequential Proline Substitutions on Amoyloid Formation by Human Amylin20-29", Biochemistry, 38: 1811-1818, 1999.
Morrison "Success in Specification", Nature, 368(6474): 812-813, 1994.
Mosmann "Rapid Colorimetric Assay for Cellular Growth and Survival: Application to Proliferation and Cytotoxicity Assays", Journal of Immunological Methods, 65: 55-63, 1983.
Mosselman et al. "Islet Amyloid Polipeptide: Identification and Chromosomal Localization of the Human Gene", FEBS Letters, 239(2): 227-232, 1988. Not to Be IDS'd as per Hadassa (Not Relevant): Apr. 5, 2006. Not to Be IDS'd as per Hadassa (Not Relevant): May 4, 2006.
Mutter "Studies on the Coupling Rates in Liquid-Phase Peptide Synthesis Using Competition Experiments", International Journal of Peptide Protein Research, 13: 274-277, 1979.
Neuberger "Generating High-Avidity Human Mabs in Mice", Nature Biotechnology, 14: 826, 1996.
Novials et al. "Reduction of Islet Amylin Expression and Basal Secretion by Adenovirus-Mediated Delivery of Amylin Antisense cDNA", Pancreas, 17(2): 182-186, 1998. Not to Be IDS'd as per Hadassa (Not Relevant): May 4, 2006.
Offen et al. "A Low Molecular Weight Copper Chelator Crosses the Blood-Brain Barrier and Attenuates Experimental Autoimmune Encephalomyelitis", Journal of Neurochemistry, 89: 1241-1251, 2004.
Orlandi et al. "Cloning Immunoglobulin Variable Domains for Expression by the Polymerase Chain Reaction", Proc. Natl. Acad. Sci. USA, 86: 3833-3837, 1989. Not to Be IDS'd as per Hadassa (Not Relevant): May 4, 2006.
Pack et al. "Improved Bivalent Miniantibodies, With Identical Avidity as Whole Anitbodies, Produced by High Cell Density Fermentation of *Escherichia coli*", Bio/Technology, 11: 1271-1277, 1993.

(56) References Cited

OTHER PUBLICATIONS

Pavia et al. "Antimicrobial Activity of Nicotine Against A Spectrum of Bacterial and Fungal Pathogens", Journal of Medical Microbiology, 49(7): 675-676, 2000.
Perbal "A Practical Guide to Molecular Cloning", Wiley-Interscience Publication. Not to Be IDS'd as per Hadassa (Not Relevant): May 4, 2006.
Petkova et al. "A Structural Model for Alzheimer's β-Amyloid Fibrils Based on Experimental Constraints From Solid State NMR", Proc. Natl. Acad. Sci. USA, 99(26): 16742-16747, 2002.
Pettmann et al. "Morphological and Biochemical Maturation of Neurones Cultured in the Absence of Glial Cells", Nature, 281: 378-380, 1979.
Pinkert et al. "An Albumin Enhancer Located 10 Kb Upstream Functions Along With Its Promoter to Direct Efficient, Liver-Specific Expression in Transgenic Mice", Genes & Development, 1: 268-276, 1987.
Pispisa et al. "A Spectroscopic and Molecular Mechanics Investigation on A Series of AIB-Based Linear Peptides and a Peptide Template, Both Containing Tryptophan and A Nitroxide Derivative as Probes", Biopolymers, 53: 169-181, 2000.
Porter "The Hydrolysis of Rabbit γ-Globulin and Antibodies With Crystalline Papain", Biochemical Journal, 73: 119-126, 1959.
Presta "Antibody Engineering", Current Opinion in Structural Biology, 2: 593-596, 1992.
Puchtler et al. "A Review of Early Concepts of Amyloid in Context With Contemporary Chemical Literature From 1839 to 1859", The Journal of Histochemistry and Cytochemistry, 14(2): 123-134, 1966.
Reza et al "Self-Assembling Organic Nanotubes Based on A Cyclic Peptide Architecture", Nature, 366: 324-327, 1993.
Riechmann et al. "Reshaping Human Antibodies for Therapy", Nature, 332: 323-329, 1988.
Sambrook et al. "Molecular Cloning: A Laboratory Manual", 2nd Edition, Cold Spring Harbor Laboratory,1989.
Sano "Prevention of Alzheimer's Disease: Where We Stand", Current Neurology and Neuroscience Reports, 2(5): 392-399, Oct. 2002. Abstract.
Shetty et al. "Aromatic π-Stacking in Solution as Revealed Through the Aggregation of Phenylacetylene Macrocycles", Journal of the American Chemical Society, 118: 1019-1027, 1996.
Sigel-Causey et al. "Phylogeny of the Pelecaniformes: Molecular Systematics of A Privative Group", Avian Molecular Evolution and Systematics, academic Press, p. 159-171, NBCI GenBank, Accession No. AAB58518, 1997.
Sigma "Alphabetical List of Compounds: Phe-Phe, Phe-Pro, Phe-Val", Biochemicals and Reagents for Life Science Research, p. 774, 2000-2001.
Solomon et al. "Disaggregation of Alzheimer β-Amyloid by Site-Directed MAb", Proc. Natl. Acad. Sci. USA, 94: 4109-4112, 1997.
Soto et al. "Beta-Sheet Breaker Peptides Inhibit Fibrillogenesis in A Rat Brain Model of Amyloidosis: Implications for Alzheimer's Therapy", Nature Medicine, 4(7): 822-826, 1998.
Soto et al. "Inhibition of Alzheimer's Amyloidosis by Peptides That Prevent β-Sheet Conformation", Biochemical and Biophysical Research Communications, 226(3): 672-680, 1996.
Stephenson et al. "The 'Promiscuous Drug Concept' With Applications to Alzheimer's Disease", FEBS Letters, 579: 1338-1342, 2005.
Stites et al. "Tables of Content", Basic & Clinical Immunology, 8th Ed.: 12 P.
Sun et al. "Aromatic Van der Waals Clusters: Structure and Nonrigidity", Journal of Physical Chemistry, 100: 13348-13366, 1996.
Tenidis et al. "Identification of A Penta- and Hexapeptide of Islet Amyloid Polypeptide (IAPP) With Amyloidogenic and Cytotoxic Propereties", Journal of Molecular Biology, 295(4): 1055-1071, 2000.
Tjernberg et al. "Arrest of β-Amyloid Fibril Formation by A Pentapeptide Ligand", The Journal of Biological Chemistry, 271(15): 8545-8548, 1996.

Tjernberg et al. "Controlling Amyloid β-Peptide Fibril Formation With Protease-Stable Ligands", The Journal of Biological Chemistry, 272(19): 12601-12605, 1997.
Toniolo et al. "Control of Peptide Conformation by the Thorpe-Ingold Effect (Cα-Tetrasubstitution)", Biopolymers (Peptide Science), 60(6): 396-419, 2001.
Tonkinson et al. "Antisense Oligodeoxynucleotides as Clinical Therapeutic Agents", Cancer Investigation, 14(1): 54-65, 1996.
Tsai et al. "Synthesis of AIB-Containing Peptidomimetics as Potential Inhibitors of Alzheimer's γ-Secretase", 218th ACS National Meeting, New Orleans, USA, Meeting Abstract, MEDI-018, 1999. Abstract.
Verhoeyen et al. "Reshaping Human Antibodies: Grafting an Antilysozyme Activity", Science, 239: 1534-1536, 1988.
Vidal et al. "A Stop-Codon Mutation in the BRI Gene Associated With Familial British Dementia", Nature, 399: 776-781, 1999.
Westermark "Amyloid and Polypeptide Hormones: What is Their Interrelationship?", Amyloid: International Journal of Experimental & Clinical Investigation, 1: 47-60, 1994.
Westermark "Islet Amyloid Polypeptide: Pinpointing Amino Acid Residues Linked to Amyloid Fibril Formation", Proc. Natl. Acad. Sci. USA, 87: 5036-5040, 1990.
Whitlow et al. "Single-Chain Fv Proteins and Their Fusion Proteins", Methods: A Companion to Methods in Enzymology, 2(2): 97-105, 1991.
Wilesmith et al. "Bovine Spongiform Encephalopathy", Current Topics in Microbiology & Immunology, 172: 21-38, 1991.
Winoto et al. "A Novel, Inducible and T Cell-Specific Enhancer Located at the 3' End of the T Cell Receptor Alpha Locus", The EMBO Journal, 8(3): 729-733, 1989.
Winter et al. "Man-Made Antibodies", Nature, 349: 293-299, 1991. No.
Wolfenden et al. "Affinities of Amino Acid Side Chains for Solvent Water", Biochemistry, 20: 849-855, 1981.
Yamada et al. "Study of the Enzymatic Degradation of Endomorphin Analogs Containing α,α-Disubstituted Glycine", Peptide Science, 2000: 421-424, 2001.
International Search Report and the Written Opinion Dated Mar. 28, 2006 From the International Searching Authority Re.: Application No. PCT/IL2005/000754.
Re-Issued International Search Report Dated Mar. 5, 2009 From the International Searching Authority Re.: Application No. PCT/IB07/50143.
Response Dated Mar. 11, 2010 to Official Action of Jan. 11, 2010 From the US Patent and Trademark Office Re.: U.S. Appl. No. 12/087,783.
Novials et al. "Reduction of Islet Amylin Expression and Basal Secretion by Adenovirus-Mediated Delivery of Amylin Antisense cDNA", Pancreas, 17(2): 182-186, 1998. Not to Be IDS'd as per Hadassa (Not Relevant): May 4, 2006. Not to Be IDS'd as per Hadassa (Not Relevant): May 4, 2006.
Official Action Dated Jun. 1, 2010 From the US Patent and Trademark Office Re.: U.S. Appl. No. 12/087,783.
Supplementary European Search and European Search Opinion Dated May 21, 2010 From the European Patent Office Re. Application No. 06700648.6.
Official Action Dated Jul. 7, 2010 From the US Patent and Trademark Office Re. U.S. Appl. No. 11/795,319.
Official Action Dated Jul. 21, 2010 From the US Patent and Trademark Office Re. U.S. Appl. No. 11/795,318.
International Preliminary Report on Patentability Dated Jul. 26, 2007 From the International Bureau of WIPO Re.: Application No. PCT/IL2006/000061.
International Preliminary Report on Patentability Dated Jan. 29, 2009 From the International Bureau of WIPO Re.: Application No. PCT/IB2007/050142.
International Preliminary Report on Patentability Dated Jul. 31, 2008 From the International Bureau of WIPO Re.: Application No. PCT/IB2007/050141.
International Search Report and the Written Opinion Dated Feb. 28, 2008 From the International Searching Authority Re.: Application No. PCT/IL06/00062.

(56) References Cited

OTHER PUBLICATIONS

Invitation to Pay Additional Fees Dated Jan. 31, 2007 From the International Searching Authority Re.: Application No. PCT/IL06/00061.
Official Action Dated Nov. 18, 2009 From the US Patent and Trademark Office Re.: U.S. Appl. No. 11/499,690.
Notice of Allowance Dated Dec. 2, 2010 From the US Patent and Trademark Office Re.: U.S. Appl. No. 12/087,783.
Response Dated Nov. 1, 2010 to Official Action of Jun. 1, 2010 From the US Patent and Trademark Office Re.: U.S. Appl. No. 12/087,783.
Response Dated Dec. 8, 2010 to Supplementary European Search and European Search Opinion Dated May 21, 2010 From the European Patent Office Re. Application No. 06700648.6.
Response Dated Nov. 8, 2010 to Official Action of Jul. 7, 2010 From the US Patent and Trademark Office Re. U.S. Appl. No. 11/795,319.
Official Action Dated Jan. 19, 2011 From the US Patent and Trademark Office Re. U.S. Appl. No. 11/795,319.
Response Dated Jan. 20, 2011 to Official Action of Jul. 21, 2010 From the US Patent and Trademark Office Re. U.S. Appl. No. 11/795,318.
Response Dated Feb. 21, 2011 to Official Action of Jan. 19, 2011 From the US Patent and Trademark Office Re. U.S. Appl. No. 11/795,319.
Notice of Allowance Dated Apr. 7, 2011 From the US Patent and Trademark Office Re.: U.S. Appl. No. 12/087,783.
Official Action Dated Apr. 19, 2011 From the US Patent and Trademark Office Re. U.S. Appl. No. 11/795,319.
Offica Action Dated Apr. 7, 2011 From the Israel Patent Office Re. Application No. 40673 and Its Translation Into English.
Office Action Dated Apr. 5, 2011 From the Israel Patent Office Re. Application No. 184644 and Its Translation Into English.
Response Dated Jun. 16, 2011 to Official Action of Apr. 19, 2011 From the US Patent and Trademark Office Re. U.S. Appl. No. 11/795,319.
Response Dated May 31, 2011 to Official Action of May 5, 2011 From the US Patent and Trademark Office Re. U.S. Appl. No. 12/087,776.
Official Action Dated May 5, 2011 From the US Patent and Trademark Office Re. U.S. Appl. No. 12/087,776.
Official Action Dated Apr. 8, 2011 From the US Patent and Trademark Office Re. U.S. Appl. No. 11/795,318.
Official Action Dated Aug. 10, 2011 From the US Patent and Trademark Office Re. U.S. Appl. No. 12/087,776.
Response Dated Aug. 8, 2011 to Official Action of Apr. 8, 2011 From the US Patent and Trademark Office Re. U.S. Appl. No. 11/795,318.
Balbach et al. "Supramolecular Structure in Full-Length Alzheimer's Beta-Amyloid Fibrils: Evidence for A Parallel Beta-Sheet Organization From Solid-State Nuclear Magnetic Resonance", Biophysical Journal, 83: 1205-1216, 2002.
Chou et al. "Conformational Parameters for Amino Acids in Helical, Beta-Sheet, and Random Coil Regions Calculated From Proteins", Biochemistry, 13(2): 211-222, 1974.
Claessens et al. "Review Commentary: Pi-Pi Interactions in Self-Assembly", Journal of Physical Organic Chemistry, 10: 254-272, 1997.
Findeis et al. "Modified-Peptide Inhibitors of Amyloid B-Peptide Polymerization", Biochemistry, 38: 6791-6800, 1999.
H?ggqvist et al. "Medin: An Integral Fragment of Aortic Smooth Muscle Cell-Produced Lactadherin Forms the Most Common Human Amyloid", Proc. Natl. Acad. Sci. USA, 96: 8669-8674, 1999.
H?ppener et al. "Islet Amyloid and Type 2 Diabetes Mellitus", The New England Journal of Medicine, 343(6): 411-419, 2000.
Hoogenboom et al. "By-Passing Immunisation. Human Antibodies From Synthetic Repertoires of Germline VH Gene Segments Rearranged in Vitro", Journal of Molecular Biology, 227: 381-388, 1992.
Jelokhani-Niaraki et al "Changes in Conformation and Antimicrobial Properties Caused by Replacement of D-Amino Acids With Alpha-Aminoisobutyric Acid in the Gramicidin Backbbone: Synthesis and Circular Dichroic Studies", Journal of the Chemical Society Perkin Transactions, 2: 1 187-1193, 1992.
Lowe et al. "Structure-Function Relationships for Inhibitors of Beta-Amyloid Toxicity Containing the Recognition Sequence KLVFF", Biochemistry, 40: 7882-7889, 2001.
Marshak et al. "Strategies for Protein Purification and Charcterization, A Laboratory Course Manual", Cold Spring Harbor Laboratory Press, 1996.
McGaughey et al. "Pi-Stacking Interactions. Alive and Well in Proteins", The Journal of Biological Chemistry, 273(25): 15458-15463, Jun. 19, 1998.
Petkova et al. "A Structural Model for Alzheimer's Beta-Amyloid Fibrils Based on Experimental Constraints From Solid State NMR", Proc. Natl. Acad. Sci. USA, 99(26): 16742-16747, 2002.
Porter "The Hydrolysis of Rabbit Gamma-Globulin and Antibodies With Crystalline Papain", Biochemical Journal, 73: 119-126, 1959.
Shetty et al. "Aromatic Pi-Stacking in Solution as Revealed Through the Aggregation of Phenylacetylene Macrocycles", Journal of the American Chemical Society, 118: 1019-1027, 1996.
Solomon et al. "Disaggregation of Alzheimer Beta-Amyloid by Site-Directed MAb", Proc. Natl. Acad. Sci. USA, 94: 4109-4112, 1997.
Soto et al. "Beta-Sheet Breaker Peptides Inhibit Fibrillogenesis in A Rat Brain Model of Amyloidosis: Implications for Alzheimer's Therapy", Nature Medicine, 4(7): 822-826, Jul. 1998.
Soto et al. "Inhibition of Alzheimer's Amyloidosis by Peptides That Prevent Beta-Sheet Conformation", Biochemical and Biophysical Research Communications, 226(3): 672-680, 1996.
Tjernberg et al. "Arrest of Alpha-Amyloid Fibril Formation by A Pentapeptide Ligand", The Journal of Biological Chemistry, 271(15): 8545-8548, 1996.
Tjernberg et al. "Controlling Amyloid Beta-Peptide Fibril Formation With Protease-Stable Ligands", The Journal of Biological Chemistry, 272(19): 12601-12605, 1997.
Toniolo et al. "Control of Peptide Conformation by the Thorpe-Ingold Effect (CAlpha-Tetrasubstitution)", Biopolymers (Peptide Science), 60(6): 396-419, 2001.
Tsai et al. "Synthesis of AIB-Containing Peptidomimetics as Potential Inhibitors of Alzheimer's Gamma-Secretase", 218th ACS National Meeting, New Orleans, USA, Meeting Abstract, MEDI-018, 1999. Abstract.
Yamada et al. "Study of the Enzymatic Degradation of Endomorphin Analogs Containing Alpha,Alpha-Disubstituted Glycine", Peptide Science, 2000: 421-424, 2001.
Official Action Dated Aug. 12, 2011 From the US Patent and Trademark Office Re. U.S. Appl. No. 11/795,318.
Official Action Dated Aug. 17, 2011 From the US Patent and Trademark Office Re. U.S. Appl. No. 11/795,319.
Taketani et al. "Data Acquisition System With Database at the SPring-8 Storage Ring", 1998.
Official Action Dated Feb. 1, 2012 From the US Patent and Trademark Office Re. U.S. Appl. No. 12/087,776.
Office Action Dated Jul. 23, 2012 From the Israel Patent Office Re. Application No. 173169 and Its Translation Into English.
Advisory Action Before the Filing of An Appeal Brief Dated Aug. 27, 2012 From the US Patent and Trademark Office Re. U.S. Appl. No. 11/795,318.
Official Action Dated Nov. 28, 2012 From the US Patent and Trademark Office Re. U.S. Appl. No. 12/087,776.
Office Action Dated Jul. 18, 2012 From the Israel Patent Office Re. Application No. 166322 and Its Translation Into English.
McCoy "Interface and Language Issues in Intelligent Systems for People With Disabilities", Assistive Technology and Artificial Intelligence: Applications in Robotics, User Interfaces and Natural Language Processing, Lecture Notes in AI Series, 1458: 1011, 1998.
Office Action Dated Apr. 7, 2011 From the Israel Patent Office Re. Application No. 40673 and Its Translation Into English.
Ausubel et al. Current Protocols in Molecular Biology, 1(Suppl.63). Not to Be IDS'd as per Hadassa (Not Relevant): May 4, 2006.
Haeggqvist et al. "Medin: An Integral Fragment of Aortic Smooth Muscle Cell-Produced Lactadherin Forms the Most Common Human Amyloid", Proc. Natl. Acad. Sci. USA, 96: 8669-8674, 1999.
Hoeppener et al. "Islet Amyloid and Type 2 Diabetes Mellitus", The New England Journal of Medicine, 343(6): 411-419, 2000.
Hoeppener et al. "The Complete Islet Amyloid Polypeptide Precursor Is Encoded By Two Exons", Biochemical & Biophysical Research

(56) References Cited

OTHER PUBLICATIONS

Communications, 189: 1569-1577, 1993. Database, Accession No. S04016, 1993. Claims 1-16, 22-26.

Karle et al. "Structural Characteristics of Alpha-Helical Peptide Molecules Containing Aib Residues", Biochemistry, 29(29): 6747-6756, Jul. 24, 1990.

Mosselman et al. "The Complete Islet Amyloid Polypeptide Precursor Is Encoded By Two Exons", FEBS Letters, 247: 154-158, 1989, Database Accession No. S04016.

Searle "A Brief History of Character Codes", TRON, http://tronweb.super-nova.co.jp/characcodehist.html., 2001.

Seino "S20G Mutation of the Amylin Gene Is Associated With Type II Diabetes in Japanes", Diabetologia, 44: 906-909, 2001.

Zaidi et al. "Forty Years of Calcitonin—Where Are We Now? A Tribute to the Work of Iain Macintyre, FRS", Bone, 30(5): 655-663, 2002.

Official Action Dated Apr. 26, 2012 From the US Patent and Trademark Office Re. U.S. Appl. No. 11/795,318.

Official Action Dated Apr. 16, 2013 From the US Patent and Trademark Office Re. U.S. Appl. No. 12/087,776.

Applicant-Initiated Interview Summary Dated Jun. 18, 2013 From the US Patent and Trademark Office Re. U.S. Appl. No. 12/087,776.

Notice of Allowance Dated Jun. 21, 2013 From the US Patent and Trademark Office Re. U.S. Appl. No. 12/087,776.

Communication Pursuant to Article 94(3) EPC Dated Apr. 24, 2014 From the European Patent Office Re. Appl. No. 06700648.6.

Communication Pursuant to Article 94(3) EPC Dated Mar. 25, 2014 From the European Patent Office Re. Appl. No. 07700608.8.

\* cited by examiner

HI YOU ME MEET TOMORROW ?

NO. ME HOME.

PLEASE PLEASE

ME NO GO. NO CAR

SAD SAD HUG HUG KISS HUG

BYE

BIG KISS SLEEP GOOD

COME HERE NOW !

ME ANGRY ! ME NO TALK YOU

ME WANT MEET !

MEET 15 MINUTES JOE

SEE YOU LATER

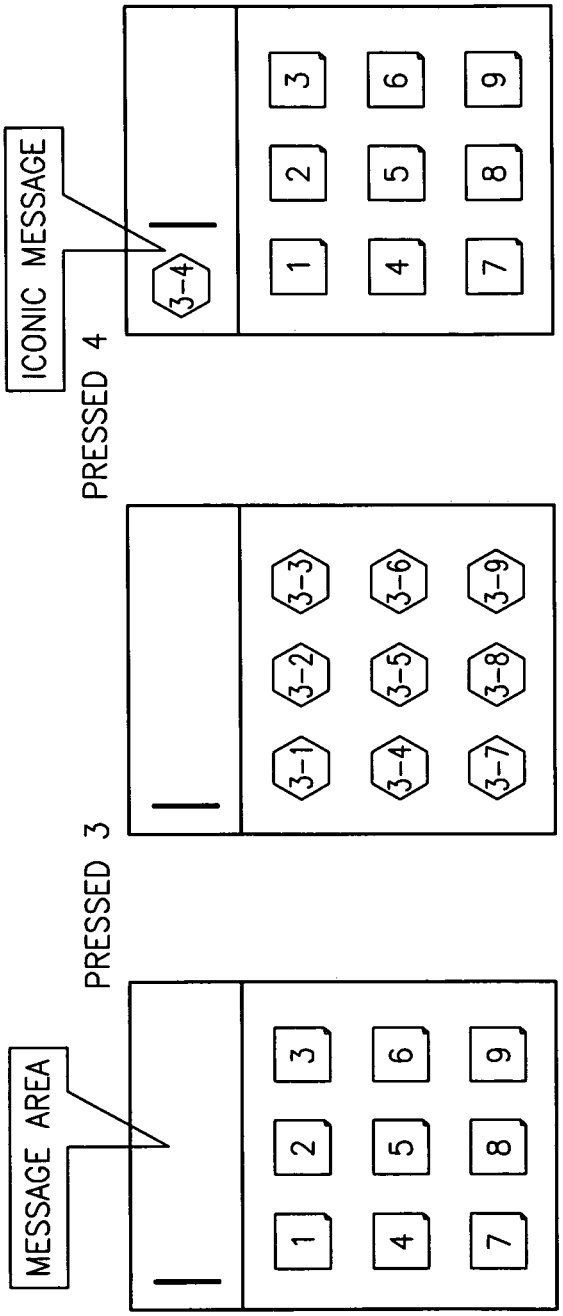

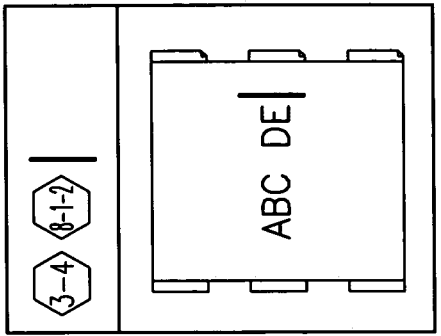
FIG.8A
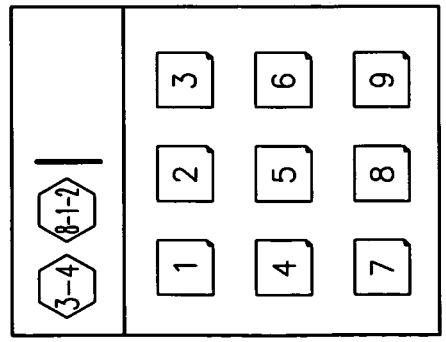
FIG.8B
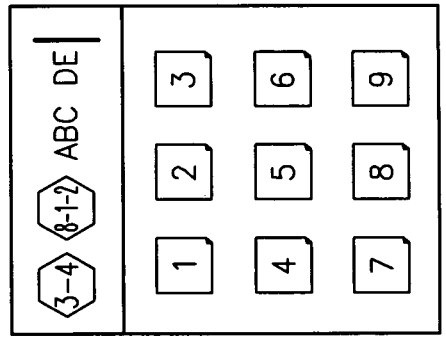
FIG.8C
FIG.8D

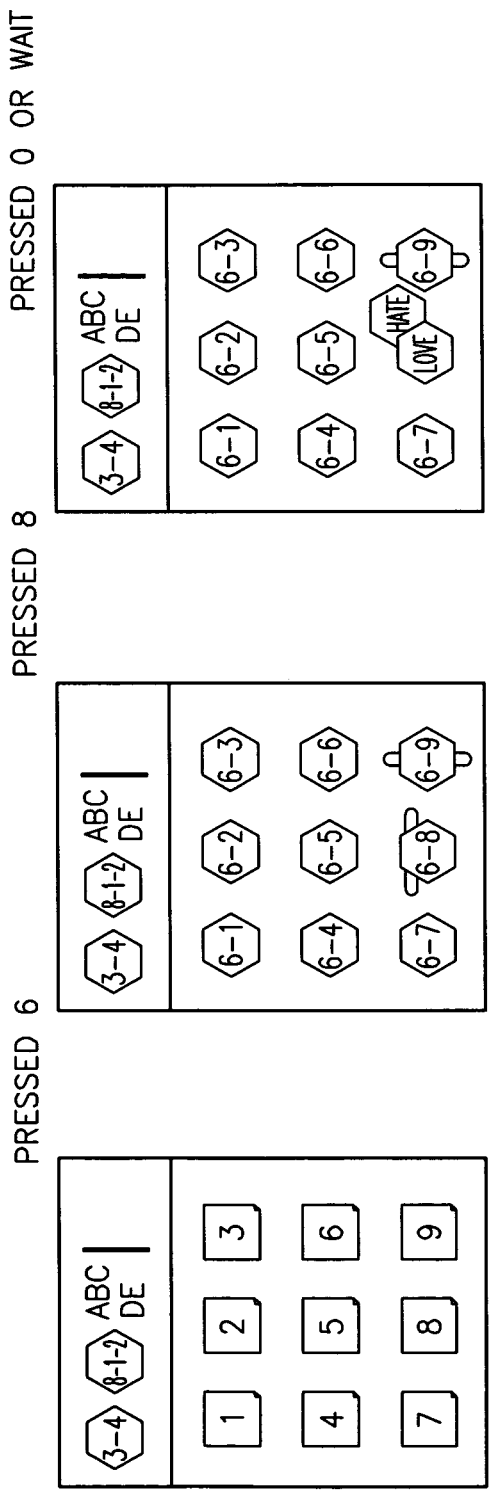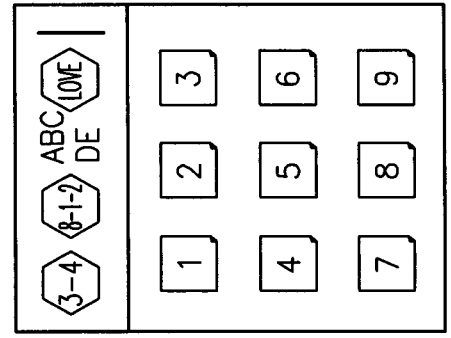

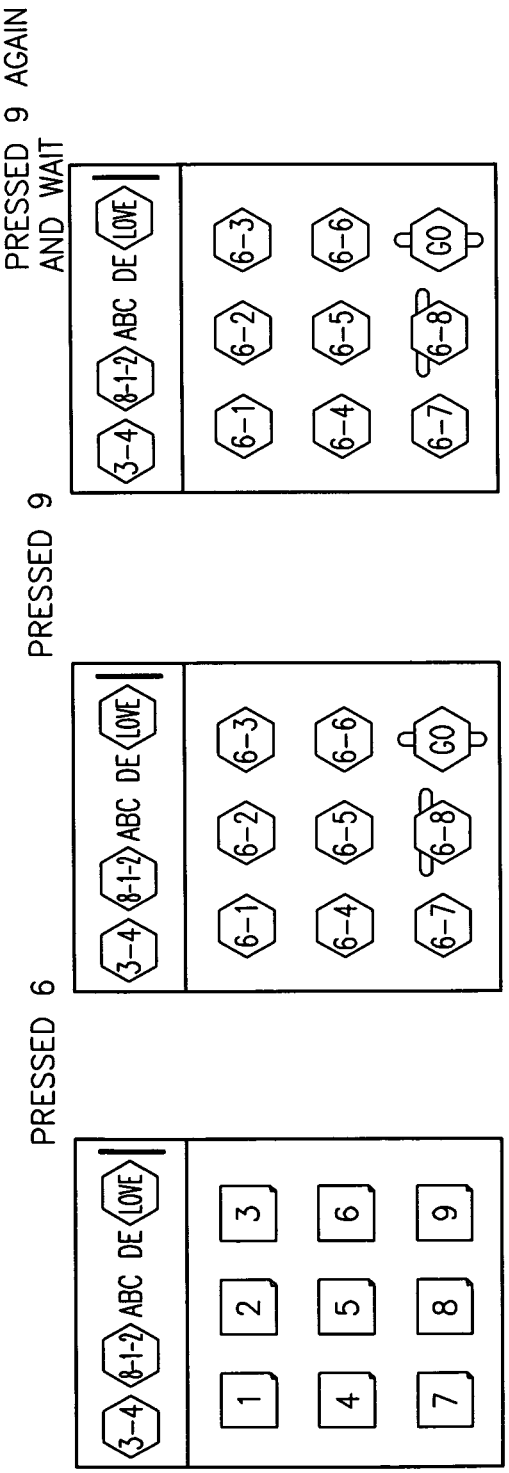
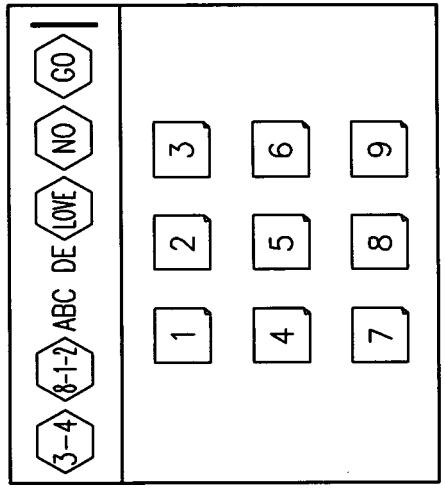
FIG.10A FIG.10B FIG.10C FIG.10D

| N. | ICON | NAME | N. | ICON | NAME | N. | ICON | NAME |
|---|---|---|---|---|---|---|---|---|
| 1 | | AMOUNT | 21 | | BOOM!!! | 41 | | – |
| 2 | | AIRPLANE | 22 | | BORING | 42 | | – |
| 3 | | ALBERT | 23 | | BOYFRIEND | 43 | | – |
| 4 | | ALL | 24 | | BROTHER | 44 | | CONTACTS |
| 5 | | ALWAYS | 25 | | MOVE | 45 | | COW |
| 6 | | AND | 26 | | BUS | 46 | | CRAZY |
| 7 | | ANGEL | 27 | | BUT | 47 | | CRY |
| 8 | | ANGER | 28 | | CAFE | 48 | | DANCING |
| 9 | | APPLAUSE | 29 | | CALL | 49 | | INFO |
| 10 | | ARMY | 30 | | CAN | 50 | | DAY |
| 11 | | ASK | 31 | | CAR | 51 | | DELETE |
| 12 | | PEACHES | 32 | | ANIMALS | 52 | | DESPAIR |
| 13 | | BABY | 33 | | CAT | 53 | | OTHER |
| 14 | | BAD | 34 | | CHEAP | 54 | | DEVIL |
| 15 | | EGGS | 35 | | CHICKEN | 55 | | DIFFERENT |
| 16 | | BEACH | 36 | | CLASS | 56 | | DO |
| 17 | | BEAUTIFUL | 37 | | – | 57 | | DOCTOR |
| 18 | | BIG | 38 | | – | 58 | | – |
| 19 | | BIRTHDAY | 39 | | – | 59 | | DOWN |
| 20 | | BITCH | 40 | | – | 60 | | DRINK |

FIG.13A

BEST AVAILABLE IMAGE

| N. | ICON | NAME | N. | ICON | NAME | N. | ICON | NAME |
|---|---|---|---|---|---|---|---|---|
| 61 | | EARLIER | 81 | | GIRLFRIEND | 101 | | IM |
| 62 | | EAT | 82 | | GIVE | 102 | | IMPORTNT |
| 63 | | E-MAIL | 83 | | GO-COME | 103 | | INBOX |
| 64 | | OTHER | 84 | | GOD | 104 | | JEALOUS |
| 65 | | EVENING | 85 | | GOOD | 105 | | KILL |
| 66 | | – | 86 | | GRASS | 106 | | KISS |
| 67 | | EXIT | 87 | | HAPPY | 107 | | KNOW |
| 68 | | EXPENSIVE | 88 | | HATE | 108 | | LATER |
| 69 | | FAMILY | 89 | | HE | 109 | | LAUGH |
| 70 | | FAST | 90 | | HEAR | 110 | | LITTLE |
| 71 | | FAT | 91 | | HELP | 120 | | LOTS |
| 72 | | NEGATIVE | 92 | | HERE | 121 | | LOVE |
| 73 | | FINGER | 93 | | HI-BYE | 122 | | LUCK |
| 74 | | FINISH | 94 | | HONEY | 123 | | ACTIONS |
| 75 | | FLOWER | 95 | | HOPE | 124 | | MAKE-OUT |
| 76 | | FOOD | 96 | | HOT | 125 | | MALL |
| 77 | | FORWARD | 97 | | HOUSE | 126 | | FAMILY+ |
| 78 | | – | 98 | | HUG | 127 | | MAMA |
| 79 | | FRIEND | 99 | | IDEA | 128 | | MARILYN |
| 80 | | GIFT | 100 | | IF | 129 | | MAYBE |

FIG.13B

| N. | ICON | NAME | N. | ICON | NAME | N. | ICON | NAME |
|---|---|---|---|---|---|---|---|---|
| 121 | | DESCRIPTIONS | 141 | | MY | 161 | | PARTY |
| 122 | | ME | 142 | | NEVER | 162 | | CUCUMBER |
| 123 | | MEET | 143 | | OTHER | 163 | | PEOPLE |
| 124 | | GENERAL | 144 | | NEW | 164 | | PIG |
| 125 | | HEART | 145 | | NEXT | 165 | | PLEASE |
| 126 | | MINUS | 146 | | NIGHT | 166 | | PLUS |
| 127 | | MISS-YOU | 147 | | – | 167 | | PREVIOUS |
| 128 | | MIND | 148 | | NO-ICON | 168 | | PROBLEM |
| 129 | | – | 149 | | NOON | 169 | | PUB |
| 130 | | MONEY | 150 | | NO-PROB | 170 | | – |
| 131 | | MONKEY | 151 | | NOTHING | 171 | | RELAX |
| 132 | | MORNING | 152 | | NOW | 172 | | REPLY |
| 133 | | OTHER | 153 | | OTHER | 173 | | REST'RANT |
| 134 | | MOVIE | 154 | | OK | 174 | | ROACH |
| 135 | | PEOPLE | 155 | | OLD | 175 | | SAD |
| 136 | | PLACES | 156 | | OR | 176 | | SAME |
| 137 | | TIME | 157 | | OSAMA | 177 | | – |
| 138 | | MUCH | 158 | | OUTBOX | 178 | | SAVE |
| 139 | | MUSIC | 159 | | PAIN | 179 | | SAY |
| 140 | | VARIOUS | 160 | | PAPA | 180 | | SCHOOL |

FIG.13C

BEST AVAILABLE IMAGE

| N. | ICON | NAME | N. | ICON | NAME | N. | ICON | NAME |
|---|---|---|---|---|---|---|---|---|
| 181 | | SENSES | 201 | | SORRY | 221 | | MINUTES |
| 182 | | SEE | 202 | | START | 222 | | TIME |
| 183 | | SEND | 203 | | STOP | 223 | | PRIVATE |
| 184 | | SHARK | 204 | | STUPID | 224 | | LEMONS |
| 185 | | SHE | 205 | | DAYS | 225 | | TODAY |
| 186 | | | 206 | | SURPRISE | 226 | | TOILET |
| 187 | | SHOP | 207 | | SWEET | 227 | | 2MORROW |
| 188 | | SHUT-UP | 208 | | TAKE | 228 | | TOUCH |
| 189 | | SICK | 209 | | TASTE | 229 | | CITY |
| 190 | | SISTER | 210 | | TAXI | 230 | | TRAIN |
| 191 | | OTHER | 211 | | TEACHER | 231 | | − |
| 192 | | SLEEP | 212 | | TEDDY | 232 | | LEISURE |
| 193 | | SLOW | 213 | | THANKYOU | 233 | | TV |
| 194 | | SMALL | 214 | | THERE | 234 | | − |
| 195 | | SMART | 215 | | THEY | 235 | | UGLY |
| 196 | | MY-BOX | 216 | | THIN | 236 | | UP |
| 197 | | SMELL | 217 | | THINGS | 237 | | US |
| 198 | | SMOKE | 218 | | THING | 238 | | WAIT |
| 199 | | SOME | 219 | | THINK | 239 | | WANT |
| 200 | | SOON | 220 | | − | 240 | | − |

FIG.13D

| N. | ICON | NAME |
|---|---|---|
| 241 |  | WASSUP |
| 242 |  | WHAT—WHY |
| 243 |  | QUESTIONS |
| 244 |  | WHEN |
| 245 |  | WHERE |
| 246 |  | ZLAP |
| 247 |  | WHO |
| 248 |  | WITH |
| 249 |  | WITHOUT |
| 250 |  | WORK |
| 251 |  | COMPOSE |
| 252 |  | POSITIVE |
| 253 |  | YEAH |
| 254 |  | — |
| 255 |  | YESTERDAY |
| 256 |  | YOU |
| 257 |  | YOUR |
| 258 |  | ZLANGO |
FIG.13E

ICONIC COMMUNICATION

RELATED APPLICATIONS

This Application is a National Phase of PCT Patent Application No. PCT/IB2007/050143 having International filing date of Jan. 16, 2007, which is a continuation-in-part of PCT application No. PCT/IL2006/000061, filed on Jan. 16, 2006 and entitled "Iconic Communication", which is a 119(e) of U.S. Provisional application 60/644,021 filed Jan. 18, 2006. PCT/IB2007/050143 is also a continuation-in-part of PCT application No. PCT/IL2006/000062, filed on Jan. 16, 2006 and entitled "Communications Network System and Methods for Using Same".

PCT/IB2007/050143 also claims the benefit under 119(e) of the following U.S. Provisional application 60/807,855 filed on Jul. 20, 2006 entitled "Communication Network System and Methods for Using Same"; and 60/807,863 filed on Jul. 20, 2006 entitled "Iconic Communication".

PCT/IB2007/050143 is related to Israel Application No. 166322, filed on Jan. 16, 2005, entitled "Method and System for Iconic Language Communication" and Israel application No. 173169, filed on Jan. 16, 2006 and entitled "Communications Network System and Methods for Using Same".

This application is also related to PCT Patent Application Nos. PCT/IB2007/050142 filed on Jan. 16, 2007 and PCT/IB2007/050141 filed on Jan. 16, 2007.

The disclosures of the above applications are incorporated herein by reference.

FIELD OF THE INVENTION

This invention relates to the field of communication. In some embodiments thereof, the present invention relates to using iconic sets suited for mobile communication devices.

BACKGROUND OF THE INVENTION

The popularity of mobile communication has profoundly improved the way people communicate, stay in touch with each other and access information around the globe.

However, the success of mobile communication is limited by inherent shortcomings of mobile devices, such as limited capabilities of text input and display, limited memory and limited bandwidth available for communication.

PCT Publication WO 97/50264, the disclosure of which is incorporated herein by reference, discloses a mobile telephone with integrated multiple communication functionalities.

PCT Publication WO 03/067418, the disclosure of which is incorporated herein by reference, discloses a graphic user interface using icons and provided on a mobile telephone.

U.S. Patent Application publication 2002/0184309, the disclosure of which is incorporated herein by reference, discloses systems and methods for reducing the amount of input a user is required to enter for an electronic message.

Beardon, C. Iconic Communication, Third International Conference on Iconic Communication, Bristol, 1999, http://www.cs.wpi.edu/~nemleem, the disclosure of which is incorporated herein by reference, suggests that a problem of linguistic diversity may be overcome with the help of iconic languages.

U.S. Pat. No. 5,742,779, the disclosure of which is incorporated herein by reference, discloses a method of communication using sized icons, text, and audio wherein language oriented information is communicated to and from a user by the use of a computer with a dynamic graphics display, having a pointing device for visually indicating a position through a cursor on the display. The description includes marking an indicated icon, auto projecting an icon when it is activated, changing the icon image to denote its terminal node status, varying the play back speed of an audio/visual aspect of an icon, moving between different layers of a hierarchical database, and text searching and matching with icons.

U.S. Patent application 2002/0140732, the disclosure of which is incorporated herein by reference, discloses a method, system and storage medium for an iconic language communication tool. The system includes a host system for generating an iconic language communication template for receiving a user icon selection, presenting the iconic language communication template and receiving the user icon selection from the iconic language communication template. A network and a database are in communication with the host system.

SUMMARY OF THE INVENTION

A broad aspect of some embodiments of the invention relates to iconic communication for example using limited interface communication devices, for example devices with limited screen and/or input resources such as cellular telephones, satellite telephone and DECT telephone. In an exemplary embodiment of the invention, the use of iconic communication facilitates improved mobile communication. In some embodiments, iconic icon sets are used to assist in overcoming language barriers. It should be noted that in some embodiments of the invention, iconic communication is used with devices that are less limited, for example, laptop or handheld computers. Intermediate devices, such as PDAs may also be supported.

In an exemplary embodiment of the invention, the iconic language includes more than 100 and/or fewer than 1000 viewable symbols that are accessible by a user at any given time. It should be noted that a number of available visualizations and/or animations may be greater, for example, by a factor of 2, 5, 10, 50 100 or intermediate or greater factors.

An aspect of some embodiments of the invention relates to using a portable communication device to control an external display. In an exemplary embodiment of the invention, the external display is directly controlled by the device, for example, using a Bluetooth wireless link. In some embodiments, the contents on the external display are different from that on a display of the device. Optionally, the external display includes a processor which generates a display according to commands and/or data sent to it by the device.

In an exemplary embodiment of the invention, an iconic language and/or instructions are used to control a non-display device or a device whose main function is not display. For example, the message "cook 10" can be sent to a microwave and have it turn on for 10 minutes. The message "tomorrow 1000" can be sent to an alarm clock to set an alarm for the next day at 10:00. These devices optionally use a Bluetooth communication system.

In an exemplary embodiment of the invention, the display is controlled via a network, for example, a wireless network, for example a cellular network. Optionally, the display downloads one or more libraries of symbols using the network. Optionally, a separate server is provided to control the display, optionally taking into account commands/displays from different sources.

Optionally, the display includes a visual and/or audio display. Optionally, the display is a non-graphical visual display, for example consisting of a plurality of independently controllable sparklers or other ornaments that are worn by a user.

In some embodiments of the invention, the display is a site on the internet or another network, for example, a WAP site.

An aspect of some embodiments of the invention relates to modifying the visualization and/or behavior of one or more icons based on neighboring icons and/or the content of an iconic message including the one or more icons. In an exemplary embodiment of the invention, the modifying includes modifying one or more of a static visual, color(s), spacing, animation type, animation behavior, animation timing, merging behavior, alternating behavior, sounds, text section and/or label.

In an exemplary embodiment of the invention, a composite icon or icon phrase is generated, for example, "2" without a space between it and an icon for "go" or alternating icons of house and book (e.g., to mean "library."). Optionally, an icon phrase includes more than two icons, for example, three, four or more icons.

In an exemplary embodiment of the invention, the behavior of icons when adjacent or when they meet (e.g., in snapshot animation) is defined in an editing session. Alternatively or additionally, a dictionary of icon pairs and/or pair behavior is provided. Optionally, a user can select behavior from the dictionary, for example, to apply to a particular message, for example, "overlap", "alternate" and "kern".

In an exemplary embodiment of the invention, the icon behavior is transmitted to a receiver as one or more hints which suggest that icons be treated as a pair (or longer phrase) and/or what the behavior could be. Optionally, a user defines pairing behavior parameters for his system. Alternatively or additionally, hint interpretation is shared by a group of users. Optionally, a remote dictionary is used to interpret hints. Optionally, a same dictionary service (e.g., one or more shared servers) is used for interpreting hints and for personalizing visuals.

In an exemplary embodiment of the invention, the behavior modification comprises synchronizing the animation of a series of icons. In one example, when five icons are shown, the animation of each icon is completed in turn before the next icon starts, or with some temporal overlap, instead of simultaneous animation of all the icons. Optionally, a desirable synchronization between animations of icons is predefined. In one example, it may be defined that "me" and "you" icons, when side by side, point at each other in synchrony. In another example, the behavior is generic. Optionally an icon may have associated with it a desirable timing for synchronizing to an externally applied animation timing profile (such as a wave propagating along the message).

In an exemplary embodiment of the invention, the methods of modifying display and/or behavior of icons are applied to non-language icons and/or to characters, for example, being applied to letters, pictograms, ideograms and/or emoticons.

An aspect of some embodiments of the invention relate to icon editing. In an exemplary embodiment of the invention, when an icon is edited it is saved into a particular logical location in the structure of the language, for example, into a hierarchical location. In an exemplary embodiment of the invention, the image, text, sound, animation and/or other behavior of an icon depend on the method of accessing an icon via the hierarchy. For example, a same icon with a same meaning may be associated with a different animation, based on its selection method. In an exemplary embodiment of the invention, the different behavior of an icon is provided by associating a code with the icon. Optionally, the code overrides a default behavior of the icon. In an exemplary embodiment of the invention, during editing, a user is optionally limited to the abilities of his system (e.g., display resolution, colors, sound quality). Optionally, a user can select to generate icon behavior for systems of different capabilities. Optionally, a user edits an icon using a regular computer and uploads the icon to his telephone and/or to a server associated with his telephone, a user group and/or the icon-management system.

An aspect of some embodiments of the invention relates to using real images as icons to represent symbols in an iconic language. In an exemplary embodiment of the invention, the images comprise at least 20%, at least 50% or more of the symbols in the language. Optionally, the language includes fewer than 1000 symbols, fewer than 500 symbols or fewer than 300 symbols. Optionally, the symbols are transmitted as codes, rather than as image data, for example, as codes of fewer than 6 bytes. Optionally, at least some images are transmitted as images. Optionally, commands to modify images are transmitted as part of a message, for example, color instructions and/or animation instructions. Optionally, at least 10, at least 30, at least 50 or intermediate numbers of icons are graphical and not pictorial.

In an exemplary embodiment of the invention, the images used are stored on a user device and are optionally different for each user device. Optionally, a user can select what images are used at a receiver. Optionally, a server is accessed by the receiver to download image data for displaying the images. Optionally, a local cache is managed at a receiver telephone for recently used images.

Optionally, different image resolutions are used for different applications, for example, for small icons, for regular sized icons and for full-screen icons. Optionally, graphics are substituted for images at least for some icon sizes and/or depending on the sender and/or receiver capabilities (e.g., memory, bandwidth and/or resolution).

Optionally, animation is provided for images, for example, one or more of short video sequences, sets of alternating images, images intermixed with graphical icons and/or image manipulation instructions.

In an exemplary embodiment of the invention, sets of symbols including images are standardized and optionally sold or rented, for example, sets where one or more celebrities portray the ideas illustrated by the symbols or where a talented photographer acquired and/or processed the images. Optionally, a royalty is collected each time an image is used.

In an exemplary embodiment of the invention, a user can upload images and modify them for use as a symbol. Optionally, the client application on a cellular telephone includes the ability to process a downloaded and/or acquired image, for example, cropping and iconizing.

An aspect of some embodiments relates to automatic translation of text into a series of symbols of an iconic language. In an exemplary embodiment of the invention, the text comprises an SMS message or a section thereof. In an exemplary embodiment of the invention, a private dictionary is provided to a user or group of users, so that some words are translated in a non-standard manner. For example, the word "teacher" may be translated as the icon for "devil" in a student's dictionary. Optionally, the dictionary used depends on the intended recipient. Optionally, words for which there are no translations are flagged as they are typed and optionally appear as plain text inside the message. Optionally, the client device and/or a server suggest one or more possible icons, for example, using methods known in the art of spell-checkers and thesauruses, or randomly. Optionally, the translation is automatic for incoming SMS messages. In some cases, translation uses a standard, non-personalized language dictionary. Optionally, the private dictionary includes only a subset of words and is used to override the standard dictionary. Optionally, a dictionary (e.g., for translation, animation, etc.) may be shared by a group of users and/or transmitted from one user to another. Optionally, a user can create and/or edit such a dictionary on his communication device and/or on a home computer (e.g., via software or by connection to a remote server). Optionally, a shared dictionary is provided and accessed, for example, at a server, or downloaded as needed.

In an exemplary embodiment of the invention, the dictionaries are used for reverse translation from icons into text.

In an exemplary embodiment of the invention, a dictionary is used for converting icons into icons, for example, replacing the icon for "love" with the icon for "happy". In another example, icons are converted across countries, for example, "honey" from the USA is converted into "cake" in Bulgaria. Alternatively or additionally, the name of the icon is changed by the dictionary and displayed along the icon. Optionally, a user can request to see an original text and/or image. Conversion can be, for example, by a server, by a receiving device and/or by a sending device, for example, based on an identification of or a profile of a sender or receiver.

An aspect of some embodiments of the invention relates to using an iconic language (e.g., as described herein) not only for communication between cellular telephones but also for user interface needs, optionally as an alternative for internationalization and/or for communication between users with different spoken languages. In an exemplary embodiment of the invention, the iconic language is used for communicating using instant messenger programs, such as ICQ™ or a dedicated instant messaging software. In an exemplary embodiment of the invention, the iconic language is used for instructions and/or for communication in web-based game rooms, for example for players of chess, checkers, poker and/or role-playing games.

In an exemplary embodiment of the invention, a user interface (e.g., of a program or operating system) which uses words, for example in menus, is modified so that icons or animated series of icons replace the words. In an exemplary embodiment of the invention, at least 50% of the replacement icons form part of a complete language. Optionally, existing icons of the program are also used. In an exemplary embodiment of the invention, at least 10% of the alphabetic interactions (e.g., menu items, system messages and/or window titles) are replaced. Optionally, at least 30% of the alphabetical interactions are replaced. Optionally, help messages are not replaced.

In an exemplary embodiment of the invention, icons and/or animated icons are used to provide feedback, for example, informing a user that data is being sent.

An aspect of some embodiments of the invention relates to a method of updating contact information, in which contact information is updated upon receipt of a reply from the contact. In an exemplary embodiment of the invention, when a user sends a message to a contact not on a contact list (e.g., either directly or when sending a message to a group of users, some on his private list and some not), a note is automatically made of the lack of contact record. Optionally, the recipient is notified in the message and has the option of replying with contact information. Optionally, the reply is automatic. When the reply is received the contact record is optionally updated automatically. Optionally, the sender is asked for permission to update by software on his device.

In an exemplary embodiment of the invention, this mechanism is used for automatic updating by the recipient. Optionally, when a sender sends a message, the message includes a checksum of the personal information of the recipient. The recipient checks this checksum (or other indication of the data being up-to-date, such as a date stamp) and sends updated information with the recipient's answer if the checksum does not match the checksum of the data by which the recipient would like to be identified. Optionally, a recipient and/or a sender can optionally disable the function of contact information updating.

An aspect of some embodiments of the invention relates to a method of distributing a client application for a communication program. Optionally, the client program, or at least part thereof is distributed in a peer-to-peer manner, for example using a short range link such as IR or Bluetooth. In an exemplary embodiment of the invention, the transmission is selectively of symbol sets, animations and/or other capabilities, for example, java applets that enhance the client ability, for example, a chat application, rather than the client as a monolithic unit. In an exemplary embodiment of the invention, a user device can broadcast its desire to obtain new icons and/or send existing icons. This may be used, for example, for a user to distribute a personally designed icon set to persons that are in regular physical contact with him, for example, fellow classmates.

An aspect of some embodiments of the invention relates to generating and sending icon images and/or other media properties as a combination of components. In an exemplary embodiment of the invention, an icon image is formed by the overlap and/or blending of multiple image components. When transmitting the image, what is transmitted, are instructions on how to assemble the icon, optionally from components stored at the recipient. Optionally, the recipient can modify the appearance of one or more components to personalize his experience. Alternatively or additionally, an identification of the sender is used to determine what components to use.

In an exemplary embodiment of the invention, the components are arranged to be parts of a face. Optionally, a combination of components is used to generate a face of a user or other person (e.g., teacher, parent), optionally to be used in messages from, to and/or about the user.

An aspect of some embodiments of the invention relates to an interface for common message generation, in which as a user progresses through the hierarchy, message components are added to the message. In an exemplary embodiment of the invention, an upper-level display of the hierarchy includes icons which most commonly start the most common messages. Lower levels progressively show icons used for the second icon of the message given that a particular first icon was chosen, etc. Alternatively or additionally, an upper level display includes icons that start message according to category (or just a category). The second level may be first icons according to the common messages in that category or second icons, if the first shown icon is also used as part of the message. In some embodiments of the invention, a list is shown. For example, the second level can be lists of items, each item being a complete (or part of) message. Alternatively or additionally, the top level may be a list of categories, for example: "Good Thing", "Bad Thing", "Now Say" (urgent) and/or "My Question".

It should be noted that rather than icons, words may be displayed. This may be used for combining words into an icon message or for regular text messages (e.g., sms or e-mail). Alternatively or additionally, the hierarchy may be used for presenting other media types, such as sounds and animation, e.g., in composing a message or an animation sequence. In some cases, the composed message includes only non-image items, for example, sounds.

In an exemplary embodiment of the invention, the hierarchy is populated by analyzing actually sent messages. Optionally, the messages are analyzed by category (e.g., manually) or by geographical or other groupings, for example, to match up the hierarchy with the needs of particular users.

In an exemplary embodiment of the invention, automatic categorization is provided. For example, optionally only short messages (e.g., 2-4 icons) are selected. Then the first icon that is not a pronoun (e.g., me/you/him/name) is detected. Often this icon indicates the category. Alternatively or additionally, other icons may be filtered out of the messages, for example, common icons, using uncommon icons to indicate the category. Optionally, when a user selects an icon to be added, commonly associated "pronouns" or other icons are suggested to the user.

Optionally, the hierarchy is used for entering phrases not at a start of a message or following an otherwise entered icon and/or to select a preceding icon according to common usage.

An aspect of some embodiments of the invention relates to a sparse iconic set, including one or both of limited number of elements and limited grammatical tools. In an exemplary embodiment of the invention, the limited number of elements comprises fewer than 800 elements, fewer than 600 elements, fewer than 300 elements or intermediate numbers. Optionally, at least 100 or at least 200 icons are provided. Optionally, the elements are disproportionately selected from one or more categories, such as emotions, self and leisure, which may be associated with a user of the icon set. In an exemplary embodiment of the invention, the limited grammatical tools reduce the possible complexity of sentences. In an exemplary embodiment of the invention, the icon set is constructed based on concepts in an existing language, such as English, German or Chinese, by selecting a small subset of words. However, in some embodiments of the invention at least some of the symbols, for example 50 or more are not chosen from words or ideographs of a standard written or spoken language. In some embodiments of the invention, the total number of available icons, including composite and personal icons is much higher. However, the number of icons available to any particular user, at any given time is optionally small, for example, fewer than 2000 or fewer than 1000. In an exemplary embodiment of the invention, the basic icon set includes fewer than 600 icons and a user may add groups of icons having fewer than 100 icons each, for example, 10 groups. In an exemplary embodiment of the invention, the base language includes 200-300 icons and additional groups comprise fewer than 20 or 10 additional groups at any time (e.g., per message), each with, for example, fewer than 30, 20 or 10 icons. In an exemplary embodiment of the invention, the complete image set of the icon fits within 100K, within 50K, within 10K, within 5K, within 2K or smaller memory sizes.

In an exemplary embodiment of the invention, the icons include color, for example, at least some of the icons including at least two, three or more colors other than a background color (which is optionally transparent).

In an exemplary embodiment of the invention, some or all icons of the set are associated with names, in some cases a single name per icon and in some more than one name. In an exemplary embodiment of the invention, the names may be displayed for example, when composing, previewing and/or reading a message. Optionally, multiple names are provided for a single icon. Optionally, the names reflect different human languages.

In an exemplary embodiment of the invention, a small number of icons are provided for general use, for example, fewer than $2^{10}+1$, fewer than $2^9+1$, fewer than $2^8+1$ or intermediate values. Optionally, special groups or individuals may have additional personal icons, for example, 50, 100 or smaller, greater or intermediate numbers.

In an exemplary embodiment of the invention, text segments can be mixed with the icons.

In an exemplary embodiment of the invention, the set and/or an interface to the set is arranged by categories. Optionally, the number of categories and/or items in a category is limited, for example, to match to cellular telephone abilities and/or simplify learning. In an exemplary embodiment of the invention, a relatively shallow menu structure is provided for accessing at least most of the icons commonly used.

In an exemplary embodiment of the invention, a message is composed using the set by identifying one or more related concepts to be conveyed and selecting icons that match those concepts.

In an exemplary embodiment of the invention, translation between languages is provided by a user composing a message in one language, by simplifying the message to fit the limited icon set and then translating the icons into words in a target language.

In an exemplary embodiment of the invention, icons are used to enter non-alphabetic messages in a system that only supports alphabetic languages.

In an exemplary embodiment of the invention, the icon set acts a pidgin language. In some embodiments, the icon set meets one or more of the following criteria: it is not a regional language, not a natural language, not an official language of any country or institute, not a language spoken by at least 100,000 persons, not a spoken language and/or is not an accepted human language.

In an exemplary embodiment of the invention, the use of a limited icon set is used for mass-cooperation, for example, for generating enhanced answers to polls. Optionally, a poll is requested to be answered using an icon from a preset category optionally used as part of a living language, for example, emotions, so that the number of possible answers is relatively small, for example, fewer than 20 or fewer than 10, but more than 2 and not merely numbers on a numerical scale.

In an exemplary embodiment of the invention, the contents of the icon set are controlled, for example, by a central location. Optionally, this control allows concepts to be added or removed from the set, including from the systems which use the set. Optionally, the use of an icon and/or color based set make usage of the icon set difficult without software support, so the form and/or scope of the set is optionally controlled by controlling the software. Optionally, this allows the set to be maintained as a condensed set of icons.

In an exemplary embodiment of the invention, the actual graphic used for an icon depends, for example, on screen resolution, on promotions (e.g., a set of icons or a screen for the world cup) and/or available colors.

In an exemplary embodiment of the invention, the icons are entered using an interface that is directed at icon entry. Such direction can take several forms, for example, the interface being icon based, options for entering plain text comprising a small part (e.g., less than 50%, less than 30% or less than 10% of the control options) of the interface, the interfacing starting out in icon mode and/or screen utilization dependent on icon sizes and not text sizes. When text is entered, the icon entry is optionally resumed at a point where it was stopped.

Optionally, the mobile device includes a separate text entry interface, for example, for SMS entry or for e-mail entry. Such an interface may include the option to insert one or more images, for example, by selection from a list.

An aspect of some embodiments of the invention relates to providing rich media services over a limited link, such as SMS. In an exemplary embodiment of the invention, the services comprises one or more of icons, formatted text, sounds, images and animations. Optionally, the instructions are encoded into a text format and decoded at a target. Optionally, if the target cannot decode, a server decodes and provides the message in another format. Optionally, the message includes an indication of an image, provided by the server.

In an exemplary embodiment of the invention, the rich media comprises a slide show. In an exemplary embodiment of the invention, the slide show is used to communicate with one or more persons near a person using a mobile device, for example by those persons viewing the slideshow on the mobile device, optionally from a distance of several meters.

In an exemplary embodiment of the invention, the rich media comprises images that move on a screen of the target.

In an exemplary embodiment of the invention, a displayed rich media presentation is captured using a cellular telephone camera, optionally edited and transmitted on (e.g., as a movie, images and/or icon message). Optionally, the editing comprises converting the images/captured video into a series of icons, for example, by searching for patterns matching known icons in the images/captured movie.

An aspect of some embodiments of the invention relates to icon and/or text services. In an exemplary embodiment of the invention, an icon-based message includes text segments intended to compensate for an intentional simplification of an icon set.

In an exemplary embodiment of the invention, text is automatically converted to an icon, or vice versa.

In an exemplary embodiment of the invention, auto-completion and/or guessing of input of icons is selected according to a previous message and/or according to an incomplete sequence of entry of inputs (e.g., incomplete menu selection sequence).

In an exemplary embodiment of the invention, names are associated with the icons and are optionally displayed, for example on demand. In an exemplary embodiment of the invention, the names selected for display are varied, for example, to support learning of the association of the name(s) with the icons.

In an exemplary embodiment of the invention, icon messages are displayed in a two dimensional array of icons, with each icon representing an icon selected from a different icon message.

An aspect of some embodiments of the invention relates to management of user preferences on a cellular system, in connection with communication between users of the system. In an exemplary embodiment of the invention, a user communicates using a reduced set of indications and these indications are translated, if needed, to a display according to a target of the communication. Optionally, the translation is by a server intermediate the user and the target.

In an exemplary embodiment of the invention, users are organized in groups, with optional overlap in membership and the indication is translated according to the sender group membership.

In an exemplary embodiment of the invention, there is provided a computer application for use in a mobile device for iconic message communication, wherein said application comprising,
   a) a repository comprising at least one symbol of category associated with at least one set icon;
   b) a user interface functionally associated with an input interface and a display of the mobile device and adapted to compose an iconic message containing at least one set icon;
   c) a network interface functionally associated with the network interface of the mobile device and adapted to transmit the composed iconic message via a message service network; and
   d) a processor coupled to said repository, user interface and network interface and adapted to facilitate, in functional association with the user interface, selecting at least one set icon via a symbol of associated category for composing an iconic message and displaying the composed message within a predefined region on the display of the mobile device.

In an exemplary embodiment of the invention, there is provided a method for iconic communication via a mobile device comprising
   a) composing an iconic message having iconic based message component, said composing containing:
      i. for each component of a message, selecting a category symbol associated with a category to which the component belongs;
      ii. selecting a set icon generally correlated to the message component; and
      iii. displaying the composed message within a predefined region on the display of the mobile device;
   b) once an iconic message is composed, transmitting the message to a recipient via a transmitter functionally associated with the mobile device.

In an exemplary embodiment of the invention, there is provided an application for use in a communication device for composing an iconic message, wherein said application comprising,
   a. a repository comprising at least one symbol of category associated with at least one set icon;
   b. a user interface functionally associated with an input interface and a display of the communication device and adapted to compose the iconic message containing at least one set icon;
   c. a network interface functionally associated with the network interface of the communicating device and adapted to transmit the composed iconic message; and
   d. a processor coupled to said repository, user interface and network interface and adapted to facilitate, in functional association with the user interface, selecting at least one set icon via a symbol of associated category for composing iconic message and displaying the composing message within a predefine region on the display of the communicating device.

There is thus provided in accordance with an exemplary embodiment of the invention, a method of sending a message on a mobile communication network, comprising: activating an icon entering interface on a mobile device, the interface including at least 50 icons, at least 25 of which include an associated name stored on the mobile device; entering a message including at least three consecutive icons, using the activated interface; and transmitting the message to a remote communication device. In some exemplary embodiments of the invention, the method further comprises displaying names associated with the icons as part of at least one of a preview before sending and of displaying when receiving the transmission. Optionally, the displaying comprises selectively displaying. Optionally, selective displaying comprises toggling display. Optionally, displaying comprises displaying in a predetermined position on a screen, relative to the icons. Optionally, displaying comprises displaying simultaneously for all the icons. Optionally, displaying comprises displaying sequentially. Optionally, displaying comprises displaying as the message is entered. Optionally, at least two different names are associated with at least 10 icons of the interface. In some exemplary embodiments of the invention, the method further comprises automatically selecting which of the different names to display in a displaying act. Optionally, automatically selecting comprises selecting according to newness of a name. Optionally, automatically selecting comprises selecting according to context. In some exemplary embodiments of the invention, the method further comprises receiving votes from users including an association of at least one name with at least one icon. Optionally, the different names have different meanings. Optionally, the different names are in different languages. In some exemplary embodiments of the invention, the method further comprises selecting the names to be phonetically distinguished. Optionally, the message includes at least 10 icons. Optionally, the message includes at least sequence of alphanumeric symbols. Optionally, the icons are not standard representations of a spoken language. Optionally, the icons are non-language icons. Optionally, the icons include at least 10 icons whose meaning does not follow intuitively from their image, but is memorable after the icon and its name are known. Optionally, the icons include at least 5 icons representing people. Optionally, the icons include at least 5 icons representing time. Optionally, the icons include at least 5 icons representing emotions. Optionally, the icons include at least 5 icons representing places. Optionally, the icons include at least 5 icons representing actions. Optionally, the icons include at least 5 icons representing leisure activities or places. Optionally, the icons include at least 5 icons each of concepts suitable for subjects, actions and receipts of actions. Optionally, the icons do not include more than 5 icons indicating a relationship between icons. Optionally, the icons include at least 3 abstract concepts. Optionally, the concepts include "soon", "want" and "finish". Optionally, the icons include at least 5 motifs, each of the motifs is used as a basis for at least 5 icons. Optionally, the icons include at least 5% but less than 50 icons relating to emotions and body. Optionally, the interface arranges the icons in categories. In some exemplary embodiments of the invention, at least 4 and fewer than 20 categories are displayed at any time. Optionally, the categories are mapped to input keys. Optionally, the categories are arranged as a 3×3 matrix. In some exemplary embodiments of the invention, at least 3 icons serve both as categories and as individual icons. Optionally, the interface is arranged to minimize input actions for selecting frequently used icons. Optionally, at least 3 icons and their negatives are arranged such that an icon and its negative occupy a same screen location and are switched. Optionally, the categories include standard categories and at least one personal category shared by a group of users. Optionally, the interface comprises a store of icon and/or text phrases. Optionally, entering comprises automatic completion of an entry. Optionally, entering comprises entry by menu navigation. Optionally, entering comprises entry by alphanumeric symbol entry. Optionally, the interface allows entry of at least 100 icons with fewer than 4 inputs. Optionally, the interface allows an escape from icon entry to a temporary text entry mode. Optionally, the mobile device is not programmed to support data entry in a non-alphabetic language. Optionally, entering comprises defining at least one of formatting and animation for an icon or a text segment. In some exemplary embodiments of the invention, the method further comprises setting a motion of a display element. In some exemplary embodiments of the invention, the method further comprises setting a size of a display element. In some exemplary embodiments of the invention, the method further comprises showing a slide show of display elements. Optionally, transmitting comprises converting the icons into identification codes each smaller than 4 bytes. Optionally, transmitting comprises transmitting the codes over an SMS protocol and decoding the codes at a receiver. Optionally, transmitting comprises downloading at least one icon image from a server responsive to the code, at a receiver.

There is thus provided in accordance with an exemplary embodiment of the invention, a mobile communication device, comprising: a display smaller than 10×10 cm; a transmitting circuit; a memory storing therein images for at least 50 icons and associated names for at least 25 of the icons and associated therewith; and a processor configured to allow entry of the icons and display of the names in association therewith.

There is thus provided in accordance with an exemplary embodiment of the invention, a mobile communication device, comprising: a display smaller than 10×10 cm; a transmitting circuit; a memory storing therein images for at least 50 icons; and a processor configured to include a first, text message entry mode and a second, icon message entry mode, wherein the icon entry mode includes an option to enter text in addition to icons.

There is thus provided in accordance with an exemplary embodiment of the invention, a mobile communication device, comprising: a display smaller than 10×10 cm; a transmitting circuit; a memory storing therein images for at least 50 icons; and a processor configured to include a message entry mode that is predominantly icon entry mode, characterized in that the mode include at least as many input manipulation commands for icon entry and selection as for text entry and selection. Optionally, the message entry mode has a default state of icon entry.

There is thus provided in accordance with an exemplary embodiment of the invention, a mobile device adapted for entry of a message having non-alphabetic images, comprising: a display smaller than 10×10 cm; a transmitting circuit; a memory storing therein images for at least 50 icons; and a processor configured to access the icons as members of categories, such that at least 4 different functional categories are provided. Optionally, the images comprise language images. Optionally, the images comprise non-language images. Optionally, at least one of the categories comprises times. Optionally, at least one of the categories comprises people. Optionally, at least one of the categories comprises actions. Optionally, at least one of the categories comprises places. Optionally, at least 9 categories are provided.

There is thus provided in accordance with an exemplary embodiment of the invention, a mobile device adapted for entry of a message having non-alphabetic images, comprising: a display smaller than 10×10 cm; a transmitting circuit; a memory storing therein images for at least 50 icons, at least 10 of the icons being non-intuitive and memorable; and a processor configured to access the icons. Optionally, the icons include at least 5 different motifs with 5 icons according to each motif. Optionally, the icons include at least 5 icons with associated opposites icons.

There is thus provided in accordance with an exemplary embodiment of the invention, a mobile device adapted for entry of a message having non-alphabetic images, comprising: a display smaller than 10×10 cm; a transmitting circuit; a memory storing therein images for at least relatively fixed 50 icons; an updateable memory storing therein at least updatable 10 icons; and a processor configured to access icons in the memory and the updatable memory as part of a single message. Optionally, at least some of the updatable icons are accessed by the processor as belonging to a different functional category form the fixed icons.

There is thus provided in accordance with an exemplary embodiment of the invention, a mobile device adapted for entry of a message having non-alphabetic images, comprising: a display smaller than 10×10 cm; a transmitting circuit; a memory storing therein images for at least 50 icons divided into at least 2 groups, each of the groups utilizing a different color map; an updateable memory storing therein at least updatable 10 icons; and a processor configured to access the icons as part of a message. Optionally, the icons are divided into at least 4 groups.

There is thus provided in accordance with an exemplary embodiment of the invention, an iconic communication system, comprising: a first communication device which sends a message including non-language icons selected from a set of at least 100 icons, as icon codes; and a second communication device which receives the message and decodes the message using at least 90% of the same icons for display, as for the sending. In some exemplary embodiments of the invention, the system further comprises a server adapted to convey the message between the communication devices. Optionally, the server supports missing icon capability at the second communication device.

There is thus provided in accordance with an exemplary embodiment of the invention, a method of showing an icon message on a mobile communication device, comprising: activating an icon displaying interface on a mobile device; displaying a message including at least three consecutive icons, using the activated interface; and displaying text names associated with the three icons at least temporally adjacent the icons.

There is thus provided in accordance with an exemplary embodiment of the invention, a method of sending a message on a mobile communication network, comprising: activating an icon entering interface on a mobile device, the interface including at least 100 icons, at least 10% of which are animated; entering a message including at least three consecutive icons, using the activated interface; transmitting the message to a remote communication device; and displaying the icons in an animated form on the remote communication device.

There is thus provided in accordance with an exemplary embodiment of the invention, a method of sending a message on a mobile communication network, comprising: activating an icon-language interface on a mobile device; entering a message including at least one icon, using the activated interface; defining an animation for at least one of the at least one icon; transmitting the message to a remote communication device; and performing the animation at the remote communication device. Optionally, the animation comprises a slide show. Optionally, the animation comprises motion of the icon. Optionally, the animation comprises resizing of the icon. Optionally, the animation comprises changing an image of the icon. In some exemplary embodiments of the invention, the method further comprises defining a sound in association with the animation.

There is thus provided in accordance with an exemplary embodiment of the invention, a method of sending a rich media message on a mobile communication network, comprising: activating a rich media interface on a mobile device; entering a message including at least one of a non-text symbol or at least one of a formatting command, using the activated interface; encoding the entry using an ID code for the entry; transmitting the message to a remote communication device; and performing the message at the remote communication device. Optionally, the non-text symbol comprises an image. Optionally, the non-text symbol comprises a sound. Optionally, the formatting command comprises a text formatting command.

There is thus provided in accordance with an exemplary embodiment of the invention, a method of icon entry, comprising: entering at least one input; automatically converting the input into an icon indication from a selection of at least 50 icons; and automatically changing the converting according to further entering. Optionally, the entering comprises a code. Optionally, the converting comprises guessing an intended icon. Optionally, the converting comprises converting using a table of shortcuts. Optionally, the converting comprises converting using a conversion cache.

There is thus provided in accordance with an exemplary embodiment of the invention, a method of translating, comprising: entering a message using a limited icon set, by a person conversant with a first language and not conversant with a second language; and automatically converting the icons into text symbols of the second language using a dictionary that matches the icons and the second language. Optionally, the entering comprises entering into a mobile communication device.

There is thus provided in accordance with an exemplary embodiment of the invention, a method of adaptive client generation, comprising: determining by a server a parameter comprising at least one of a data entry method and a display size of a client; and automatically generating an icon entry and display application for the client adapted for the determined parameter.

There is thus provided in accordance with an exemplary embodiment of the invention, a method of mass cooperation comprising: sending an iconic message by each at least 50 mobile communication devices; and performing an aggregate action response to the messages. Optionally, the aggregate action comprises treating the messages as a voting on icons to add to software on the mobile devices. Optionally, the aggregate action comprises treating the messages as a voting on icon meanings to add to software on the mobile devices. Optionally, the aggregate action comprises generating a public display.

There is thus provided in accordance with an exemplary embodiment of the invention, a method of centralized control of usage of an icon set, comprising: providing at least 1000 mobile devices connected to at least one server adapted to provide icon updates to the mobile devices; and enforcing a usage of at least 50% of an icon set to be common between the mobile devices. Optionally, the enforcing comprises updating icon sets on the mobile devices. Optionally, the enforcing comprises controlling a voting on the icon set by the mobile devices.

There is thus provided in accordance with an exemplary embodiment of the invention, a method of selecting an icon, comprising: displaying a plurality of icons, at least one of which including an indication that it has an opposite; selecting an icon with an opposite by a user; and toggling an image of the selected icon with an opposite thereof.

There is also provided in accordance with an exemplary embodiment of the invention, a method of controlling an external display using a personal communication device, comprising:

providing an external display;

processing an iconic message on a personal communication device to generate at least one instruction for said display;

transmitting said at least one instruction from said personal communication device to said external display responsive to said processing; and displaying on external display in response to said at least one instruction.

In an exemplary embodiment of the invention, transmitting comprises transmitting directly from said personal communication device to said external display.

Alternatively or additionally, said transmitting comprises transmitting to a mediator system.

In an exemplary embodiment of the invention, displaying comprises displaying in response to instructions received from a plurality of personal communication devices.

In an exemplary embodiment of the invention, said at least one instruction comprises an iconic message.

In an exemplary embodiment of the invention, said at least one instruction comprises an instruction associated with at least one icon of said processed iconic message.

In an exemplary embodiment of the invention, said external display includes thereon images for display in response to said instructions.

In an exemplary embodiment of the invention, said external display comprises a visual display.

In an exemplary embodiment of the invention, said external display comprises an audio display.

In an exemplary embodiment of the invention, said external display comprises a worn display.

There is also provided in accordance with an exemplary embodiment of the invention, a method of setting the behavior of icons in an iconic message, comprising:

providing a series of icons as an iconic message; and automatically determining a display behavior of at least one of said icons based on at least one of an identification of another icon in said message and a behavior of another object in said message.

In an exemplary embodiment of the invention, determining comprises determining prior to a sending of said message.

In an exemplary embodiment of the invention, determining comprises determining after receiving and prior to displaying of said message.

In an exemplary embodiment of the invention, determining comprises determining in response to an identification of said another object.

In an exemplary embodiment of the invention, determining comprises determining in response to an animation associated with said another object.

In an exemplary embodiment of the invention, determining comprises synchronizing animation of said at least one icon and said another object.

In an exemplary embodiment of the invention, determining comprises combining said icon and said another object. Optionally, said another object comprises an alphanumerical character.

In an exemplary embodiment of the invention, determining comprises generating a behavior code for sending with said iconic message.

In an exemplary embodiment of the invention, comprising downloading a new visualization from a server based on said determining.

In an exemplary embodiment of the invention, said icons for part of an iconic language with fewer than 1000 symbols.

There is also provided in accordance with an exemplary embodiment of the invention, a method of modifying an iconic language set, comparing:

providing, by a user, a visualization for an iconic symbol of an icon language;

associating, by said user, said visualization with at least one symbol of said iconic language; and saving said association into a hierarchical structure of said iconic language.

Optionally, said association is associated with a manner of navigating said hierarchy to access said symbol by a user.

There is also provided in accordance with an exemplary embodiment of the invention, an iconic language comprising fewer than 1000 symbols, wherein at least 10 of said symbols are represented by acquired images or image sequences and at least 10 of said symbols are represented by graphical icons.

Optionally, the method comprises sending at least 90% of said acquired images by sending codes that represent the images. Optionally, said symbols are associated with different images at different communication devices sharing the iconic language. Optionally, the method comprises editing at least one of said images by a user of a communication device.

There is also provided in accordance with an exemplary embodiment of the invention, a method of translating text messages, comprising:

identifying a string of symbols as a text message word; and replacing said word by one or more iconic symbols.

In an exemplary embodiment of the invention, replacing comprises using two dictionaries, a standard dictionary shared by a plurality of users and a personalized dictionary shared by a subset of said users.

There is also provided in accordance with an exemplary embodiment of the invention, a method of communicating using an iconic language, comprising:

sending an iconic message from a first user to a second user, said sending not using a portable communication device; and displaying a human language interpretation of at least part of said message at least one of said first user and said second user.

In an exemplary embodiment of the invention, sending comprises sending as part of instant messaging.

In an exemplary embodiment of the invention, sending comprises sending between users who do not have a shared human language other than said iconic language.

In an exemplary embodiment of the invention, sending comprises sending as part of a game interaction.

There is also provided in accordance with an exemplary embodiment of the invention, a method of user interface usage, comprising:

providing a system using an alphabetic language for interaction with a user; and replacing at least 10% of alphabetic language interactions with iconic language interactions, wherein the iconic language includes fewer than 1000 symbols.

In an exemplary embodiment of the invention, replacing comprises replacing with animated icons or icon series.

In an exemplary embodiment of the invention, replacing comprises replacing menu items.

In an exemplary embodiment of the invention, replacing comprises replacing system notification items.

There is also provided in accordance with an exemplary embodiment of the invention, a method of updating contact information, comprising:

sending a message from a first user to a second user;

determining by the second user that contact information at the first user is not up to date;

sending updated contact information from said second user to said first user as part of a user initiated response, by said second user, to said message; and updating said contact information at a device of said first user.

In an exemplary embodiment of the invention, said sending a message comprises sending an indication of currentness of contact information.

In an exemplary embodiment of the invention, said sending a message comprises sending an indication of existence of contact information.

There is also provided in accordance with an exemplary embodiment of the invention, a method of peer-to-peer updating of a client communication application, comprising:

sending from a first communication device only a portion of a communication client; and receiving and installing said portion at a second communication client.

In an exemplary embodiment of the invention, said portion comprises visualization data.

In an exemplary embodiment of the invention, sending comprises sending by a direct link.

There is also provided in accordance with an exemplary embodiment of the invention, a method of transmitting an iconic image as part of an iconic message, from a first station to a second station, comprising:

(a) generating a message at a first station, the message including at least an indication of an icon image portion and at least one instruction to modify the display of said icon image portion;

(b) receiving said message at a second station; and (c) displaying said message at said second station, said displaying including modifying said display according to said instruction.

In an exemplary embodiment of the invention, modifying comprises animating. Alternatively or additionally, modifying comprises combining at least two icon image portions into a single icon image. Optionally, said single icon image represents a face.

In an exemplary embodiment of the invention, said indication comprises an icon code.

In an exemplary embodiment of the invention, the method comprises interpreting said instruction according to an identity of said first station. Alternatively or additionally, the method comprises interpreting said instruction according to a personalization of said second station.

There is also provided in accordance with an exemplary embodiment of the invention, a method of icon method processing, comprising:

(a) receiving a first icon stream including at least one icon or other language word in addition to at least one icon;

(b) replacing said at least one icon or word; and (c) display the icon message with the replaced icon or word.

In an exemplary embodiment of the invention, said icon or word are replaced by another icon or word, based on a fixed dictionary. Optionally, said dictionary is personalized. Alternatively or additionally, said icon or word are replaced by a composite icon. Optionally, said composite icon comprises an icon representing a face related to the icon or word. Optionally, said icon or word comprises a pronoun or corresponding language part.

There is also provided in accordance with an exemplary embodiment of the invention, a method of entering an message, comprising:

(a) displaying a plurality of language elements including icons or words;

(b) selecting at least one language element; and (c) in response to said selection, displaying a second plurality of language elements or icons for selection and addition to a message including said selection, wherein at least one of said plurality and said second plurality are provided according to a frequency of use in context.

Optionally, said second plurality comprises at least 5 icons most often used in conjunction with said selection. Alternatively or additionally, said plurality comprises at least 5 most common phrase starting icons.

In an exemplary embodiment of the invention, the method comprises before (a) selecting a category.

Alternatively or additionally, said elements comprise individual icons.

In an exemplary embodiment of the invention, selecting at least one language icon or said selection and adding comprise selecting a series of icons.

There is also provided in accordance with an exemplary embodiment of the invention, a communication device programmed with an iconic language comprising fewer than 1000 symbols, wherein at least 100 of said symbols are fixed and fewer than 300 of said symbols are user-modifiable.

In an exemplary embodiment of the invention, said user-modifiable symbols are arranged in groups of fewer than 30 icons each. Alternatively or additionally, fewer than 50% of said symbols represent emotions. Optionally, the device is programmed to obtain user-modifiable icons from at least one external location.

In an exemplary embodiment of the invention, the above described external device comprises a networked site accessible by a plurality of personal communication devices. Optionally, said site comprises a web site. Alternatively or additionally, said site comprises a WAP site.

BRIEF DESCRIPTION OF THE DRAWINGS

Certain embodiments of the invention will now be described, with reference to the accompanying drawings, in which:

FIGS. 6-10 illustrate schematically exemplary basic screens for composing iconic messages in accordance with certain embodiments of the invention;

FIGS. 13A-13E show an exemplary set of icons, for use in accordance with exemplary embodiments of the invention;

DETAILED DESCRIPTION OF THE INVENTION

Overview

Cellular telephones are used for communications, for example, by sending voice, text and/or images. In an exemplary embodiment of the invention, an iconic set is provided for use when communicating using cellular telephones. In some embodiments, the iconic set is designed to fit the particular needs and/or abilities of cellular telephones and/or other mobile communication devices.

Exemplary Iconic Set Structure

Figure 1:
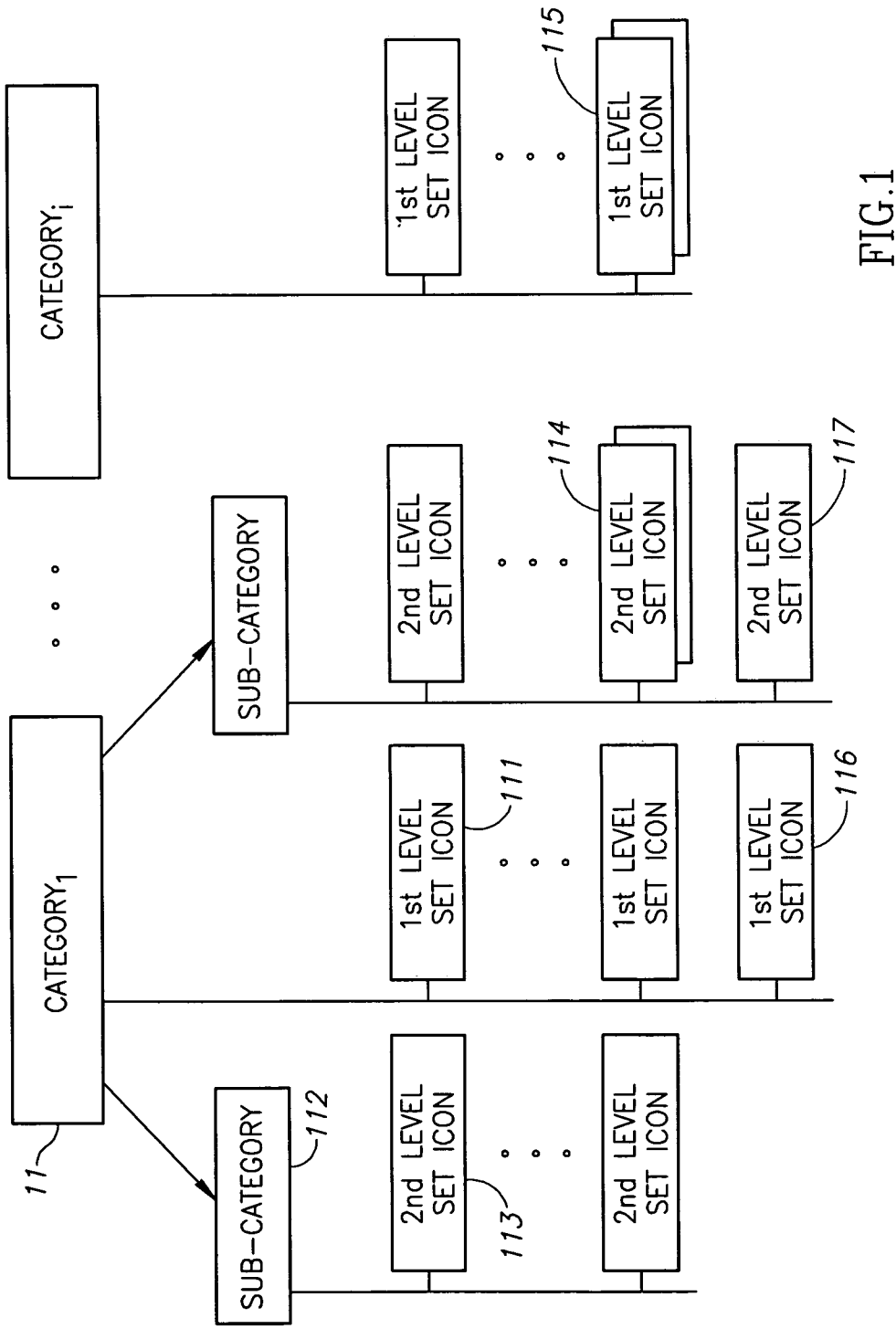
FIG. 1 illustrates a schematic structure of an iconic set for mobile communication in accordance with certain embodiments of the invention.

FIG. 1 illustrates a schematic structure of an iconic set for mobile communication in accordance with certain embodiments of the invention.

In accordance with certain embodiments of the invention, the iconic set comprises a limited number of atomic constituents represented by stylized graphical images and will be referred to hereinafter as "set icons" while in some cases this set is formed from a language and/or may act as a language, this is not essential to all embodiments of the invention. The set icons may represent, for example, objects, actions, abstract concepts, emotions, and/or other conceptual items. Set icons may be arranged into structures (hereinafter "iconic messages") that are analogous to linguistic structures (e.g. sentences, phrases, etc.) but are optionally composed in compliance with set semantics rather than with linguistic rules.

In some embodiments of the invention, the set icons are composed in the iconic messages with no use of grammatical rules and/or prepositions. A potential benefit of some embodiments of the invention is that an individual's capability to compose and/or read the iconic messages may related to an individual's cognitive abilities in the process of assigning meaning to the icons and icons' group (rather than linguistic abilities, which may be generally impaired or impaired for a specific language).

In some embodiments of the invention, the iconic messages may convey a cluster of ideas, possibly without a textual correspondence. In some cases, the non-textual meaning is strong, for example, the icons and/or colors selected may be used to set a mood for the message. In certain embodiments of the invention the iconic messages includes one or more also text segments (e.g. letters, numbers, words), optionally in a natural language.

Referring to FIG. 1, in accordance with certain embodiments of the invention, the set icons are organized under a plurality of categories (11). These categories may be used, for example, for learning the set, recalling the set, entering icons of the set and/or understanding the set. Optionally, icons with a related meaning have similar graphical motifs, for example, a person icon using a pointing finger to indicate "me", "you" or "him" depending on the direction of the finger.

The categories do not necessarily relate to linguistic characteristics as nouns, verbs, etc. In particular, in an exemplary embodiment of the invention, at least 50% of the categories include items which would be considered, based on their meaning, as belonging to actions, relationships and nouns.

While each set category contains at least one set icon; a set icon may be categorized, directly or indirectly, in one or more categories. For example, ambiguous icons and/or commonly used icons belong to more than one category. Such multiple categorizations may be for ease of input and/or for reasons of the icon having multiple uses and/or meanings in the iconic set. In another example, a telephone icon can be used to represent the device and to represent the idea of communication. For example, an icon "kiss" can exist in categories "actions" and "things". In certain embodiments of the invention the meaning of a set icon in iconic message does not depend on the category (and/or sub-category). In other embodiments of the invention higher hierarchical levels may influence the meaning of icons. One example is that the icon "kiss" can mean "kiss" or it can mean "send a kiss" (e.g., fond regards). Optionally, the actual shape of the icon (e.g., at the target device) may depend on the selection method, even if in the sender device, no visual differentiation is made. Alternatively or additionally, the selection method may change the text name shown associated with the icon and/or translation thereof (as described below). It should be noted that a same icon can be used in various ways, for example "car" can be both an action (drive) and a place/object.

It should be noted that in the message as entered and/or as sent, there may be included items that are not strictly icons, for example, display instructions, for example as described below.

A set icon categorized in a respective iconic category is hereinafter referred to as $1^{st}$ level set icon (111, 115, 116). A category may alternatively or additionally have one or more sub-categories (112) containing one or more set icons. A set icon categorized in a respective sub-category, is hereinafter referred to as $2^{nd}$ level set icon (113, 114, 117). In certain embodiments of the invention, an iconic category may contain two or more tiers of hierarchically-related iconic sub-categories, however, this may not be desired in some embodiments or for most of the icons. Optionally, an iconic category simultaneously contains set icons of $1^{st}$ and $2^{nd}$ levels.

In an exemplary embodiment of the invention, an iconic category and/or sub-category may have associated graphical image, hereinafter referred to respectively as a category symbol and a sub-category symbol. In some cases, a same graphical image may also serve as a set icon, for example, for a set icon subordinated to it. In some cases, a message may use a category or sub-category as a set icon in part of a message.

As will be described below, a set icon and/or category may have multiple graphical images associated therewith, for example, for use by different users or by a same user. The images may carry the same meaning and/or be associated with a same name.

In an exemplary embodiment of the invention, in use, some of set icons (e.g. related to feelings and mental actions such as to love, know, need; quantity and degree of characteristics, such as much, very, etc.) may intensify their meaning by being repeated. Some of the set icons with opposite or related meanings (e.g. love/"no love", go/"no go", always/never, yes/no, please/thanks, etc.) may be grouped in pairs wherein the pair may have an associated set icon (114, 115, each shown as a pair of icons). In an exemplary embodiment of the invention, such pairs occupy only a single space in a display and are toggled as needed.

In an exemplary embodiment of the invention, the iconic set is designed so that there is a relative bias towards icons relating to emotions, leisure, self and/or other categories of subjects/concepts. In an exemplary embodiment of the invention, this is based on the premise that for some uses, such as teenage interpersonal communications, a major part of the content is related to a limited number of fields.

In accordance with certain embodiments of the invention, the set icons may have an associated name or several names explaining the icon to the user. In some embodiments, it should be noted that a set icon can carry more meanings and associations than the associated name(s). The set icons may have different names in different natural languages, such as Latin, Cyrillic, pictographic, ideographic and/or phonetic languages. In an exemplary embodiment of the invention, the different names are provided based on the operator and/or based on the original telephone settings (e.g., for roaming). Optionally, the icon changes, for example based on a cultural context. In a particular example for the concept of a bus, in London, a double-decker bus icon is shown, and in New-York, a single-decker bus is shown.

In an exemplary embodiment of the invention, the set icons may have a personalized appearance, for example, a same icon having different images for different users, user groups and/or cultures. In one example, a graphical image for "luck" in the US is money coming out of a slot machine and in China it is a dragon.

The following Table 1 illustrates a particular implementation of the iconic set, organized by categories and sub-categories. The ID column indicates the number of the icon.

The category ID indicates what category (e.g., icon ID) the icon is associated with. "0" means it is a top level category.

The type indicates if the icon is "Category", "Leaf" or "Special. "Special" icons have a complimentary or opposite meaning icon.

The position is a position on a telephone keyboard arrangement of the icon in a 3×3 matrix on the screen. Optionally, a position of "−1" indicates that an "X" (or other symbol) should be overlaid on the root special icon (e.g., according to the category ID) to support negation. In some embodiments, for example, for special icons, the position indicates a location in a special icon sheet to obtain the image from (rather than an "X" mark). Other negative numbers can be used for other overlays.

The name is the text associated with the icon and sometimes displayed along with it, optionally as a 5 pixel high text with one pixel separation from the icon. It can also be overlaid on the icon. The name printed width is optionally limited to the icon Width. Optionally, the names are selected to match the designated screen area for names. In some embodiments, the "+" indicates the icon serves both as a "category" and as a "leaf". Some icons have no name. The names are optionally not sent with an icon from a sender to a receiver, as part of regular messaging. Optionally, if multiple meanings are associated, a small number of bits (e.g., 1, 2, 3,) may be used to indicate which meaning in a list of meanings the receiver should assign. The file name provided in the table can help associate such an icon with FIG. 13. In the actual client, the icons are optionally not arranged in separate files.

Width is the actual width of the icon in pixels, which can be used for centering the icon.

In this example the height is generally 32 pixels (for 32×32 pixel icon displays).

FIGS. 13A-E show an exemplary set of icons which generally matching the following table.

TABLE 1

| I.D. | Category ID | Name | Type | Position | Width | File name |
|---|---|---|---|---|---|---|
| 1 | 0 | People | C | 1 | 7 | m-people.png |
| 2 | 0 | Actions | C | 2 | 17 | m-actions.png |
| 3 | 0 | Places | C | 3 | 19 | m-places.png |
| 4 | 0 | Heart | C | 4 | 19 | m-heart.png |
| 5 | 0 | Time | C | 5 | 21 | m-time.png |
| 6 | 0 | mind | C | 6 | 21 | m-mind.png |
| 7 | 0 | General | C | 7 | 20 | m-general.png |
| 8 | 0 | Descriptions | C | 8 | 18 | m-description.png |
| 9 | 0 | Various | C | 9 | 19 | m-various.png |
| 10 | 1 | me | L | 1 | 27 | me.png |

TABLE 1-continued

| I.D. | Category ID | Name | Type | Position | Width | File name |
|---|---|---|---|---|---|---|
| 11 | 1 | you | L | 2 | 32 | you.png |
| 12 | 1 | us | S | 3 | 32 | us.png |
| 13 | 12 | they | L | 3 | 31 | they.png |
| 14 | 1 | he | L | 4 | 13 | he.png |
| 15 | 1 | she | L | 5 | 13 | she.png |
| 16 | 1 | people | L | 6 | 32 | people.png |
| 17 | 1 | family+ | C | 7 | 27 | mama.png |
| 18 | 1 | my | S | 8 | 27 | my.png |
| 19 | 18 | your | L | 8 | 32 | your.png |
| 20 | 1 | other | C | 9 | 32 | devil.png |
| 21 | 17 | mama | L | 1 | 27 | mama.png |
| 22 | 17 | papa | L | 2 | 19 | papa.png |
| 23 | 17 | friend | L | 3 | 24 | friend.png |
| 24 | 17 | brother | L | 4 | 17 | brother.png |
| 25 | 17 | sister | L | 5 | 27 | sister.png |
| 26 | 17 | girlfriend | L | 6 | 32 | girlfriend.png |
| 27 | 17 | family | L | 7 | 32 | family.png |
| 28 | 17 | baby | L | 8 | 15 | baby.png |
| 29 | 17 | boyfriend | L | 9 | 32 | boyfriend.png |
| 30 | 20 | devil | L | 1 | 32 | devil.png |
| 31 | 20 | god | L | 2 | 32 | god.png |
| 32 | 20 | angel | L | 3 | 30 | angel.png |
| 33 | 20 | osama | L | 4 | 28 | osama.png |
| 34 | 20 | marilyn | L | 5 | 27 | marilyn.png |
| 35 | 20 | albert | L | 6 | 29 | albert.png |
| 36 | 20 | teacher | L | 7 | 30 | teacher.png |
| 37 | 20 | honey | L | 8 | 26 | honey.png |
| 38 | 20 | doctor | L | 9 | 22 | doctor.png |
| 39 | 2 | go-come | L | 1 | 22 | go-come.png |
| 40 | 2 | do | L | 2 | 32 | do.png |
| 41 | 2 | say | S | 3 | 30 | say.png |
| 42 | 41 | ask | L | 3 | 30 | ask.png |
| 43 | 2 | take | S | 4 | 27 | take.png |
| 44 | 43 | give | L | 4 | 32 | give.png |
| 45 | 2 | call | L | 5 | 28 | call.png |
| 46 | 2 | eat | S | 6 | 27 | eat.png |
| 47 | 46 | drink | L | 6 | 27 | drink.png |
| 48 | 2 | Senses | C | 7 | 29 | see.png |
| 49 | 2 | meet | L | 8 | 32 | meet.png |
| 50 | 2 | Other | C | 9 | 32 | sleep.png |
| 51 | 48 | see | L | 1 | 29 | see.png |
| 52 | 48 | hear | L | 2 | 29 | hear.png |
| 53 | 48 | smell | L | 3 | 29 | smell.png |
| 54 | 48 | touch | L | 4 | 28 | touch.png |
| 55 | 48 | taste | L | 5 | 29 | taste.png |
| 56 | 50 | sleep | L | 1 | 32 | sleep.png |
| 57 | 50 | kiss | L | 2 | 27 | kiss.png |
| 58 | 50 | wait | L | 3 | 32 | wait.png |
| 59 | 50 | shop | L | 4 | 17 | shop.png |
| 60 | 50 | relax | L | 5 | 32 | relax.png |
| 61 | 50 | kill | L | 6 | 32 | kill.png |
| 62 | 50 | make-out | L | 7 | 32 | make-out.png |
| 63 | 50 | finish | L | 8 | 32 | finish.png |
| 64 | 50 | work | L | 9 | 32 | work.png |
| 65 | 3 | house | L | 1 | 31 | house.png |
| 66 | 3 | work | L | 2 | 32 | work.png |
| 67 | 3 | car | L | 3 | 32 | car.png |
| 68 | 3 | here | L | 4 | 22 | here.png |
| 69 | 3 | city | L | 5 | 32 | town.png |
| 70 | 3 | there | L | 6 | 25 | there.png |
| 71 | 3 | rest'rant | L | 7 | 31 | restaurant.png |
| 72 | 3 | school | S | 8 | 30 | school.png |
| 73 | 72 | class | L | 8 | 32 | class.png |
| 74 | 3 | Other | C | 9 | 32 | movie.png |
| 75 | 74 | movie | L | 1 | 32 | movie.png |
| 76 | 74 | mall | L | 2 | 31 | mall.png |
| 77 | 74 | toilet | L | 3 | 26 | toilet.png |
| 78 | 74 | cafe | L | 4 | 24 | cafe.png |
| 79 | 74 | army | L | 5 | 30 | army.png |
| 80 | 74 | pub | L | 6 | 27 | pub.png |
| 81 | 74 | beach | L | 7 | 28 | beach.png |
| 82 | 74 | shop | L | 8 | 17 | shop.png |
| 83 | 74 | party | L | 9 | 32 | party.png |
| 84 | 4 | love | S | 1 | 32 | love.png |
| 85 | 84 | hate | L | 1 | 32 | hate.png |
| 86 | 4 | happy | L | 2 | 24 | happy.png |

TABLE 1-continued

| I.D. | Category ID | Name | Type | Position | Width | File name |
|---|---|---|---|---|---|---|
| 87 | 4 | kiss | S | 3 | 27 | kiss.png |
| 88 | 87 | hug | L | 3 | 15 | hug.png |
| 89 | 4 | laugh | L | 4 | 32 | laugh.png |
| 90 | 4 | miss-you | L | 5 | 25 | miss-you.png |
| 91 | 4 | cry | L | 6 | 32 | cry.png |
| 92 | 4 | Positive | C | 7 | 32 | yeah.png |
| 93 | 4 | sad | L | 8 | 24 | sad.png |
| 94 | 4 | Negative | C | 9 | 21 | finger.png |
| 95 | 92 | yeah | L | 1 | 32 | yeah.png |
| 96 | 92 | dancing | L | 2 | 32 | dancing.png |
| 97 | 92 | applause | L | 3 | 29 | applause.png |
| 98 | 92 | hot | L | 4 | 24 | hot.png |
| 99 | 92 | luck | L | 5 | 32 | luck.png |
| 100 | 92 | crazy | L | 6 | 32 | crazy.png |
| 101 | 92 | surprise | L | 7 | 29 | surprise.png |
| 102 | 92 | party | L | 8 | 32 | party.png |
| 103 | 92 | beautiful | L | 9 | 32 | beautiful.png |
| 104 | 94 | finger | L | 1 | 21 | finger.png |
| 105 | 94 | shut-up | L | 2 | 31 | shut-up.png |
| 106 | 94 | boring | L | 3 | 28 | boring.png |
| 107 | 94 | pain | L | 4 | 31 | pain.png |
| 108 | 94 | shit | L | 5 | 27 | shit.png |
| 109 | 94 | despair | L | 6 | 30 | despair.png |
| 110 | 94 | jealous | L | 7 | 24 | jealous.png |
| 111 | 94 | anger | L | 8 | 32 | anger.png |
| 112 | 94 | sick | L | 9 | 32 | sick.png |
| 113 | 5 | now | L | 1 | 32 | now.png |
| 114 | 5 | always | L | 2 | 29 | always.png |
| 115 | 5 | never | L | 3 | 29 | never.png |
| 116 | 5 | earlier | L | 4 | 29 | earlier.png |
| 117 | 5 | Minutes | C | 5 | 29 | time.png |
| 118 | 5 | later | L | 6 | 29 | later.png |
| 119 | 5 | Days | C | 7 | 31 | sun.png |
| 120 | 5 | soon | L | 8 | 28 | soon.png |
| 121 | 5 | Other | C | 9 | 32 | evening.png |
| 122 | 117 | time | L | 1 | 29 | time.png |
| 123 | 117 | — | L | 2 | 29 | clock2.png |
| 124 | 117 | — | L | 3 | 29 | clock10.png |
| 125 | 117 | — | L | 4 | 29 | clock15.png |
| 126 | 117 | — | L | 5 | 29 | clock30.png |
| 127 | 117 | — | L | 6 | 29 | clock45.png |
| 128 | 117 | — | L | 7 | 29 | clock60.png |
| 129 | 117 | — | L | 8 | 31 | clock120.png |
| 130 | 119 | — | L | 1 | 31 | sun.png |
| 131 | 119 | — | L | 2 | 31 | mon.png |
| 132 | 119 | — | L | 3 | 31 | tue.png |
| 133 | 119 | — | L | 4 | 31 | wed.png |
| 134 | 119 | — | L | 5 | 30 | thu.png |
| 135 | 119 | — | L | 6 | 31 | fri.png |
| 136 | 119 | — | L | 7 | 31 | sat.png |
| 137 | 119 | birthday | L | 8 | 31 | birthday.png |
| 138 | 119 | day | L | 9 | 31 | day.png |
| 139 | 121 | yesterday | L | 1 | 31 | yesterday.png |
| 140 | 121 | today | L | 2 | 31 | today.png |
| 141 | 121 | 2morrow | L | 3 | 32 | tomorrow.png |
| 142 | 121 | morning | L | 4 | 32 | morning.png |
| 143 | 121 | noon | L | 5 | 31 | noon.png |
| 144 | 121 | evening | L | 6 | 32 | evening.png |
| 145 | 121 | night | L | 7 | 32 | night.png |
| 146 | 6 | think | S | 1 | 30 | think.png |
| 147 | 146 | hope | L | 1 | 32 | hope.png |
| 148 | 6 | want | L | 2 | 32 | want.png |
| 149 | 6 | know | L | 3 | 32 | know.png |
| 150 | 6 | problem | S | 4 | 32 | problem.png |
| 151 | 150 | no-prob | L | 4 | 32 | no-problem.png |
| 152 | 6 | can | L | 5 | 32 | can.png |
| 153 | 6 | start | S | 6 | 29 | start.png |
| 154 | 153 | stop | L | 6 | 29 | stop.png |
| 155 | 6 | sorry | L | 7 | 32 | sorry.png |
| 156 | 6 | thankyou | L | 8 | 22 | thank-you.png |
| 157 | 6 | please | L | 9 | 29 | please.png |
| 158 | 7 | hi-bye | S | 1 | 29 | hi-bye.png |
| 159 | 158 | wassup | L | 1 | 32 | whassup.png |
| 160 | 7 | — | S | 2 | 17 | question.png |
| 161 | 160 | — | L | 2 | 11 | exclamation.png |
| 162 | 7 | — | S | 3 | 27 | no.png |
| 163 | 162 | — | L | 3 | 21 | yes.png |
| 164 | 7 | Where | L | 4 | 29 | where.png |
| 165 | 7 | — | L | 5 | 7 | dot.png |
| 166 | 7 | — | L | 6 | 28 | type.png |
| 167 | 7 | Questions | C | 7 | 29 | when.png |
| 168 | 7 | with | S | 8 | 26 | with.png |
| 169 | 168 | without | L | 8 | 32 | without.png |
| 170 | 7 | Other | C | 9 | 31 | ok.png |
| 171 | 167 | when | L | 1 | 29 | when.png |
| 172 | 167 | who | L | 2 | 11 | who.png |
| 173 | 167 | wassup | L | 3 | 32 | whassup.png |
| 174 | 167 | what-why | L | 4 | 31 | what-why.png |
| 175 | 167 | where | L | 5 | 29 | where.png |
| 176 | 170 | ok | L | 1 | 31 | ok.png |
| 177 | 170 | and | L | 2 | 27 | and.png |
| 178 | 170 | maybe | L | 3 | 29 | maybe.png |
| 179 | 170 | but | L | 4 | 32 | but.png |
| 180 | 170 | or | L | 5 | 32 | or.png |
| 181 | 170 | if | L | 6 | 32 | if.png |
| 182 | 170 | — | L | 7 | 21 | yes.png |
| 183 | 8 | good | S | 1 | 25 | good.png |
| 184 | 183 | bad | L | 1 | 25 | bad.png |
| 185 | 8 | much | S | 2 | 32 | much.png |
| 186 | 185 | little | L | 2 | 21 | little.png |
| 187 | 8 | beautiful | S | 3 | 32 | beautiful.png |
| 188 | 187 | ugly | L | 3 | 24 | ugly.png |
| 189 | 8 | smart | S | 4 | 32 | smart.png |
| 190 | 189 | stupid | L | 4 | 32 | stupid.png |
| 191 | 8 | big | 5 | 5 | 32 | big.png |
| 192 | 191 | small | L | 5 | 14 | small.png |
| 193 | 8 | importnt | L | 6 | 32 | important.png |
| 194 | 8 | Amount | C | 7 | 23 | a-bit.png |
| 195 | 8 | same | S | 8 | 31 | same.png |
| 196 | 195 | different | L | 8 | 31 | different.png |
| 197 | 8 | Other | C | 9 | 31 | new.png |
| 198 | 194 | a-bit | L | 1 | 23 | a-bit.png |
| 199 | 194 | some | L | 2 | 23 | some.png |
| 200 | 194 | lots | L | 3 | 31 | lots.png |
| 201 | 194 | all | L | 4 | 32 | all.png |
| 202 | 197 | new | L | 1 | 31 | new.png |
| 203 | 197 | old | L | 2 | 32 | old.png |
| 204 | 197 | fast | L | 3 | 32 | fast.png |
| 205 | 197 | fat | L | 4 | 29 | fat.png |
| 206 | 197 | thin | L | 5 | 17 | thin.png |
| 207 | 197 | slow | L | 6 | 32 | slow.png |
| 208 | 197 | expensive | L | 7 | 31 | expensive.png |
| 209 | 197 | cheap | L | 8 | 21 | cheap.png |
| 210 | 197 | sweet | L | 9 | 32 | sweet.png |
| 211 | 9 | Leisure | C | 1 | 31 | tv.png |
| 212 | 9 | zlango | L | 2 | 32 | zly.png |
| 213 | 9 | Things | C | 3 | 32 | thing.png |
| 214 | 9 | money | L | 4 | 30 | money.png |
| 215 | 9 | time | L | 5 | 29 | time.png |
| 216 | 9 | food | L | 6 | 32 | food.png |
| 217 | 9 | private | C | 7 | 32 | tits.png |
| 218 | 9 | Move | C | 8 | 32 | buss.png |
| 219 | 9 | Animals | C | 9 | 32 | cat.png |
| 220 | 211 | tv | L | 1 | 31 | tv.png |
| 221 | 211 | movie | L | 2 | 32 | movie.png |
| 222 | 211 | music | L | 3 | 32 | music.png |
| 223 | 211 | smoke | L | 4 | 31 | smoke.png |
| 224 | 211 | zlango | L | 5 | 32 | zly.png |
| 225 | 211 | grass | L | 6 | 32 | grass.png |
| 226 | 211 | e-mail | L | 7 | 32 | e-mail.png |
| 227 | 211 | im | L | 8 | 30 | im.png |
| 228 | 211 | call | L | 9 | 28 | call.png |
| 229 | 213 | thing | L | 1 | 32 | thing.png |
| 230 | 213 | boom!!! | L | 2 | 32 | boom!!!.png |
| 231 | 213 | idea | L | 3 | 27 | idea.png |
| 232 | 213 | nothing | L | 4 | 32 | nothing.png |
| 233 | 213 | gift | L | 5 | 31 | gift.png |
| 234 | 213 | flower | L | 6 | 20 | flower.png |
| 235 | 217 | lemons | L | 1 | 32 | tits.png |
| 236 | 217 | peaches | L | 2 | 31 | ass.png |
| 237 | 217 | make-out | L | 3 | 32 | make-out.png |
| 238 | 217 | cucumber | L | 4 | 31 | penis.png |

TABLE 1-continued

| I.D. | Category ID | Name | Type | Position | Width | File name |
|---|---|---|---|---|---|---|
| 239 | 217 | eggs | L | 5 | 31 | balls.png |
| 240 | 218 | bus | L | 1 | 32 | buss.png |
| 241 | 218 | car | L | 2 | 32 | car.png |
| 242 | 218 | airplane | L | 3 | 32 | aeroplane.png |
| 243 | 218 | train | L | 4 | 32 | train.png |
| 244 | 218 | taxi | L | 5 | 32 | taxi.png |
| 245 | 219 | cat | L | 1 | 32 | cat.png |
| 246 | 219 | shark | L | 2 | 32 | shark.png |
| 247 | 219 | cow | L | 3 | 32 | cow.png |
| 248 | 219 | teddy | L | 4 | 32 | teddy.png |
| 249 | 219 | chicken | L | 5 | 22 | chicken.png |
| 250 | 219 | roach | L | 6 | 32 | roach.png |
| 251 | 219 | pig | L | 7 | 32 | pig.png |
| 252 | 219 | bitch | L | 8 | 31 | bitch.png |
| 253 | 219 | monkey | L | 9 | 32 | monkey.png |

In an exemplary embodiment of the invention, the positions of the icons on the screen depend on the preferred data entry methods. For example, for a scrolling based data entry method, a most commonly used icon is optionally positioned underneath the location of its parent category or at a default location on the screen (e.g., center). For key-mapping based input, the most commonly used icon is preferably mapped to the same key as used to select its parent category, so that a double-click can select that key.

In an exemplary embodiment of the invention, the icon for the category/sub-category is selected to be the most commonly used on in the level below or a nicest one or one which has a significant differentiation form other icons expected to be on a screen at a same time.

Figure 2:
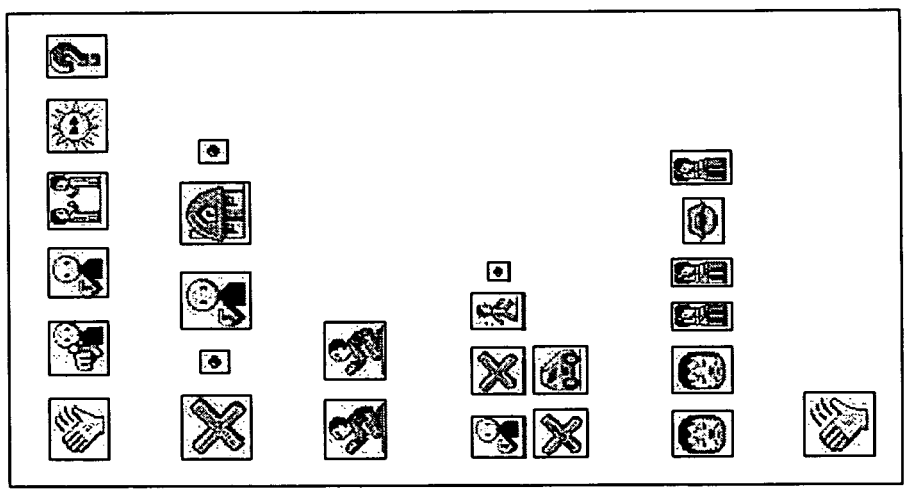
FIGS. 2 and 3 illustrate exemplary phrases and dialogs in accordance with certain embodiments of the invention.
Figure 3:
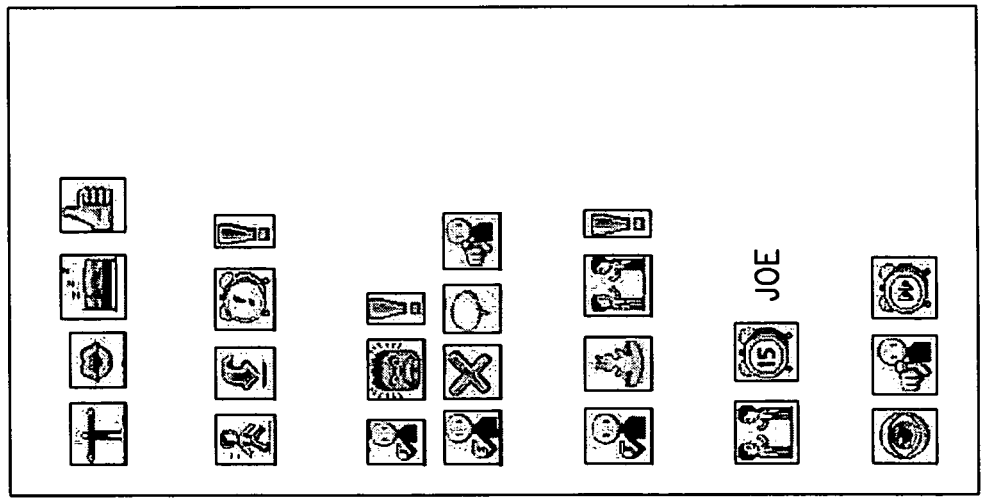

FIG. 2 illustrates an exemplary dialog in accordance with an embodiment of the invention and set icons illustrated in Table 1 (and FIG. 13). The dialog contains several iconic messages (left side of the figure) and their likely translation into English (right side of the figure). FIG. 3 illustrates, in a similar manner, another exemplary dialog in accordance with an embodiment of the invention and a set of icons, in which a short text segment "joe" is used as part of the dialog.

Mobile Devices

In an exemplary embodiment of the invention, the icon set is used on mobile devices that are characterized by a relatively small screen and a relatively small number of entry keys. However, some mobile devices and/or other devices which can be used with embodiments of the invention are not limited in screen size and/or keyboard. In an exemplary embodiment of the invention, the number of keys is smaller than 70, smaller than 20 or intermediate numbers and the screen size is less than 10×10 cm, less than 6×6 cm, less than 4×4 cm or intermediate numbers. In an exemplary embodiment of the invention, substantially smaller screen sizes are supported, for example, 3×3 cm screen sizes. In an exemplary embodiment of the invention, the screen is large enough to show a 3×3 matrix of icons, with a resolution of at least 8 or at least 16 pixels on a side. Screen resolution is optionally less than 500×500, less than 200×200, less than 100×100 or smaller or intermediate sizes. Non-square screens may be for some embodiments of the invention, the shape of the screen may determine, for example, if a message is displayed as a new icon is being selected for it or not.

In some embodiments of the invention, the mobile devices have a larger screen, for example, 15×15 cm, 20×20 cm or larger and/or include a projector or other means to emulate a larger screen. Optionally, the weight of the mobile device is smaller than 500 gram, 300 gram, 100 gram or intermediate values. Alternatively or additionally, the volume of the mobile device is less than 500 cc, 300 cc, 200 cc, 100 cc or intermediate volumes.

In an exemplary embodiment of the invention, icon resolution (e.g., size and/or color) is modified according to the target device. Optionally, a sender can view an effective message size on a target device. Optionally, information about the target device is stored in a contacts list or is provided by a server. Optionally, a message can be sent to a server for modification to what a target can received and preview by the sender, prior to confirming sending by the sender. Optionally, icons are drawn in several sizes, including, for example, one or more of 16×16, 32×32 and 48×48, and/or in several colors, for example, one or more of b/w, gray-scale, low-res color and hi-res color. Optionally, icon size may be changed within a message or depending on the viewing ability. Non-rectangular icon images may be used as well.

It should be noted that smaller screens can be useful in the practice of the invention. In one example, a single icon display is provided, for example, on a watch. Icons are optionally shown sequentially. Alternatively, smooth scrolling is provided. In some cases, for example, when the display is non-graphical, icon IDs and/or names may be displayed. Alternatively or additionally, icons may be displayed, but selection is by key entry or non-graphical menus.

In an exemplary embodiment of the invention, a limited input is used, for example, as few as two distinct input keys may be used: one for selecting a next item and one for traversing a menu tree. Once a leaf is reached, it is selected. Optionally, a greater number of input keys is provided, for example "clear" and back".

Optionally, an icon menu is used for sending text message by a user selecting icons from a menu and then text and/or audio being sent instead of or in addition to icons.

Exemplary Considerations for Set Simplification and Structure

An icon set can be generated and/or used in various ways. In an exemplary embodiment of the invention, the icon set is used to present concepts, some of which may have a cultural or personal meaning and some of which may have a cross-cultural meaning. In some embodiments of the invention, the icon set reflects a restricted form of an existing language, for example, English or Chinese. For Chinese, existing pictograms may be used as icons, optionally embellished and/or colorized. Optionally, however, icons that are not found as pictograms in the language are used. For English, icons are optionally selected to match the cultural meaning thereof.

In an exemplary embodiment of the invention, the icon set has the complexity and/or other characteristics of a pidgin language.

In some embodiments of the invention, the icon set serves as a limited alphabet or hieroglyphics, which allows various words of a language to be written but is limited in that that a significant portion of the language cannot be written, for example, at least 90% or at least 70% or 80% of the nouns, verbs and/or adjectives of the language may be missing.

Following are a list of rules, one or more of which are optionally used to pare down and/or construct an icon set for limited communications. As noted, the rules and/or organization methods may also be used for simplifying existing languages, such as Chinese and languages that use ideographs and/or pictographs.

(a) Identify core concepts and include such concepts in the set.

(b) Select concepts to sparely cover a semantic space. Optionally, extra concepts are selected (e.g., higher density) for areas of greater importance in communications, for example, as used in SMS communications between teenagers. As described below, in an exemplary embodiment of the invention, the set specifically includes icons relating to people, places and/or times, which may assist in coordinating between people and/or coordination of meetings. One particular example is the icon "soon", which is useful for coordinating meetings.

(c) Core concepts arranged in a relatively small number of categories, for example, between 5 and 20, for example, 13 or less. Optionally the rule of 7+2 (that a person can only recall 7+2 items in working memory) is followed, such that 9 concept categories are used and each concept category has 9 concepts and/or sub-categories therein. This may assist in remembering the structure of the set and/or help in searching a screen for concepts. In some cases, Personal concepts/icons may be provided as separate categories.

(d) At least some core concepts arranged in a hierarchal manner, such that concept can stand on its own (e.g., family) and also be specified more clearly (e.g., father). Optionally, a same icon is used both for concept and for one of its specific examples.

(e) Select core concepts and/or their icons to follow body parts and/or body language, such as pointing, emotion and showing size with hands.

(f) Provide an escape mechanism—text symbol strings for example, to support concepts and details not provided in the set. Such symbols may also be used to reduce ambiguity.

(g) Remove all or part (e.g., at least 50%) of one or more grammatical structures that remove ambiguity by linking words or sentence parts, e.g., using time, sex, social standing, plural indicators, particles, punctuation marks (ellipse, hyphens, commas, semi-colons) and/or relation words.

(h) Provide time indications using a separate set of time indicators.

(i) Provide plural indicators using repetition (e.g., mama mama→grandma) or separate amount indicators.

(j) Resulting verbs do not need conjugation. Optionally, such verbs are used as concepts that may also be used as nouns and modifiers.

(k) Focus on concepts that support descriptions of the form "X action Y". This also relates to simplifying the set so that complex sentences cannot be constructed with it. In an exemplary embodiment of the invention, icons are selected so that sentences can be formed to include subject, action and recipient of the action. However, optionally many messages actually constructed are not of this form and/or in this order.

(l) By avoiding/reducing sufficient tools that normally remove ambiguity in communications, the possibility of generating grammatically incorrect sentences is considerably reduced or negated. This is typically a different tradeoff from typical languages where the tradeoff between ambiguity and grammar is different—a more complex grammar is provided, so as to reduce ambiguities to where desired.

(m) Names selected for use with icons are optionally selected to be as broad as possible. For example, choosing "query" as a concept instead of separate "what" and "why" concepts. As noted herein, users may be educated in the broad meaning of concepts by being provided with examples on the go, for example, multiple alternating names may be displayed for a single icon.

(n) Names are selected for concepts in a manner which will emphasize the non-standard aspects of the set, for example, selecting names that will probably not form a correct sentence. One example is "me" "no" "want" instead of "I" "don't" "want". While this is in some part a direct result of reducing conjugates, this can serve to focus the reader/writer on the concepts, rather than on grammar.

In an exemplary embodiment of the invention, one, two, three, four or more of the following categories are used. It is noted that depending on the usage, sub categories may be elevated to categories or vice versa, optionally with categories converted into sub-categories depending on the number of instantly displayed categories and/or relative frequency of use of icons from each category:

(a) emotions;
(b) people;
(c) time;
(d) self (and parts);
(e) basic actions—daily and/or emotionally related actions, such as eat and kiss;
(f) common places (home, school);
(g) mental (thank you, want, can, hope, stop/go);
(h) miscellaneous (optionally including language parts and modifiers);
(i) descriptors (big, small, ugly);
(j) animals;
(k) leisure activities;
(l) things that move;
(m) private (icons that hint at human body private parts); and/or
(n) user defined category.

In an exemplary embodiment of the invention, a small number of icons is used, for example, fewer than 256 icons cover 80%, 90% or more of the icons used in icon communications. Smaller sets, such as 200, 100 or intermediate numbers may be used as well.

In an exemplary embodiment of the invention, these and/or other statistical definitions of icon usage are defined over a suitably large set of messages. In some cases, such statistics may be defined over a single user or server and/or a time period, for example, 1000, 10000 or more messages and/or within 20 minutes, 1 hour or 30 days.

In an exemplary embodiment of the invention, the icons are selected to have a relatively low screen resolution, for example 32×32 pixels.

Message Input Example

An exemplary process of selecting the desired set icons and composing an iconic message is further illustrated in FIGS. 6-10. In this example, the selection of a set icon is facilitated through the selection of a category. Special shortcuts may be implemented, for example, one or more of:

(a) doubling an icon (e.g., a short press on a scrolling joystick, while a curser is at the edit strip);
(b) selecting an icon within a pair of icons (e.g., toggling between pairs of icons using a short click; and/or
(c) end of phrase icons (e.g., selecting between multiple punctuation marks by pressing the "*" key.

The method of selecting optionally include one or more of a key for "select", a key for "cycle" or "negate" and/or a key that show meaning. Other common operations may also have special keys or other shortcuts (e.g., push joystick up while pressing a key).

In certain embodiments of the invention the number of concurrently displayed category symbols is not larger than a number of input keys in the input interface of the mobile device, and each displayed category is associated with an input key on a one-to-one correspondence. Optionally, the screen is mapped to the input keys in a visual matching where the layout of the screen is mapped to the layout of the input keys used. In some embodiments, the total number of category symbols may exceed the number of the input keys and the user may scroll to the desired category symbol(s) with the help of displayed navigation commands or/and with the help of the navigation keys of the input interface. Alternatively or additionally, some keys such as the '0' key are assigned to display community (e.g., group) or private icons/categories (e.g., a cache). Alternatively or additional, multiple clicks or a long clicks may be used to select different categories using the same key. This may be useful, for example, to select between two sets of icons associated with a same category (e.g., short click is the first set or click soon after pervious click means "next set") or for providing mapping of multiple categories to a single key. Such mapping may be used to elevate sub-categories to the level of categories. For example, replace "various" with sub-categories of "leisure" and "school", with a placeholder of "things we do", that can, for example, toggle (e.g., manually or automatically) between "school" and "leisure".

FIGS. 6 through 10 sequentially and schematically illustrate by way of non-limiting examples exemplary screens of a message composing process, in accordance with certain embodiments of the invention. The process may also include navigation, control and/or edit commands not illustrated in the drawings. In an exemplary embodiment of the invention, the editing screens have a similar look and logic and may differ by the represented commands. In particular, the message being entered may or may not be available while selecting a new icon, for example, responsive to available screen space and/or icon size.

Figure 4:
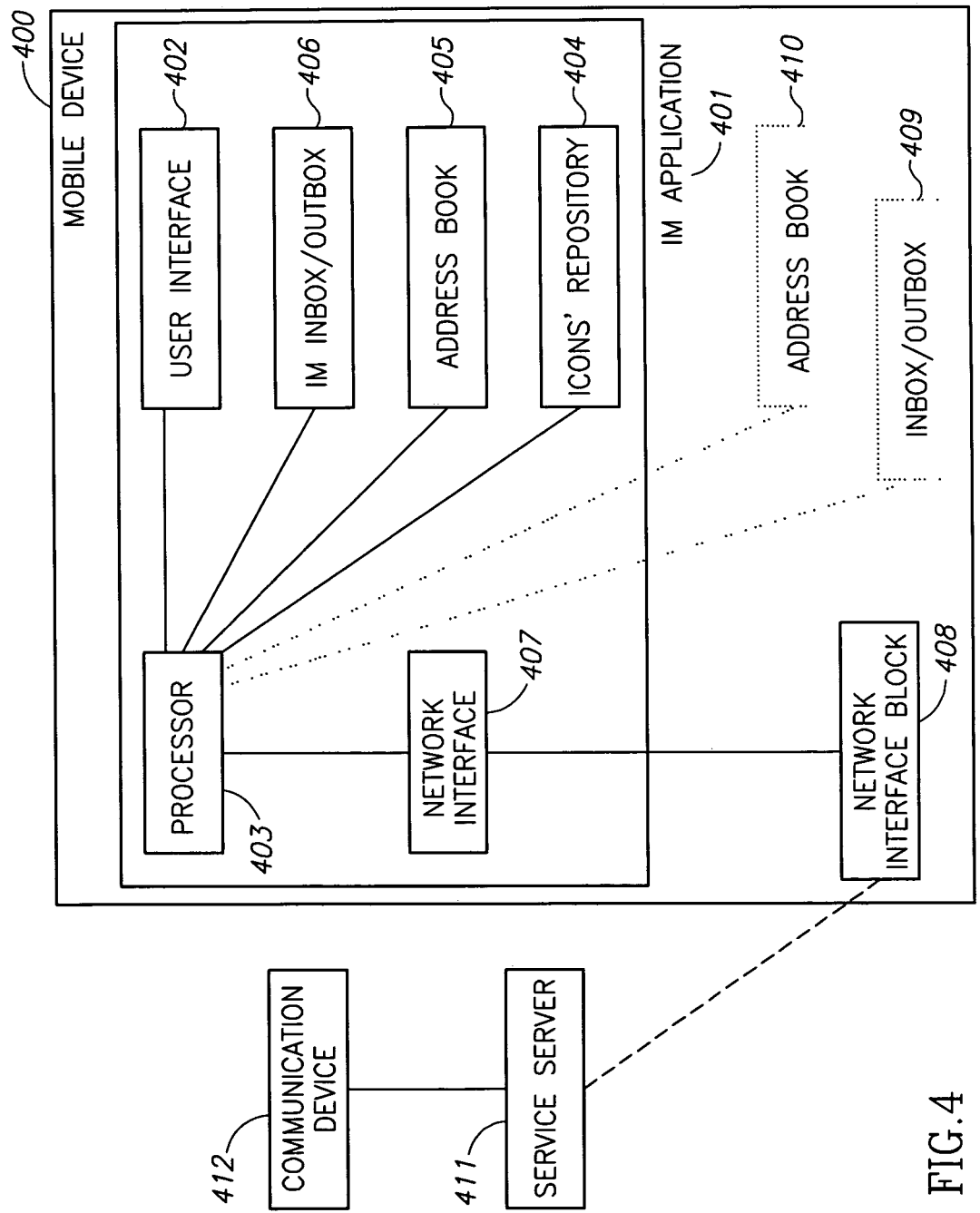
FIG. 4 illustrates a generalized block diagram of an exemplary functional architecture of a computer application product for incorporation in a mobile device, in accordance with certain embodiments of the invention.

All the illustrated screens display the results initiated by the user via the input interface and facilitated by the user interface, which is functionally associated with the input interface and the display of the mobile device, in conjunction with the processor coupled with the application modules as described in FIG. 4.

FIG. 6A provides an initial view of a composing screen representing category symbols. In certain embodiments of the invention, the number of concurrently displayed category symbols is not more than the number of input keys in the input interface of the mobile device and each displayed category is associated with an input key in a one-to-one correspondence. In the illustrated example, the number of concurrently displayed categories is limited to 9 (the number of keys). Specific user interface buttons may be used for "level up" and "level-down/select" functions. Alternatively or additionally, scrolling buttons or joysticks are used for such functions.

Optionally, a touch-screen, pen interface and/or other user interface mechanisms are used to select icons/categories. Optionally, the number of displayed icons is limited by the screen, rather than by the number of keys.

Optionally, the total number of category symbols and/or simultaneously available set icons may exceed the number of input keys. Optionally, a user can scroll to the desired category symbol(s) with the help of displayed navigation commands or/and with the help of navigation keys (or joystick) of the input interface. Optionally, the keys are re-assigned to icons/categories as the screen scrolls.

In an alternative input method, a joystick or scroll keys are used to scroll a "selection" indicator (e.g., a frame or brackets) between the icons/categories. Selection is optionally by pressing a suitable key and/or by waiting. In some embodiments, the "selection" indicator is permanent and the icon set is scrolled so that the indicator covers a particular item. In some embodiments, rather than a visual indicator, indication is provided by changing a size, color and/or other display attributes of the currently selected icon.

In an exemplary embodiment of the invention, icons are provided in multiple sizes and/or qualities. In some uses, the icons are shown at a lower resolution and/or quality and when a particular icon is selected, that icon increases in size/resolution. This may be used for screens where a user is expected to be familiar with the contents and the lower resolution icons serve as reminders. One example of interfaces where small icons may serve as mnemonics are menus (which optionally enlarge the icons if a user does not select anything). Another example is a message that the user just composed. This mechanism of icon size modification may be used, for example, in linear and in two dimensional displays of icons.

In certain embodiments of the invention, a user can configure the composing screen to display the most frequently used category and/or icon symbols. In certain embodiments of the invention, a display configuration to match usage frequency is provided by default and/or be updated (constantly or periodically) by the application, for example, based on the user's experience and/or on other users. Optionally, a user has the option of accepting a change in display configuration.

The selection of a category symbol leads to presenting the next tier of graphical images.

FIG. 6B provides a view of a composing screen after selection of category #3, wherein the next tier (in the illustrated case) has no subordinated sub-categories and contains only $1^{st}$ level set icons.

In certain embodiments of the invention, a message area (illustrated at the upper parts of the screen) representing the composing or editing message may be presented by all screens or by part of the screens, for example, according to user's convenience considerations (e.g., available display area) and/or settings. Coordinates (including size) of the screen specified for message area optionally differ, e.g. in different or same mobile device models, for example in accordance with user and/or service provider preferences and/or in accordance with utilization ability and/or need of available space. In an exemplary embodiment of the invention, software (e.g., at the mobile device) is used to read the display size from the device. Alternatively, a user sets display settings according to his preferences.

FIG. 6C (and the same screen illustrated in FIG. 7A) provides a view of a composing screen representing category symbols and a message area after the user has selected set icon #4 (from the category #3).

Selection of set icon (in any screen) optionally leads to its representation in the message area as part of the iconic message. Optionally, a sound, for example a speech element, associated with the icon is sounded when the icon is indicated and/or selected. Alternatively or additionally, an animation of the icon is provided for such icons. Sequentially selected set icons are optionally sequentially represented within the iconic message. Optionally, movement keys or a scrolling mechanism are provided to allow the user to edit the message, for example, to delete, insert and/or move icons within a message. Optionally, the editing is provided in a separate mode.

Figure 7A:
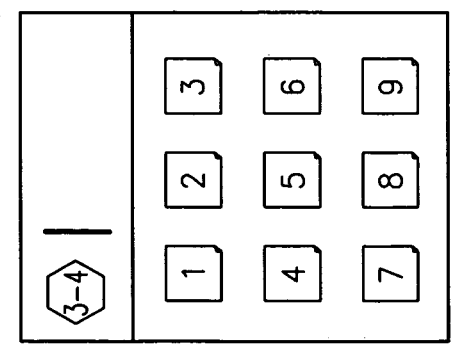
Figure 7B:
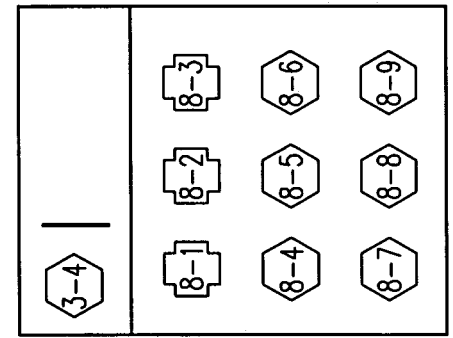
Figure 7C:
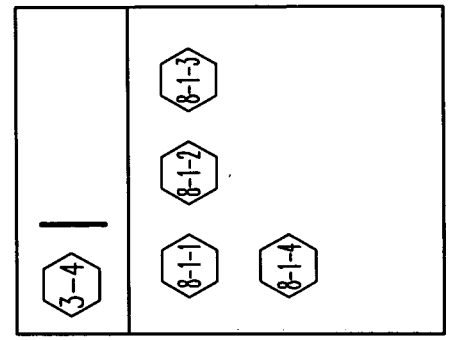
Figure 7D:
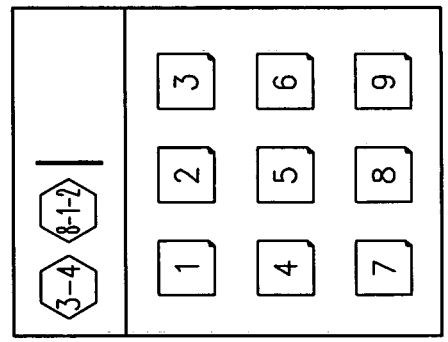

FIG. 7B provides a view of a composing screen after the selection of category #8, wherein the next tier (in the illustrated case) contains subordinated sub-categories as well as $1^{st}$ level set icons. The selection of sub-category symbol (#1) leads to presenting the next tier of graphical images –$2^{nd}$ level set icons as illustrated in FIG. 7C. FIG. 7D (the same screen is illustrated in FIG. 8A) provides a view of a composing screen representing category symbols and a message area after the user selection of set icon #2 (from the sub-category #1 subordinated to category #8).

As indicated above, in an exemplary embodiment of the invention, the number of concurrently displayed graphical images (category symbols, sub-category symbols, set icons or their combination) does not exceed the number of input keys in the input interface of the mobile device and each concurrently displayed graphical image is associated with an input key in a one-to-one correspondence. In the illustrated example the number of concurrently displayed graphical images is limited by 9 and each of them is associated with 1 through 9 alphanumerical keys respectively.

In some embodiments, the total number of concurrently displayed graphical images may exceed the number of the input keys. Optionally, the user scrolls to the desired image (e.g., symbol or set icon) with the help of displayed navigation commands or/and with the help of the navigation keys of the input interface. In certain embodiments of the invention, a user may configure the composing screen to display the symbols and icons most in use. In certain embodiments of the invention, this configuration may be provided and constantly and/or periodically updated by the application. Optionally, user approval is required for updating a display configuration.

The icons may be arranged to increase the speed of use. For example, putting the main icon of a sub category on the same place as it's mother icon allows the user to use double click to select such an Icon (e.g., "mother" is the same icon image as "family"). Another option is to toggle a key for selecting the correct icon from few alternatives that belongs to the same general use, such as '*', '?' and '!' (e.g., punctuation).

FIG. 8B provides a view of the composing screen after selection of "text segment" option. "Text segment" option may be activated and ended with the help of a designated key (e.g. "#" key in the illustrated case) or with the help of managing commands. The screen may contain a text box for writing and editing text in a manner facilitated by the mobile device (FIG. 8C). In certain embodiments of the invention, the text box may occupy the full screen while in other embodiments the size and placement of the text box may be customized. The text segment may be further incorporated in the iconic message as illustrated in FIG. 8D. The text segment may contain date and time. Activation of "insert time & date" option is provided in a similar manner and allows the user to insert time and/or date in a designated format.

The text segment may contain any text elements, such as letters, numbers, words, punctuation marks, etc. and be positioned at any place within the iconic message, e.g. before, between and/or after the set icons.

Depending on the size of the message area, set icons and fonts as well as on the user's preferences, the text segment may be displayed in one line or in a wrapped manner (e.g. 2 lines as illustrated in FIG. 9A), the set icons in the iconic message may be condensed or the message may be represented partly (with scrolling capability).

In an exemplary embodiment of the invention, an icon message can be of varying length, for example, 1 icon, more than 3 icons, more than 10 icons, more than 30 icons or intermediate numbers. In some cases, a single message may be limited in length, for example, as SMS messages are. Optionally, chained messages are used to overcome length limitations.

Optionally, one or more text attributes may be set by the user, for example, setting in general, settings for the message, settings for a text section and/or settings for a text symbol. Optionally, the setting are implemented by sending an attribute setting code or stream of codes in the data stream of the message, when sent. Optionally, the settings are applied by a user using one or more of the following methods: to selected text or for following entered text or for just entered text.

In an exemplary embodiment of the invention, text symbols and set icons are modifiable by a same or overlapping sets of attributes, including, for example, one or more of: font type, size, color, blinking, position, animation and/or other effects as described herein. In an exemplary embodiment of the invention, a scaling factor is specified to dynamically resize the set icons and/or iconic message. Optionally, the factor is provided during composing and/or editing the iconic message. Optionally, such a factor is used during composing and/or editing, for example, to emphasize the currently edited icon.

Optionally, the text rendering using the attributes is based on fonts that are pre-stored in the target device. Alternatively, other methods, such as suggested herein for unsupported icons, are used. In particular, the interpretation of format settings may be left to the target device, for example, changing colors according to a local preferred color set, blink rate and/or size (e.g., relative to a target display size).

In an exemplary embodiment of the invention, the ratio of icons to text is relatively large. For example, over a set of messages including 1000 symbols, it may be expected that at least 50%, at least 70%, at least 90%, at least 95% or smaller, greater or intermediate percentages of the symbols be icons, rather than text symbols. Optionally, text segments are delimited by special "start" and "end" symbols. Alternatively, a symbol and a length counter may be used. Alternatively, a standard symbol delimiter may be provided after a text sequence. Alternatively or additionally, the icon set may include letters as part of the icons.

Icon Alternate Sets, Pairs and Combinations

FIG. 9B illustrates a case where some of the set icons are grouped in pairs, wherein each pair has an associated set icon (P2 type), as set icon 6-8 in the illustrated case. Selection of this set icon may lead to presentation of both set icons contained in the pair (FIG. 9C). In certain embodiments of the invention, one of the icons may be configured as default set icon and be selected automatically if the user has not selected the other within a certain period of time. In some embodiments of the invention, only the default icon from the pair may be presented while the other may be further selected (e.g. by double pressing on the input key associated with the "pair" set icon). In certain embodiments illustrated in FIG. 9D the selection of the first icon in the pair may be provided by pressing "0" or waiting, selection of the second icon from the pair may be provided by pressing "8" again, and then pressing "0" or waiting.

One example is opposite meanings, such as "love"/"hate" and "good"/"bad", which may be provided as pairs and toggled between. Another example is punctuation which may be provided as a set of more than 2 alternate punctuation symbols.

FIG. 10(A-D) illustrates a case when some of the set icons provided as pairs, for example, where a second icon of the pair is the combination of the first icon with the "NO" icon (P1 type). These pairs have no special icon associated with the pair and a specially marked first icon (6-9 in the illustrated case) is displayed as a pair icon. After selection of such icon (FIG. 10C) user may select the opposite meaning icon, e.g., by pressing again the same input key and waiting.

In some embodiments, one or more icons are designated as modifier icons, such as "not" and may be applied (e.g., overlaid) on an existing icon, for example, a previous entered icon, for example, by double clicking. Another type of modifier icon operates by overlaying two icons at a displacement, for example, a "mother" icon overlaying a "father" icon, at an offset of 3 pixels or more.

In an exemplary embodiment of the invention, some icon pairs (or larger sets) are predefined to be visually different when provided in sequence. For example, "me" followed by "you" may be graphically presented by the two icons holding hands.

In an exemplary embodiment of the invention, text symbols are allowed to flow into icons, for example, when text symbol "2" is provided after "go", the space between the symbols is diminished. Optionally, a user uses the icons and/or text in a phonetic manner, so that the icon-text combination has a new meaning. Such text may appear before and/or after an icon or vice versa.

In an exemplary embodiment of the invention, colors of icon and/or text combinations are matched, for example, to give a sense of unity and/or provide a contrast as compared to the rest of the message.

The above serve as some examples of modifying the behavior of one icon based on neighboring icons or other symbols. In some embodiments, the modifying is based on non-neighboring icons, for example, selecting an animation for an icon based on the length of the animation as compared to the lengths of animation available for other icons. In another example, the animation depends on standard text modifiers, for example, making the display time and/or animation time for an icon vary according to its location in a message and the use of punctuation, such as "!" and "?" which typically affect the emphasis on an entire message. In an exemplary embodiment of the invention, a profile of timing changes (e.g., increased or reduced time based on relative position in a message) is defined for several icons and applied to a message if the icon appears in the message. Optionally, an icon has a different animation (or other visual or audio effect) associated with it for use with different such sentence modifiers.

In an exemplary embodiment of the invention, the modifying based on neighboring icons and/or the content of a message includes modifying one or more of a static "visual" (of one or more icons), color(s), animation type, animation behavior, animation timing, spacing, merging behavior, alternating behavior, size, sounds, text section and/or label.

In an exemplary embodiment of the invention, an icon has associated with it multiple visuals relating to different situations, optionally defined as a parameter. For example, a 3D effect can be achieved, if an icon has different visuals for being mapped on different parts of a 3D object. Optionally, an icon is associated with a visual according to the parameter of 3D mapping of nearby icons, so that a desired effect is achieved, for example that of a message being mapped on a bump. In another example, the animation comprises an icon changing visuals to effect a 3D effect.

In an exemplary embodiment of the invention, the modification is accomplished using one or both of two mechanisms, namely hints and dictionaries.

In a "hints" mechanism, a message includes one or more hints, which may be, for example, symbol codes that are not meant to be displayed. For example, a code may be provided between two symbols, before them or after them. In some cases, the hints are provided for a whole message. In an exemplary embodiment of the invention, the hints describe the modification to be applied, for example, spacing, overlaying, color modification or alternating. In some cases, the hints include a link to a more complex instruction, for example, a script of graphical commands for merging two icons, or a link to an image. In some cases the hints are less specific. For example, a hint may be "use happy animation" and the exact animation used depends on the association of animation for an icon (or message) with a "happy" property.

In an exemplary embodiment of the invention, the hint is interpreted at the receiver device and/or at an intermediate server. Optionally, a user can define how different hints are to be interpreted. Additional examples of usage of hints are provided in the section on rich media.

In a "dictionary" mechanism, the message is scanned in reference to one or more dictionaries that define behavior to be applied in certain circumstances, such as adjacent symbols. In an exemplary embodiment of the invention, the dictionary or dictionaries to be used are provided as part of the message. Optionally, the definitions of one or more of the hints are provided in one or more dictionaries.

In an exemplary embodiment of the invention, the dictionary is applied by a receiver, for example, even if a non-animated message is received. Alternatively or additionally, the dictionary is applied by a sender, for example, to automatically add hints to a message. Alternatively or additionally, the dictionary is applied by an intermediate server. Optionally, the receiver receives an interpretation of the hint from a server, optionally as a dictionary input. It should be appreciated that a same message sent to several recipients may be displayed differently by each one, for example, based on definitions stored at the sender as to which dictionaries to use, based on personalization definitions at a receiver for interpreting hints and/or using dictionaries and/or based on modifications applied by a server. Dictionaries and/or personalization may be associated with groups. A particular type of personalization is a decision as to which icon image to show. In an exemplary embodiment of the invention, a user is charged for use of personalizations. Such charging may be based, for example, on the contents of the dictionary (e.g., pay per use or per month) and/or based on the receiver (e.g., whether the personalization is applied). In an exemplary embodiment of the invention, the changing includes distributing at least some payment directly to a creator of part or all of the dictionary. Optionally, the creator is paid in kind, in access to various features of the iconic language system.

Figures 14, 15:
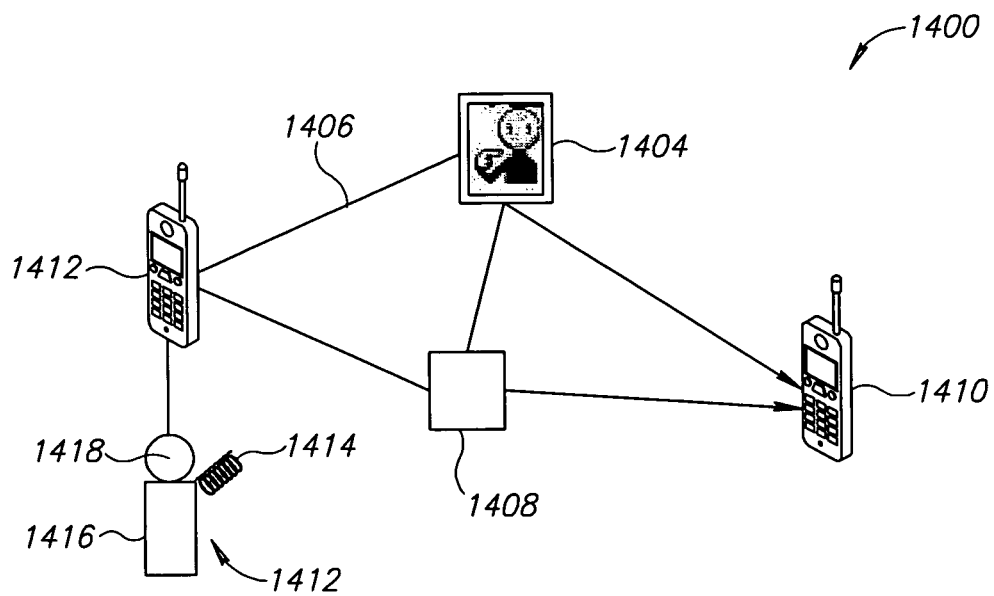
FIG. 14 is a schematic block diagram of a configuration including an external display, in accordance with an exemplary embodiment of the invention.
FIG. 15 is a schematic showing of a data structure suitable for representing a modification dictionary, in accordance with an exemplary embodiment of the invention.
Figure 16A:
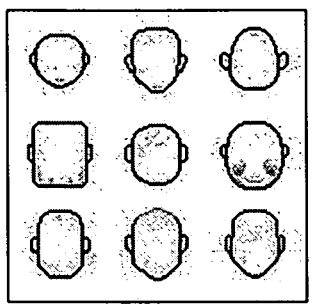
FIGS. 16A-16I show exemplary components for face-icon generation, in accordance with an exemplary embodiment of the invention.
Figure 16B:
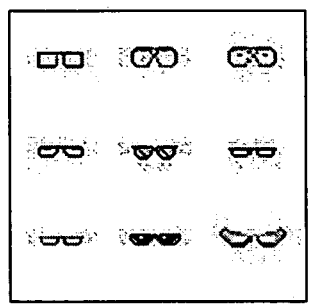
Figure 16C:
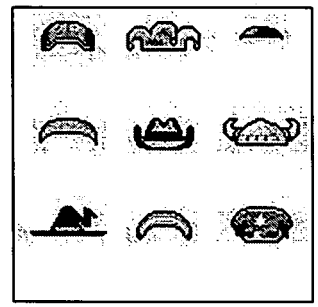
Figure 16D:
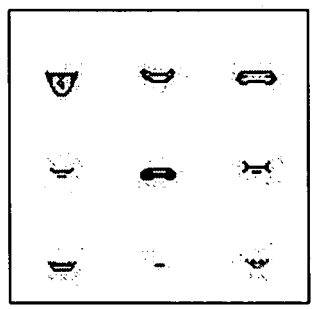
Figure 16E:
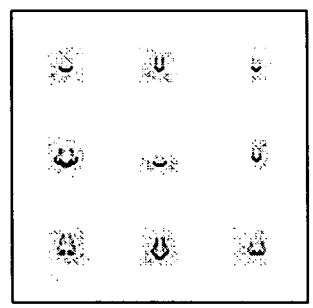
Figure 16F:
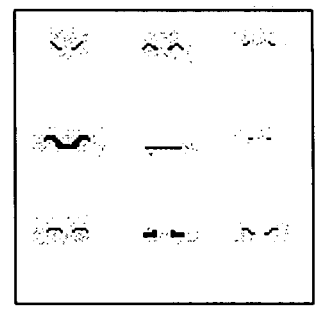
Figure 16G:
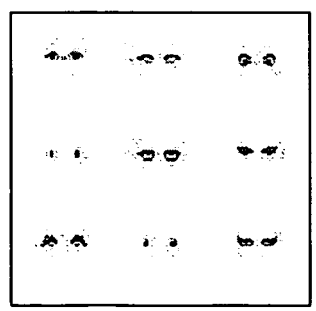
Figure 16H:
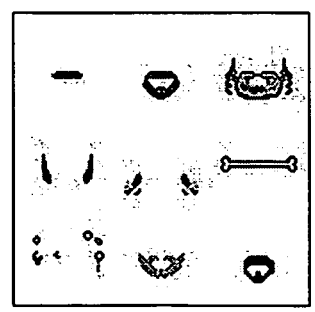
Figure 16I:
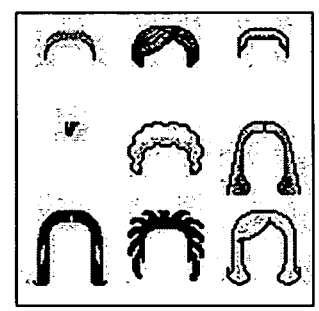

FIG. 15 shows an exemplary structure for a dictionary 1500. This structure may be used for other uses besides pairing of icons. It should be noted that this illustration is schematic and a dictionary may be implemented in other ways (e.g., as a linked list or a tree or in the form of the repositories described below). In addition, other structures having similar functionality with respect to lining icons and modifications, may be used.

Dictionary 1500 optionally includes general dictionary information 1502 and a plurality of records (one shown). A different number of fields than shown may be used. In general, the fields used and their interpretation depends on the implementation and the options provided to the user(s), so the fields are nearly all optional. In addition, in some embodiments, a multiplicity of a field may be provided, for example, multiple image fields.

In an exemplary embodiment of the invention, the general information includes one or more of dictionary code, a mask defining what groups of senders/recipients to apply the dictionary to, dictionary name, version & date and/or classification (e.g., relating to cost such as free/cost, related to distribution, such as unlimited/limited, related to access such as child-content rating, and/or related to user approval such as user ratings, optionally distinguished by demographics or other properties of who applied the ratings. Optionally, one or more items of dictionary information is available from a server and is not distributed with the library.

As shown, record 1504 includes an ID field 1506, used to identify the symbol to which the record applies. In use, the symbols may be scanned against this field, to determine if there are any modifications to apply.

An optional situation/ID field 1508 is provided to identify particular situations where the record is applied. Optionally, the field comprises a script to be executed (or a link thereto), for example, in Java. Optionally, the field includes an ID of a next symbol which acts as a pair with the symbol of field 1506. Any scripts, image data and/or other data of non-standard size are optionally provided at the end of the dictionary as a separate section.

An optional image field 1510 defines one or more images (or links thereto) to use for displaying the icon. It is noted that a default dictionary may be provided, with an image for each icon.

An optional visualization field 1512 indicates (e.g., as a code) how the image should be displayed, for example, kerning and overlaying.

An optional animation field 1514 indicates an animation to apply to a symbol or symbol pair.

An optional billing field 1516 defines how a user is to be billed for using the feature of the dictionary, for example, per use for sending, per upload, and/or per application when receiving.

An optional time field 1520 defines timing for displaying the symbol, for example, duration, time delay and/or temporal handles for symbols displayed as a series of images. This may be useful when synchronizing the animation of multiple symbols.

An optional instruction field 1518 is used to store instructions to be sent to an external display upon processing of the symbol.

An optional text field 1524 includes the label to be shown and/or alternative labels. Optionally, the field is in the form of a bitmap or other graphical representation, for example, for Chinese where the number of different labels needed for labeling the iconic language is considerably smaller than the language, or where display space needs to be optimized.

One or more other fields 1522 may be provided as well. Such a field may define behavior when two icons collide during an animation sequence. Alternatively or additionally, the field may be to define sounds, for example, special sounds to be made when two icons are adjacent. In general, the various personalized behaviors may include a sound dimension.

A particular example of whole message animation is a wave, in which each icon in its turn moves up and down. In another example, when two icons are side by side, and each has its own animation, the symbol animations are optionally synchronized to coincide at a particular time, for example, at the beginning of the first or third frame of the respective animations. The animation of a symbol is optional paused and/or stretched to match the animation of a neighboring symbol.

In an exemplary embodiment of the invention, a dictionary is used to relate whole messages, like "me home tomorrow", to animations, etc.

In an exemplary embodiment of the invention, a dictionary is used to store sets of animations or other visual properties in association with hints or other formatting instructions, rather than in association with symbol IDs.

In an exemplary embodiment of the invention, a reduced capability dictionary is provided as an icon list, which matches up icon visuals or numbers with symbol numbers. Alternatively or additionally, other data may be associated with icon numbers, for example, text labels. In a particular example, a dictionary associates characters of an alphabet with icon images (e.g., a phonetic matching), and a user may use that matching to write alphanumeric messages. In another example, different names (e.g., of teachers or friends) are each associated with different icons, for example, emotion icons and may be replaced by or alternated with the icon when a message is sent or received.

In an exemplary embodiment of the invention, a user can publish a dictionary to a server and/or to other users, for example as described below.

In an exemplary embodiment of the invention, a user can edit an image of an icon on a cellular telephone or on a home computer. Optionally, the editing is actually carried out on a server, after which the edited image is optionally downloaded to the telephone (or other user communication device). In an exemplary embodiment of the invention, a user edits using a software on a home computer and uploads the edited icons and/or animation to a telephone and/or a server.

In an exemplary embodiment of the invention, when editing on a cellular telephone a user can see the icon in a full-screen mode. Optionally, the user can define parts of an image to be copied from other icons. Additional editing options are described herein.

In an exemplary embodiment of the invention, an image or other symbol property is saved directly to a place of its symbol in a hierarchy of the iconic language. Optionally, different behavior may result depending on the navigation of the hierarchy during editing and/or during access. For example, a same symbol may be provided in two different parts of a hierarchy tree. The text label associated with the symbol and/or animation thereof (if applied, for example, by a receiver) may depend on how the icon was accessed, which may indicate an underlying shade of meaning by the sender. Similarly, such shades may be identified when an icon is a one-to-one translation of a word into a graphical icon. Optionally, the method of access of the icon is provided as a hint.

Phrases and Alternative Entry Methods

In an exemplary embodiment of the invention, a single icon is used to represent a series of icons and/or text symbols. In one example, a user selects an icon and this is expanded into a series of icons and/or text symbols, as part of the outgoing message. Optionally, the series includes placeholders (e.g., for a user to add one or more icons or symbols), or elements which are interpreted on the fly, for example, a clock element which turns into time as a series of text symbols. Another example, is a hand waving hello, as three alternating graphical images of different hand positions. In an exemplary embodiment of the invention, if a placeholder is provided, when the icon is expanded into the phrase, the insertion cursor skips to the placeholder.

In some embodiments, the conversion of icon into a series of icons/text symbols is carried out at a server and/or at a target user. Optionally, the server determine if a target user device supports the particular phrase icon, and if not, it performs the expansion.

In an exemplary embodiment of the invention, such phrase icons are used by a user or group of users as shorthand for various situations, for example, "me home", "See you later".

In an exemplary embodiment of the invention, the phrase icons may be arranged as a special category (e.g., a "smarties" category or a "mybox" category) having its own category symbol and the "smarties" icons may be treated in a manner similar to the set icons.

In an exemplary embodiment of the invention, the series of icons are entered into the "smarties" category by direct input and/or by copying of composed or received messages or parts thereof.

In an exemplary embodiment of the invention, a phrase icon can relate solely to non-symbols, for example, be a series of formatting instructions.

In an exemplary embodiment of the invention, the icon phrases category doubles as a storage location for user generated messages, user entered icon strings, user entered formatted/combined icons and/or user entered text. Optionally, the icon phrases category is arranged as a cache with most recently used items stored first. Alternatively or additionally, the arrangement is alphabetical, by length and/or by the names of the second icon. In an exemplary embodiment of the invention, a user generates some typical text segments, for example names of significant others and/or friends. Optionally, a user associates an icon with each of one or more of the text icons. Optionally, the user designs such icons and/or downloads them, for example, from a server or a computer. Optionally, these icons are not sent as such to a target user, but rather only used for local user interface. Alternatively or additionally, the segment is selected using a list. Alternatively or additionally, the segment is selected using a numerical and/or text sequence, for example, "jo" for "joseph". Optionally, one or more graphics of icons are transmitted by SMS, for example, as single messages or as chains of messages. Optionally, an icon is sent as fewer than 200 bytes.

In an exemplary embodiment of the invention, one or more set icons may be entered by a user using other methods than selection from a graphical menu. In one example, each icon is associated with one or more names and text typed by the user is replaced by the icon as soon as it is identified. Optionally, an initial identification is made (e.g. "teacher" when a user types a "t") and then changed as the user types more text (e.g., changes to "Thursday" when a user type san "h") or activates a scrolling mechanism. Alternatively or additionally, a number sequence (optionally the same as the category menu) is associated with each icon. Optionally, the guessing of an icon by the input mechanism is dependent on the previously entered icon and/or text. For example, a plurality of commonly used phrases may be stored and as a user enters icons or an indication for an icon, the input mechanism guesses (initially) that the user is completing one of the common phrases. Optionally, a cache is used to store and/or update most used icons. Optionally, in order to be provided as a shortcut, a minimum usage frequency (optionally user settable) is required. Such frequency may be detected by the client and/or server by analyzing sent messages.

In an exemplary embodiment of the invention, an SMS translator is provided which automatically translates SMS messages into icon messages. For example, a dictionary may be provided which matches one or more words or phrases into icons or series of icons. In some cases, some words will remain unaltered and provided in the icon message as a series of text symbols. Optionally, text is converted into icons as it is types. Optionally, non-language text sections are automatically recognized as indicating icons based on the sequence of keys indicated by the letters or based on entered numbers or keystrokes. Alternatively or additionally, one or more short cuts (e.g., 2 or 3 letters) may be associated with each icon. Alternatively or additionally, the names of the icons are replaced by the icons as typed.

In an exemplary embodiment of the invention, a general auto-completion mechanism is provide for icons, for example, in some ways similar to those known in SMS messages (e.g., T9), with the text being replaced by an icon name, as soon as it is identified and/or a next icon is being inputted. Optionally, an icon is changed as further text is inputted. It is noted that an icon may have multiple names, one or more of which may be accessed using such a mechanism.

In an exemplary embodiment of the invention, icons are presented to a user in an order consistent with commonly entered messages. For example, if a top-level display shows 9 icons (other numbers, such as 12, 7, 5, 4, greater or smaller may be provided depending, for example, on display size and resolution), these 9 icons are selected to be the 9 most common starting icons. Optionally, this mode is accessed by a menu selection (or key, e.g., "0"). Alternatively or additionally, this mode is selected by selecting a suitable icon in a "standard" icon display, optionally after starting to enter a message, optionally even while editing a message (e.g., for inserting a phrase between two icons). Optionally, the 9 common icon display includes at least one icon which selects to switch to a "standard" and/or other display (and thus possibly fewer than 9 common icons are shown). In an exemplary embodiment of the invention, the top-level icons represent categories of messages, within which common starting icons are shown (e.g., in a display once the category icon is selected). Optionally, the display is a mixture of category icons and common starting icons. In an exemplary embodiment of the invention, at least at some levels, message options are provided as lists of messages (e.g., several icons in a row) or message parts (e.g., common phrases).

In an exemplary embodiment of the invention, the display includes 7 category icons, one icon for text entry and one icon for composing according to language (rather than message) categories. In an exemplary embodiment of the invention, the categories include meetings, greeting and questions. Additional exemplary details are provided below.

Figure 18:
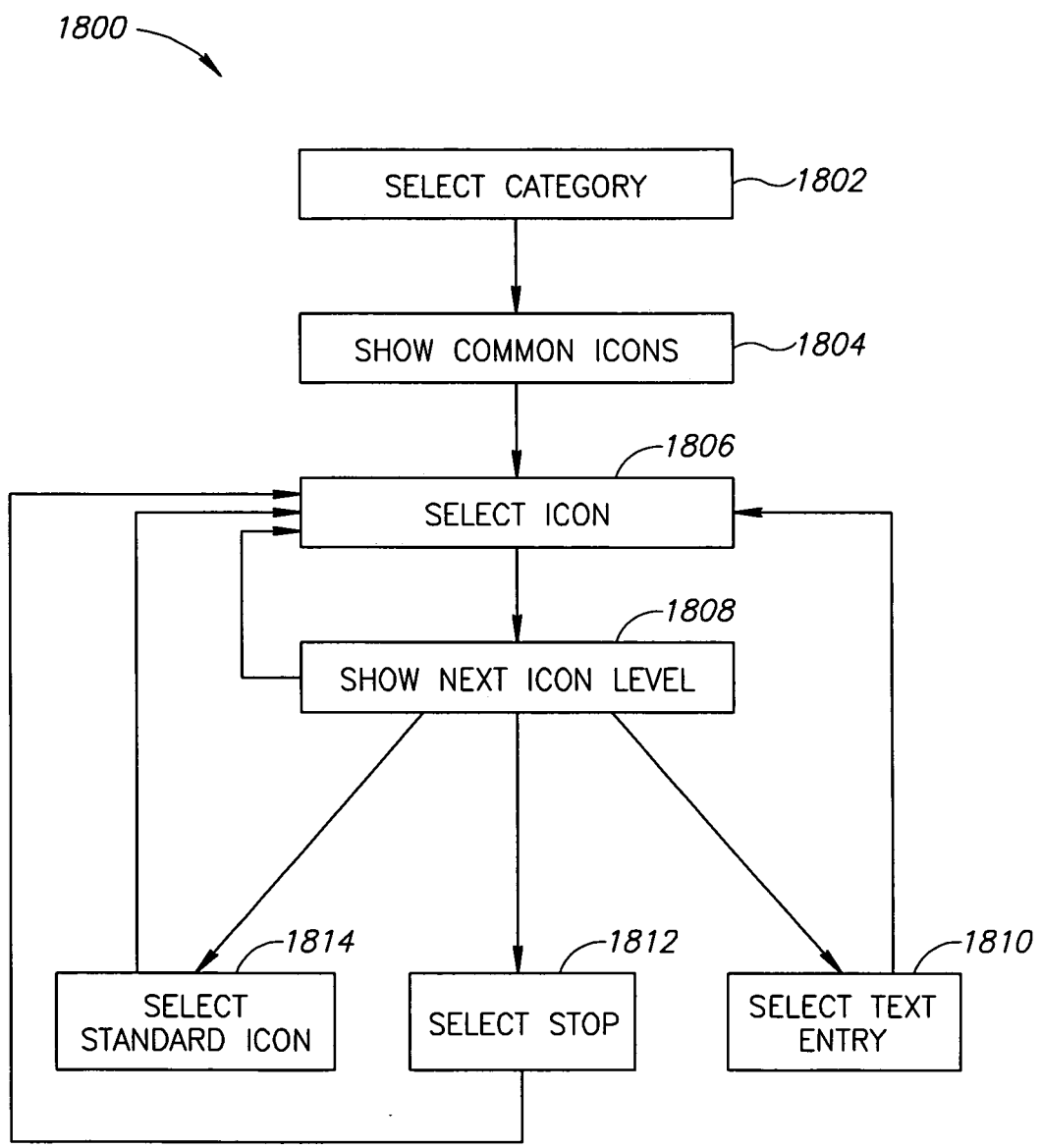
FIG. 18 is a flowchart of a method of message entry using a common-message hierarchy, in accordance with an exemplary embodiment of the invention.

FIG. 18 is a flowchart of a method 1800 of message entry using a common-message hierarchy, in accordance with an exemplary embodiment of the invention.

At 1802 a user is shown a display with icons for various categories and the user selects one. Once an icon is selected the display is replaced (1804) by the 9 icons which most often follow that icon. Optionally, one of the icons or a menu selection allows other icons to be selected (1814), text to be entered (1810) and/or the message terminated (1812).

Selecting a second icon (1806) allows a third icon to be selected from a display (1808) and so on. Optionally, the icons are presented according to their frequency of use in messages. When a message commonly ends (or as one of the "standard options"), an option of choosing no icon (e.g., a blank space or an "end symbol" or a period) is optionally provided. Alternatively or additionally, messages may be predefined to have a fixed length and fixed number of levels in a hierarchy. Alternatively or additionally, a user can pre-specify the length. This length may affect the icons shown in the hierarchy. After stopping, a user is optionally presented with the options of one or more of sending the message, editing the message and/or adding more icons at its end. Optionally, editing includes selecting an appropriate animation for the message.

In an exemplary embodiment of the invention, the above method may be started in the middle of a message. For example, a user enters an icon and then requests the common following icons. Optionally, the client has stored thereon probabilities and sequences of icons. Alternatively or additionally, the hierarchy is generated on the fly from a stored list of common messages. Alternatively or additionally, the hierarchy or part of it is downloaded from a server. Optionally, the beginning of the hierarchy is locally stored and the rest is downloaded as need, for example, in the time it takes the user to select an icon. Optionally, the list is downloaded using an IP connection. Alternatively, it may be sent by SMS or downloaded by wap or i-mode browsing. Optionally, a user can select to see commonly preceding icons, instead of or in addition to commonly following icons. Optionally, a user can ask to see icons that commonly go between two icons.

In an exemplary embodiment of the invention, a similar hierarchical scheme is used to select animation for a message. For example, once a message (or series of icons) is entered and/or selected, a user can browse animations, sounds and/or other media commonly used for those icons (or generally used without respect of a particular icon or icon series) by other users. In the display, the selected series of icons is shown animated using the first animation step of the 9 common animation steps used for that series (or icon). In the next level, the next animation is shown. Thus, the display can include multiple copies of the same icon, each one behaving differently. Optionally, the animations are downloaded from a server. Optionally, a creator (e.g., first registered or noted user) of a commonly used animation (or even a message) is credited (e.g., money, respect or services) for his animation being used.

In an exemplary embodiment of the invention, a common exchange space is provided by the server to allow a user to take advantage of creations of other users or/and content providers, or/and automated content provided (e.g., content generated by statistically analyzing messages and/r usage patterns).

Optionally, at least some of the icon options shown comprise a plurality of icons, for example, two or three. Alternatively or additionally, at least one of the icons comprises an animated display swapping two or more icons, to present a series of icons of the message. Alternatively or additionally, animated icons are shown as such, for example, being animated and/or an associated sound played when a selector is "over" them. Such features may also be used in other icon display and/or selection methods.

In an exemplary embodiment of the invention, the hierarchy of "common" icons and messages are generated by collecting statistics on commonly sent message of other users. Optionally, the common messages are selected across the entire population of users. Alternatively or additionally, the messages are selected by voting. Alternatively or additionally, the messages are selected based on a sub-population. In one example, if a user is serviced by a certain provider and/or lives in a certain country, the "common messages" for that user are decided by what other users serviced by that provider and/or living in that country are sending. Optionally, a more focused matching between the user and the usage of messages is provided, for example, based on demographics and/or belonging to groups and/or partners with which that user typically exchanges messages (or sends or receives from).

In an exemplary embodiment of the invention, the following categories are used:
 (a) Sentiments: I love you, I miss you;
 (b) Coordination/Scheduling questions: You house, you come now, please call;
 (c) Coordination/Scheduling statements: me love go-come, me meet, me go eat now; and
 (d) Greetings: Good day, good evening, Hi/bye, Wassup.

In an exemplary embodiment of the invention, popular categories are split up, for example, sentiments into:
 (a) Love—Me love you, Love you honey;
 (b) Miss You—Miss you much; and
 (c) Negative—Me anger you.

Alternatively or additionally, Coordinating/Scheduling is split into:
 (a) Movement Inquiries—you go-come sleep, you go-come house; and
 (b) Requests/Feeling Inquiries—please call, when eat, you want eat.

Optionally, categories are created or merged responsive to the statistics of use. For example, if more greeting messages are sent, categories such as Holidays and family events, may be created. Optionally, these statistics are analyzed manually, by collecting common messages and dividing them into categories. Optionally, icons, such as "love" and "time" are used for at least a first automatic categorization. Optionally, automatic categorization is provided by selecting a set of messages (e.g., by length), removing pronouns and other common icons and search for the first or most common language category or icon in the remainder of the message. Other statistical methods may be used as well.

In an exemplary embodiment of the invention, messages are classified (e.g., a category or sub-category) according to whether the messages are typically uni-directional or typically part of a bi-directional conversation. A same message may be in both sub-categories. Optionally, the categories shown to a user and/or messages therein depend on a most recently received message or an on-going dialog (e.g., in a chat). For example, if the received message is a coordination message, the top-level shown to the user is all coordination messages. Optionally, the commonly shown messages depend on typical or most common answers to the previous message, for example, of the current user or of other users.

Optionally, the categories are provided to support a certain group activity, for example, football fans may have one or more category of "game-related messages" such as "nice goal" and "umpire bad". Optionally, when a user receives a message in a new category, his communication device adjusts the suggested answers according to that category. Details of the message statistics for the category may be downloaded on-demand from a server, or be provided in the mobile device, for example. Optionally, a category is automatically activated, for example, based on a location (e.g., detecting a mobile device is near a game field using location based services or GPS) or based on time (e.g., a known game time). Optionally, a user notifies the server which games/teams he is a fan of. Alternatively or additionally, a third party can track these preferences and send a category-setup message to the user's device. Optionally, such a setup message also changes icons and/or other defaults (e.g., themes).

In an exemplary embodiment of the invention, the hierarchy is not updated without the user agreement. Alternatively or additionally, the hierarchy is changed periodically. Optionally, when the user enters the common icon display, at least for the first time after a change, and it has been changed, the fact that a change was made is noted and/or changes highlighted. Optionally, a feedback is provided to a user when he selects an icon that is not the same as in a previous version, for example, a graphical display or a sound. Optionally, a memory is provided which stores indications of changes between a current version and a previous version. Optionally, this memory is populated by the user's device, by the device comparing a newly downloaded and/or generated hierarchy with a previous one and noting changes. Alternatively, a server may provide the hierarchy with indications of changes.

In an exemplary embodiment of the invention, changes are made in manner which reduces user habit disruption, for example, without reordering icons on a display page when one of the icons is replaced by another icon.

In an exemplary embodiment of the invention, instead of entry using selection or typing of numbers, an icon is entered using voice input. Optionally, the names of the icons are selected to be phonetically distinct, to simplify voice recognition. From a voice recognition system point of view, certain sounds are very similar, e.g. 'ad' and 'had' pose difficulties for voice recognition, and also 'crate' and 'great'. In an exemplary embodiment of the invention, this is avoided by selecting names (per language) that will not have names similar to them in the language. For example, 'here' and 'hear' are hard to distinguish. They can be named, instead, 'here' and 'listen'. In an exemplary embodiment of the invention, many (or most) icons each have a plurality of words that map to it, allowing a user to speak in a more natural manner. For example, each icon may have between 2 and 10 words, with, for example, an average of 2-5 or 3-5 words per icon, for at least 50% of the icons. Optionally, a user can customize the recognition of his voice, by training the telephone to recognize icon names. Optionally, a user trains his telephone using a web utility and then downloads the tags to the telephone. Optionally, the telephone is used as an interface also in web training, with the analysis and/or user interface being done on a web site and/or using a personal computer. Alternatively or additionally, each icon is provided with one or more preset voice tags, to provide recognition. Optionally, a user can change one or more of these tags, or add new ones. Optionally, learning methods (e.g., detecting manual correction of icons after voice input) are used to automatically correct the voice tags and/or parameters of a voice recognition method used.

In an exemplary embodiment of the invention, icon entry is by handwriting and letters or other marks (e.g., symbols representing icons) are translated into icons on the fly or by first being translated into text and then translated into icons.

In an exemplary embodiment of the invention, the icons, categories, texts, images and/or shortcuts are stored on a server and accessed by the client as needed.

In an exemplary embodiment of the invention, data entry is designed to minimize key strokes and/or scrolling actions. In an exemplary embodiment of the invention, at least 90% of the available icons can be selected using four strokes or less. Optionally, at least 90% of the times an icon is selected, it is selected using four strokes or less. Optionally, the percentages are at least 50%, at least 75% or greater or intermediate numbers. Optionally, a larger number of strokes is allowed, for example, five, or fewer, for example three. Optionally, double-clicking and/or scrolling are counted as a single stroke.

In an exemplary embodiment of the invention, when a user sets out to create an iconic message, that user, starts out by selecting concepts that have representations in the iconic set. Optionally, if a concept is missing or an ambiguity arises, the user can insert a text segment. Optionally, the user becomes proficient enough in the iconic set that he can think in a manner limited by the constraints of the set.

Exemplary Mobile Architecture Including an Exemplary User Interface

FIG. 4 illustrates a generalized block diagram of exemplary functional architecture of computer application product for incorporation in a mobile device, in accordance with certain embodiments of the invention.

Figure 12:
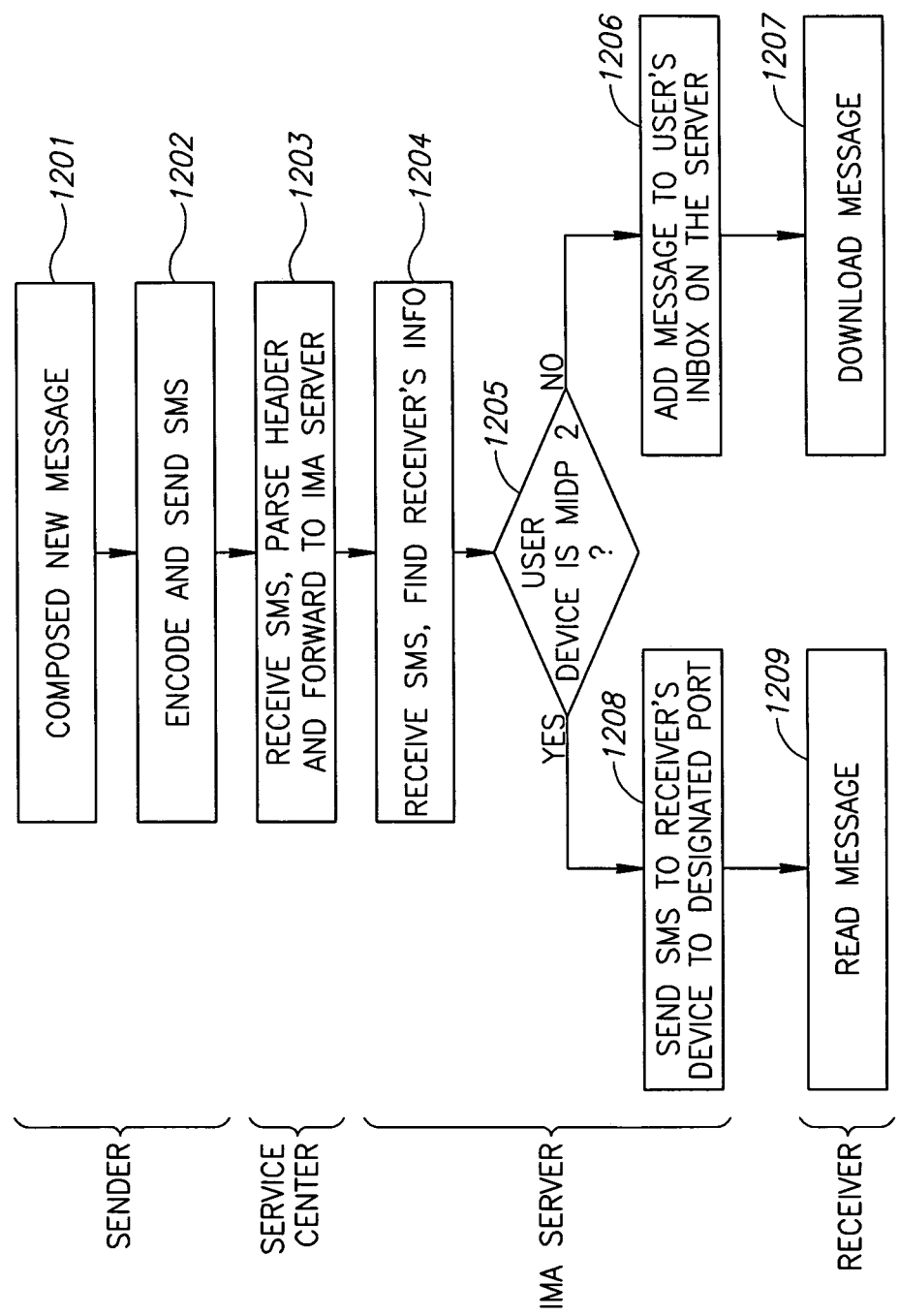
FIG. 12 illustrates a generalized flow diagram showing the principal steps of iconic message based communication via SMS network in accordance with certain embodiments of the invention.

A computer application for communication with the help of iconic messages (IM) (401) is optionally incorporated in a mobile device (400). The application may be provided in various ways, for example, pre-loaded in the mobile device or loaded into the mobile device in a way conventionally used for downloading a mobile application, such as over the air (e.g., for mobile games, dictionaries, etc.) and activated in a conventional manner (e.g. by selection from application menu and/or options menu, using a shortcut and/or a quick-key of the mobile device). In certain embodiments of the invention the application is activated, for example, after a user selects "compose (write) message" or "read message" options in a manner conventional for the mobile device. In some embodiments of the invention the application is automatically activated, for example, when a user indicates his intention (e.g., entering code words representing icons into an SMS message, starting an SMS message with "z" (or other selected symbol or symbol sequences), or following an event triggering to do so, such as an alerting SMS or an incoming icon message. Some automatic activation is illustrated in FIG. 12.

A Network Interface (407) is optionally functionally associated with a Network Interface Block (408) of the mobile device and is capable of communicating via this Block (408) with a Service Center (411) communicating with at least one communicating device (412). The communicating device (412) may be any device capable of receiving or originating messages to a mobile device (e.g. PC, PDA, cellular phone, pager, etc.).

The user may operate the application via a User Interface (402) which is functionally associated with display and input interface of the mobile device and is connected to a Processor (403).

In an exemplary embodiment of the invention, the user interface of the mobile telephone does not support non-alphabetic languages. Optionally, the telephone does not support non-Latin languages. Optionally, the telephone does not support font images of ideographic or pictographic languages, such as Chinese, Japanese and Korean.

In an exemplary embodiment of the invention, the processor facilitates selecting and retrieving graphical images (e.g. categories and sub-categories symbols, set icons and/or textual elements or/and fonts) from a repository (described below) via the user interface and representing the resulting iconic message at specified coordinates of the display (hereinafter "message area"). The user interface enables this selection with the help of associated input keys and/or with the help of navigation keys (commands) and controlling commands. All the entries necessary for operating the application are optionally activated via any conventional interface (e.g. push-button interface, touch screen interface, pen-interface, graphical user interface, etc.).

Optionally, the user interface in conjunction with the mobile device provides interactive screens representing organized information which may include, for example, graphical images retrieved from an icon repository, message area, iconic message, notification and menu symbols (e.g. new message alert, phone book, etc.), navigating, operating and/or editing commands typical for the mobile device (e.g. select, add, back, clear, option, send, open, help, exit, etc.), etc. The user interface optionally facilitates activation of these commands via the input interface of the mobile device, for example, for composing, editing, transmitting, receiving or reading iconic message. The user's experience of operating the user interface may be similar to the convenient experience of operating the mobile device. The user interface may also contains elements indicating a new or/and un-read message or/and the details of the sender or target recipient. Such indication is optionally dynamically updated in response to important events, e.g., changing from showing the sender name of a previously received message to a highlighted name of the sender of a just-arrived message.

Exemplary Top-Level Display

In an exemplary embodiment of the invention, a top level display shows a plurality of icons, one for each of common tasks, for example, one (typically several) or more of:

(a) write—enters a compose message screen, for example as described above;

(b) read—enters an inbox screen which optionally allows to edit a received message;

(c) invite-a-friend—generates a message (e.g., sms, icon language, e-mail m or other) to a friend to join. The friend may be, for example, a cellular-telephone user or a computer user;

(d) contacts—enters a contacts list screen;

(e) tours—allows to select between one or more tours of the icon set system;

(f) Others—opens a screen with other options, such as "sent" and "help"; and (g) common messages—for example as described above with respect to phrases.

Icon and/or Data Repository

Optionally, the processor is coupled to an icons' Repository (404) containing graphical images, which are optionally arranged in hierarchical, relational or other database format. Alternatively, the arrangement is flat, with no specific hierarchy or a hierarchy with only two levels. The repository contains the category symbols directly or indirectly (e.g., via the hierarchy) associated with the set icons. The graphical images may also comprise sub-category symbols subordinated to the category symbols and associated with the set icons.

In certain embodiments of the invention, each set icon has a unique identification number (ID) assigned to the set icon and stored in repository 404. The processor is capable of processing and managing the data stored in the repository and related to the set icons (e.g. icon names, ID, user group—described below, etc.). Processor 403 is also capable of encoding the iconic message (including text segments when relevant) to facilitate transmitting in a format compatible with the standards of a message service (e.g., SMS) and decoding the received message to iconic message format. The process of encoding/decoding iconic messages is further illustrated in FIG. 11, below.

In accordance with some embodiments of the invention the icon repository may be updated. Optionally, such updating can be performed without updating some or all the program which accesses the repository. In an exemplary embodiment of the invention, the icon repository may be locate in an memory area that is preserved upon software updates.

The repository may be updated in part or in full, for example, according to individual icons or categories. Optionally, such updating is by a message from a server indicating new data and a location for the data in the repository. Optionally, update is requested by the client. Optionally, the server notifies the client (for example by sending a bit flag) if and/or when an update is available. Optionally, each update has an associated updating code. Optionally, the server and/or client keep track of the applied updates. Optionally, a separate repository area is provided for icons and/or other data overloaded by the user, for example, user-customized icons. Optionally, a user is notified when such an icon clashes with an updated icon/data.

Optionally, the icon repository or additional one or more repositories store other items, such as icons indicating control activities (e.g., save, store) and/or textual elements such as pre-maid textual graphical representation of the icons names or the fonts that they are composed of. Alternatively or additionally, a repository is used for storing help text and/or usage instructions.

Optionally, the client stores multiple variations of one or more icons and/or text settings, for example, for use depending on display size, identification of the actual telephone used by a user and/or user preferences. Optionally, such variants are stored on the server and downloaded to the client as needed or as part of an update package and/or initial installation, in response to a query that indicates the telephone capabilities. Optionally, when downloading the client software, a bootstrap activity is carried out, where the initial downloaded code is executed and reports of telephone capabilities and/or user preferences are made to the server, so the server can select and/or compile a personalized client package of software and icons. Optionally, the software is the same for all telephones, but this need not be the case, for example, higher quality sound and/or graphics code may be provided where supported by the telephone.

Alternatively or additionally, multiple-language elements are stored, for example, icon names or meanings in various languages.

Optionally, the icon repository is arranged in a manner which enhances performance when displaying icons and/or enhances memory utilization.

In an exemplary embodiment of the invention, at least some of the data in the icon repository is arranged to match the various categories screens as presented to the user. In an exemplary embodiment of the invention, screen pages are provided, such that each screen page includes graphical data arranged in a manner that matches an expected display. This may enhance data retrieval and/or display performance. Optionally, similar arrangements are used for the text labels, for example, for Chinese labels. Optionally, for Chinese language or other large (or relatively square) format labels, the icon image is alternated with the label.

In an exemplary embodiment of the invention, performance is enhanced by storing only the smallest square (or other shape) that bounds an icon with a defined size and then positioning the icon on the display according to its defined size.

In an exemplary embodiment of the invention, performance is enhanced by storing the icon names as images (e.g., bitmaps). In systems where font rendering is fast and memory is at a premium, the storage may be in the form of text strings. Optionally, a dedicated font, for example, a 5 pixel font is provided for the names.

In an exemplary embodiment of the invention, storage requirements are reduced by arranging the icons in sheets according to their color structure. In an exemplary embodiment of the invention, the total number of colors allowed for the icons is minimized, for example, being fewer than 100, fewer than 20, fewer than 10. Alternatively or additionally, space savings are realized by grouping icons in groups according to the color set used for each icon. For example, some icons may be based on red, green and blue. Other icons may be based on gray, red, yellow and purple. In an exemplary embodiment of the invention, each icon group has its own color map and a very small number of bits may be used to index into the color map. Optionally, when a new icon is designed, the designer selects from available color sets. Optionally, for telephones with limited memory, similar colors are combined into same colors. In an exemplary embodiment of the invention, fewer than 40 color sets, fewer than 20 sets, fewer than 10 sets or intermediate number of sets are used. Optionally, at least 50% of the icons have fewer than 10 colors.

The arrangement of the icon repository and the screen rendering methods is optionally selected to match the limitations and capabilities of the specific handset, for example, its screen size, implementation language (e.g., J2ME, BREW) supported graphics routines, run-time memory, Extra/shared storage memory, maximum program download memory and/or number of colors. In some cases, there are other considerations, for example, language. In Chinese, for example, as the word representing the icon name is an entity by itself it may be more efficient to store the names as graphical elements attached to or separate from the icons images themselves. This information may be provided to the server when downloading and/or updating the client application.

Icon Names

In accordance with certain embodiments of the invention, the category symbols, sub-category symbols and/or set icons optionally have associated names explaining the icon (or other symbol) to the user.

The processor may facilitate displaying the names via the user interface in different ways, e.g. continuously while composing and/or while reading the message, for a short period of time after selecting symbol or icon, on-demand (optionally toggled) after the user presses a pre-defined key and/or for various durations and/or in response to various triggers. The names may be presented for a single "current icon" or for all the icons displayed. Optionally, the name is presented serially for the icons in order.

Optionally, the names text is stored separately from the icons. Different languages are optionally provided for different devices and/or users. Optionally, the same language, but different indications may be provided based on a user group affiliation and/or user preferences.

Optionally, the location of the names presented in relation to the icon is configured to match the capabilities of the specific handset or/and the used language. For example, if there is enough space between icons, their names may be presented below the icons. If sufficient space is not available, the names can be composed to partially or fully cover the icon space itself. This overlap feature may be necessary for languages that needs relatively large pixels-count to represent the icon name, such as Chinese that typically needs a font-size of 11 pixels or larger, unlike English fonts that may be implemented using a font-size of 5 pixels. Optionally, instead of overlapping, the icons are shrunk when the text is shown, optionally momentarily or for a duration of a key-press.

In certain embodiments of the invention, some of the set icons may have multiple names (e.g. "big", "a lot", "much" for the same icon). Optionally, the names are selected for display randomly or in accordance with a predefined queue. In an exemplary embodiment of the invention, the display may be selected to be context dependent, e.g. if "Hi" and "Bye" are the multiple names for the same icon, the processor may display "Hi" for the icon at the beginning of the iconic message, "Bye" for the icon at the end and "HiBye" for the icon in the middle of the iconic message. Optionally, pattern recognition rules are used to determine if an icon is probably with one meaning or with another.

Optionally, at least 5, at least 10, at least 20 at least 30 or more or intermediate numbers of icons have multiple names, for example, 2, 3, 4 or more names each. Optionally, multiple languages are provided on a same device. Optionally, the provision of one language or another, optionally mixed in a message, is a means to help a user learn a language. Optionally, the processor ensures that each name is shown a minimum number of times.

In an exemplary embodiment of the invention, the display of names is used to familiarize the user with the various meanings an icon can have. Optionally, the processor tracks the display of names to ensure that each name is displayed often enough and/or for long enough, so that a user can learn its variable meanings. Optionally, the display times for different names is equal. Alternatively, the display time is in inverse relationship to the newness of the meaning or typical usage (e.g., as provided manually, e.g., via a server).

In an exemplary embodiment of the invention, users can define/associate new meanings to icons, for example, within a group (as described below). Alternatively or additionally, users can provide suggestions to a central server and/or vote on new meanings for exiting icons and/or vote on desired changes to icons. Alternatively or additionally, to user submission, a system administrator may contact a focus group or groups, use polls and/or analyze messages to identify usage patterns and/or new meanings for words. Such newer meanings may be presented more often, as noted above.

In an exemplary embodiment of the invention, voting is via an iconic message which may be captured and/or analyzed by a server. Optionally, messages and/or group membership indicate to the server to whom to transmit the voting result/requests. In an exemplary embodiment of the invention, voting is by a server sending a message including new potential icons and/or names to a user and a user responding with a message in which only desired icons and/or names are maintained.

In certain embodiments of the invention the names of set icons may be tailored for specific user groups (e.g. natural language of icons' names) or self-customized by the group. The user group may also have a dedicated set of set icons available to the group members only. These dedicated set icons may be contained in generally available categories as well as in special categories dedicated to the user group. Different user groups may have different sets of dedicated icons.

In certain embodiments of the invention the names may be defined in a phonetically distinct way to facilitate recognition of icon's name by a voice recognition system. Such distinctive names of icons may be used for voice-based input and/or voice-based composition of iconic messages.

Exemplary Selection of Icon Images

In an exemplary embodiment of the invention, images for icons are drawn, for example, using icon generation tools as known in the art. Optionally, the icons are selected to have a minimal number of colors and/or to be in groups each of which has a small number of same colors.

In an exemplary embodiment of the invention, some icons are made meaningful and/or more meaningful through the use of colors, for example, stop and go can be green and read lights and/or walking and standing pedestrians. Optionally, at least 10 icons have the property of enhanced meaning due to color. Alternatively or additionally, optionally at least 5 icons receive their meaning from color. In an exemplary embodiment of the invention, a hint may be used to modify the colors used. Optionally, the colors are defined using a color palette, so that the hint may be applied by changing the palette of the icons.

In an exemplary embodiment of the invention, at least some of the icons are not intended (as a main objective) to be intuitive. Rather, what is more important is that once learned a user can easily form an association between the icon and its meaning(s).

In an exemplary embodiment of the invention, non-intuitive and/or concrete icons are provided, for example, "soon" and "want". In an exemplary embodiment of the invention, at least 10, at least 30 or intermediate numbers of icons represent concepts that are not objects and/or physical manifestations.

In an exemplary embodiment of the invention, a consideration in selecting icons is that they be differentiated form other icons and/or be amusing. Optionally, this reduces the number of icons provided by motifs. Motifs are optionally provided for related icons, such as time measurement icons and people indicating icons.

In an exemplary embodiment of the invention, at least 10 icons are generated from images.

In an exemplary embodiment of the invention, at least 10 icons are generated from sign language of the hearing impaired. Optionally, animation for at least 10 icons is based of such sign languages.

In an exemplary embodiment of the invention, at least 50% of the icons are arranged in a relatively small number of motifs (e.g., 3, 5, 10 or intermediate or greater numbers), such as "people", "clock" and "heart", where by modification of a base icon, various meaning can be conveyed (e.g., "me", "you", "they", are all modifications of a person icon). In one example, icons conveying specific time quantities are framed by an alarm clock. In another example, icons depicting days of the week have the same design and vary by color and short name of the day of the week. Optionally, at least 50% of the icons in the set do not follow specific motifs.

Picture and Graphics Based Icons

In an exemplary embodiment of the invention, the icons used to represent symbols are pictures (e.g., acquired and optionally processed). In general, icons may be generated in various ways, including scanning, editing, using cameras and/or as combinations of types.

In an exemplary embodiment of the invention, a user can personalize his experience using picture images to replace graphical images. In some embodiments, at least one icon is replaced by a picture animation sequence and/or by a graphical animation sequence.

In an exemplary embodiment of the invention, picture based icons have a size of about 48×48 pixels or 60×60 pixels. Multiple images may be provided, for example, for different resolutions and/or color control. Some of the images may be of a different type (e.g., graphic as compared to photograph).

In an exemplary embodiment of the invention, sets of picture based icons are provided as dictionaries, which may be shared, for example, as described herein. In an exemplary embodiment of the invention, a set of icons may be purchased or rented, for example, a set based on a theme. In one example, emotions are provided by a comedian making faces. In another example, celebrities or animated characters (e.g., Walt Disney characters), optionally in special poses are used to represent ideas. Picture specific animations may be described, including, for example, movement of icons relative to another as part of an animation.

In an exemplary embodiment of the invention, a user can purchase a prepaid sum of units allowing him a certain number of uses of special icons or icon sets. Alternatively or additionally, the usage is billed to the user's bill or used as a promotion.

In an exemplary embodiment of the invention, the server serves as a rights management system in that it prevents the transmission of abilities if money is not paid or if the distribution is otherwise restricted. In an exemplary embodiment of the invention, the server includes a list of users and associated rights and/or accounts. The accounts are optionally updated according to messages sent and/or received, elapsed time and/or number of special effects used. Optionally, a user can increase his account by publishing content used by others. Optionally, the server sends a request to a user to pay an amount or give other billing instructions (or forfeit) if the user tries to use a feature that costs money and billing is not arranged in advance.

In an exemplary embodiment of the invention, a user can manage a personalized set of icons as follows. On a WWW page a user can view some or all of the icons, as images, symbol numbers, text labels and/or an indication of a version. Optionally, the version information includes general version information, for example, a system wide version number and/or personal version numbers. Optionally, at least some icon images are set up to be automatically updated when the system version gets updated. In some embodiments, a user may freeze the image definitions to resist such an update. As noted above, in some embodiments, a user generates a personalized dictionary which overloads a standard dictionary, so the actual personalized dictionary can be relatively small and may not include all the icons.

In an exemplary embodiment of the invention, the web site includes a tool for trimming, color adjusting and/or resolution adjusting of images from the client. Optionally, the editing is carried out on a user telephone or PDA.

In an exemplary embodiment of the invention, once the manipulation of the personalized dictionary is complete, a user may ask a server for the dictionary to be converted into a format suitable for his telephone, optionally replacing an existing dictionary and/or being provided as a new integrated client including the new dictionary. Optionally, a user can instruct the server to mark the dictionary as private or public.

In an exemplary embodiment of the invention, a user may define an icon that represents himself and share this icon with his friends. Optionally, when a friend sends him a message saying "you" this is replaced by the personal icon. Optionally, the icon is not actually sent, but is replaced using a "hint". Optionally the hint is added by a server which has registered thereon the existence of a personalized image at a receiver. Optionally, a user group defines image numbers for group members, so that a message can include an image of any group member by providing his code number. For example, 100 or 200 images may be allowed in a group. Optionally, the images of a whole group (or more than one group) are stored locally, at the user telephone.

Composite Icons Images

In an exemplary embodiment of the invention, an icon image, sound, animation and/or other behavior can be edited by a user and/or a new image (or other properties) generated for a new icon. Optionally, well known editing techniques may be used, for example (for images), bit map graphics, vector graphics and/or editing an image as being formed of separate layers.

In an exemplary embodiment of the invention, an icon image can be a composition generated from multiple (e.g., 2, 3, 4, 5, 6, 10 or intermediate or greater numbers of) icons or image portions, which may or may not be provided as separate layers (some components may each have several layers and/or be composites themselves). In an exemplary embodiment of the invention, such components (or layers) may be blended, combined (e.g., side by side or using other combination templates) or merged. Optionally, merging includes combining components using definitions associated with the components, for example, two images are merged by the images being moved together until their outer pixels touch. Optionally, part of a component may be defined as transparent (or semi-transparent for purposes of blending. Similarly, different components may have different predefined z-values (e.g., depth positions or relative layer numbers), or such values assigned during editing. In one example, hair is made to look darker by placing it in front of a dark face with a certain blending factor and optionally also putting hair behind the face, with a blending factor (a same component type optionally may be used more than once in a composite icon). Alternatively or additionally, hair is duplicated at an offset.

In some embodiments of the invention, the composed icon image is saved as a new image. In other embodiments of the invention, the composed image is saved as a set of components (or indications thereof) and instructions on how to combine them.

In an exemplary embodiment of the invention, the icon is an icon of a face, optionally meant to represent a real person. In an exemplary embodiment of the invention, the components are designed using methods known in the art of police portrait artists, optionally reducing the options to 9, 16 or other small number, including, for example: hair, face_wear (e.g., beard, mustache), eyes, eyebrows, nose, mouth, hair_wear (e.g., hats, beads), face shape and eye wear (e.g., glasses). Optionally, the number of categories of components is maintained at 9, 16 or other small number corresponding to simultaneous display of the icons and/or a user interface. An alternative exemplary set of categories (some optionally with sub-categories) is "Woman face shape", "Man face shape", "Face color", "Hair", "Hair color", "Eyes", "Eyes color", "Nose Ears and Lips", "Beard and Moustache". Optionally, color is provided using the components mechanism or by separately selecting a color. Optionally, a component comes with a default color(s) thereof.

In an exemplary embodiment of the invention, the components define relative placement thereof, for example, placement of eye-glasses relative to eye location and relative to face shape. Optionally, each component has defined locations relative to a base component, in this case, optionally the face shape. Optionally, components automatically resize to match the base shape. Optionally, at least some components each have predefined animation and/or have an animation to apply to a composite face icon (e.g., to other components).

FIGS. 16A-16I show exemplary components for face-icon generation, each arranged in a 3×3 matrix in accordance with an exemplary embodiment of the invention.

In an exemplary embodiment of the invention, composed face icons are used instead of images of people. In a first exemplary use, these icons are used to indicate contacts, for example in contact lists or in incoming messages. Optionally, the face icons are used to replace pronouns (e.g., you, me) in messages. Alternatively or additionally, the replacement is based on names, for example, names in a contact list. Alternatively or additionally, a user can generate a dictionary mapping names to face icons, for example, using a "new-icon" mechanism. Optionally, the correct image to use is determined based on the sender and/or recipient IDs. Optionally, different face images (e.g., fun, business) of a user are shown to different recipients, for example, based on pre-definitions by the user. Optionally, when a message is forwarded or used in a chat, the face identification is frozen and does not change. Optionally, faces are used instead of emoticons, for example, instead of showing a generic happy icon, a smiling face-icon of the user is used. Such icons may be generated automatically or manually. Optionally, a name is also sent with the face icon, for use in systems that do not support a composite icon. Alternatively or additionally, in such systems the face icon is rendered as an image which may be sent or available for download from a server (e.g., as a WAP link). Optionally, one of the components of the composite icon is the ID (or telephone number) of the sender (and/or receiver). This ID may be used to determine which face icon to show (e.g., if the face compositions are stored on a server) or otherwise interpret a received icon instruction or determine which icon or composite icon to send.

In an exemplary embodiment of the invention, composed icons are used to overload a standard icon. Alternatively or additionally, a user may define different combination behavior and/or component behavior than provided in a standard icon combination, for example, changing the relative opacity of combined icons.

Optionally, a user can select an existing or a new name (or more than one names) for a newly added icon.

In an exemplary embodiment of the invention, one or more icon components sets are provided on a client device and take up less than 100 KB, optionally less than 10 KB, optionally less than 5 KB, or intermediate values.

Optionally, the server stores copies of user face icon definitions so that the server can replace faces in messages that go though the server. Optionally, the server updates a user definition used for user web presence, for example, IM or e-mail signature files. For example, the e-mail signature may include a link to a location supported by the server in which the combination icon or an image thereof is accessible.

In an exemplary embodiment of the invention, face icons are generated semi-automatically or automatically by finding a best correlation between face components and an image provided by a user. Optionally, as a component is matched, the image is updated to show the standard component rather than the image portion. Optionally, a game is provided in which users vie to best and/or fastest match a provided face image using pre-determined components.

In an exemplary embodiment of the invention, components can be manually edited, scanned in, cut out of acquired images, downloaded and/or otherwise modified or provided by a user.

Optionally, icon sets other than face icons can be generated, for example, clothing icons (e.g., body shapes and exemplary wardrobes) and animals. Optionally, users can download families of base icons and optional components. Optionally, not all component types need to be provided for each combination icon. Optionally, multiple icons can be placed side by side (or animated), for example a complete figure can include a face icon, a torso icon and a legs icon. Optionally, when the icon is animated, the animations of the various components are coordinated (e.g., optionally defined to be coordinated when used together), for example, to allow sleeves to move with arms or a mustache with a mouth.

Optionally, combination icons are used for language purposes, for example, to reduce memory storage for related icons, such as time icons (e.g., the clock can be shared). In another example, glyphs such as used in Chinese can be entered as a combination icon, formed of sub-strokes, each one of which is a combination.

Rich Media

The above description has focused on messages that are composed and displayed as a sequence of symbols which are displayed simultaneously on a receiving device and optionally scrolled if the screen of the receiving device is not large enough. In an exemplary embodiment of the invention, the display of an icon-based message is enhanced by one or both of additional media and dynamic presentation.

In an exemplary embodiment of the invention, media, including, for example, both icons and text may be enhanced by formatting instructions, such as size changing, rotation and color changes.

In an exemplary embodiment of the invention, colors are changed on a relative basis (e.g., relative to other icons). Optionally, one or more possible color maps are stored at the sender, server and/or receiver and/or are optionally transmitted. Optionally, a color change instruction affects a color map and/or is based on user preferences. Optionally, a user can modify the color map, so that the effect is different from the intended effect by the sender and/or to match other user preferences, for example, background color.

Slide Show

In a first example of dynamic presentation, the message is shown as a slide show, with each icon, symbol and/or sequence of text symbols being presented as a single icon that is enlarged, optionally, to fill the screen. Optionally, this mode may be used to show a message to a user not holding the mobile telephone.

Optionally, in order to distinguish between repeated cycles, a separator such as a big dot mark is implanted between consecutive cycles. Optionally, in order to separate repeated icons or/and all or some icons, blank periods (i.e. white screen or other type of separator) may be used. In an exemplary embodiment of the invention, the rate of icons change may be controlled, for example, based on sender settings, based on receiver settings and/or based on message settings. Optionally, a different delay may be associated with some icons and/or pairs of icons. For example, two icons that act as a pair, may be shown with a shorter delay, shown alternating once or more or shown simultaneously. Optionally, a message composer can select specific delays (e.g., absolute or relative to other icons) from one or more inter-icon delay. Text symbols may be enlarged as well, either presented letter-by-letter or by groups of letters such as complete or partial words. Optionally, the enlargement is such that a whole segment (and two consecutive segments may be provided as well) fit on a screen. While all icons are generally of a same size, in some embodiments of the invention, at least some of the icons have a non-standard size and settings may be provided to selectively enlarge the icons to the full screen or to maintain a fixed magnification factor. Optionally, for some devices, icon details are added when the icon is magnified.

Similarly, user settings may be provided for setting the zoom factor of the icons, zoom type (e.g., full screen) and/or number of icons to show simultaneously.

Scrolling, slide shows and/or other rich media features are optionally available for whole messages and/or parts of messages.

Optionally, a user can select if a message he sends has a default setting of rich media/slide show or not. Similarly, a receiver may have such a setting. Optionally, when a message is received, if it includes rich media directives, a user is allowed to selected whether to block such settings or allow them.

In an exemplary embodiment of the invention, only part of the message is shown as a slide show, for example a section selected by a receiver or when a pre-set portion of the message is indicated with a cursor or by other means (such as being scrolled to). Optionally, a user can select part or all a message and select an "animate" option, which applies an animation defined for the message or a default animation.

In an exemplary embodiment of the invention, these (e.g., slide show, enlarge, delay two seconds) and other non-displayed directives can be selected from list, using icons, or using other input methods, such as known in the art. Optionally, previously used display directives and/or their inverses (e.g., "stop X", is stored if "X" was recently applied) are stored in cache.

Not all the icons need be enlarged. Optionally, a composer can select how much to enlarge each icon if at all. Optionally, intermediate enlargement is provided and the message is provided as a scrolling streamer, for example, with 2, 3 or more icons on the screen at a time. Optionally, the scrolling is smooth (e.g., with icon portions shown as the icons scroll). Optionally, the icons are animated as they are enlarged, for example, shaken, rotated and/or following a path around the screen. Such animation may also be provided after enlargement and/or if no enlargement is provided. Default animations may be associated with each icon. In an exemplary embodiment of the invention, the animation or other "rich" property may be associated with one or more of user, telephone, user group, language (e.g., a culture group) and/or system.

Sound

In an exemplary embodiment of the invention, a sound may be associated with an icon or series of icons. Optionally, an iconic message includes a directive to play a sound, for example a series of notes, a sound string or a sound file located at the receiver, for example, standard sounds. In an exemplary embodiment of the invention, sound is synchronized to one or more of message opening, icon positions, icon appearance, snapshot (described below) or other events. Optionally, sound can be repeated until the message is completed. Optionally, a sound indication can include a start location and/or an end location and/or a repeat location in the file. One or more sound parameters, such as pitch, special effect, speed and instrument, are optionally provided.

In an exemplary embodiment of the invention, the client and/or a server include a function of converting and optionally exporting a series of sounds associated with a message as a ring-tone or as a voice message.

Non-Icon Visual Enhancement

As noted above, an icon message may be enhanced using text symbols. Optionally, graphical items are provided, for example, graphical images stored on the sender or received device and/or drawings created on the sender device. Optionally, the enhancement is an image, for example, one captured by a sender's telephone-mounted camera. Alternatively or additionally, the enhancement comprises a video clip, optionally captured by the user camera. In an exemplary embodiment of the invention, the image data is transmitted separate from the icon message and is downloaded by the receiver. In an exemplary embodiment of the invention, the sender sends the data to a server, including a code which is expected to be unique, for example, including the sender's telephone number and/or received by the server, and sends the code inside the message. Optionally, if the target device does not support the media, the server generates a WAP page with the message. These mechanisms may also be used for images that are stored both on the user's telephone and on the server (or only on the server), for example, if the server acts as a picture backup. Optionally, the sender indicates the enhancement as a URL to a web location which is retrieved by the server.

Animation

In an exemplary embodiment of the invention, an icon animation includes modifying the icon. For example, the icon "you" may be animated showing a finger pointing towards the reader and increasing in size (e.g., getting closer). In another example, a bowing person is animated showing the bow and indicating thank you. Such animation may use a small number of alternating icon images, for example, 2, 3 or 4 and/or replacement of image parts.

In an exemplary embodiment of the invention, when an icon has a predefined animation, a user may see the icon as static, but when in message view mode (e.g., preview or receive) the icon is animated.

In an exemplary embodiment of the invention, pairs of icons are animated, for example a pair of icons "not" and "go" are animated by alternating them and/or by overlaying the "not" on the "go".

In an exemplary embodiment of the invention, an icon is animated by moving the icon on the screen. For example, a path, speed and/or direction of motion may be defined for an icon.

In an exemplary embodiment of the invention, animation for an icon is defined as a set of icon images and positions which are run through as a sequence.

In another example of animation, an icon is given a different meaning by animation. For example, a "hi/bye" icon moving away or shrinking in size can mean "bye", and vice-versa for "hi".

Icon Position and Snapshot Animation

In an exemplary embodiment of the invention, animation is provided by generating a plurality of screen snap shots and showing the screens in sequence. In an exemplary embodiment of the invention, the positions of an icon on each screen is set using one or both of positioning directives (optionally entered using a scroll key to move the icon and/or a marker, optionally relative to a position on a previous screen) and spacing symbols. For example, spacing symbols may include one or more of "space", "backspace" and "new line". A "new page" directive may be used to mark a new snapshot. Optionally, the directives are provided in the symbol stream. Alternatively or additionally, they are manually entered by a user. Optionally, the directives are compressed into a more compact format. For example, 2 "new lines" and one "space" may be converted into "MOVE", "2,1", where "2,1" is an 8 bit pattern. Alternatively, positioning using a joystick or scroll keys are converted into "space" and "new line" directives. Exemplary directives include changing the display mode (e.g., to text entry), changing display orientation, Spaces, different size of spaces, expand icon, rotate icon, 'flash' icon on and off (or inverse), align (e.g., center, right-align, left-align), change font information, and/or adding shimmering or movement to an icon.

Optionally, a sound, size and/or delay are associated with each snapshot.

In another example, three lines and three screens are used. Screen 1: "go - -". Screen 2: "- go -". Screen 3: "- go home". Screen 4: "- - home", with "-" meaning a space. Shown in sequence a visual message indicating a scrolling "go home" is generated.

Additional Animation Options

In an exemplary embodiment of the invention, screen positioning and/or other animation instructions are provided per icon, for example, treating each icon as an object to which commands are applied. Optionally, a plurality of sets may be provided, each set including one or more icons, each with one or more commands to carry out. Optionally, actions are defined for when icons meet on the screen, for example, "overlay", "elastic collision", "gobble", "transition" and/or sliding into and/or out of the frame (which optionally wraps). In an exemplary embodiment of the invention, action definitions known to be used for sprites may be used for the icons.

In an exemplary embodiment of the invention, looping commands are provided, for example indicating a continuous loop, a time limited loop or iteration number limited loop on one or more snapshots and/or sets.

Optionally, transition between icons is by fading. Alternatively or additionally, the transition is abrupt. Alternatively or additionally, other transition effects known in the art of transition may be used.

In an exemplary embodiment of the invention, icons are animated in turn. Optionally, a time delay may be defined for each icon to indicate its relative animation time. Optionally, triggers are defined, in that a starting and/or finishing animation of one icon, triggers a next icon. Optionally, a default behavior is that icons in a message are animated in sequence. Optionally, animation of a previous icon is continued after animation of a next icon starts.

In an exemplary embodiment of the invention, the interface for defining animation comprises two levels and/or category. A first type includes basic placement (e.g., direct indication of screen location, new line, new screen and/or space(s). A second type is movements. Optionally, a movement command comprises a set of commands from the first type, for example, multiple spaces. In another embodiment, a "change" command is provided, where after or before the change command is inputted, the placement commands are interpreted as movement commands.

In an exemplary embodiment of the invention, when a message is received, it can be shown as a slideshow using a long press. Optionally, pressing any of the number keys will terminate the slide show. In an exemplary embodiment of the invention, the timing and/or relative timing of icon display and/or animation may be different for different viewing modes (e.g., slide show and regular view) and/or be set (e.g., at the sender or at the recipient) to be different for different recipients. Optionally, these differences are set during editing.

In an exemplary embodiment of the invention, when sending a message to multiple recipients, where each recipient is to view different visuals and/or animations, a server (rather than the sender) optionally modifies the message which is passed on to the recipient. Optionally, the server applies one or more preferences set by the recipient regarding himself and/or by a sender regarding certain recipients or groups of recipients. Such setting is optionally via a WWW interface.

In an exemplary embodiment of the invention, rich media is provided in the form of annotated images. In an exemplary embodiment of the invention, an image may be annotated by placing icons or icon components and/or animation on it. Optionally, the image is treated as an icon composition as described above. Optionally, as parts of the image are annotated, corresponding parts of the image are deleted. Optionally, a user can select to automatically match (e.g., using image matching methods known in the art) parts of the image to one or more icons or icon components from an icon set provided by the user or from a server. Optionally, the user ID is used to assist a receiver and/or a server to correctly interpret the icon instructions into icon images, for example, as described above. Optionally, the image is modified to replace its bit values by bit values from the icon images.

Integration with Telephone Functions

In an exemplary embodiment of the invention, the icon messaging is integrated with other telephone functions, for example being provided as an alternative to or instead of text-based SMS messaging and/or MMS messaging.

In an exemplary embodiment of the invention, the logic of the interface is the same or similar for icon messaging and for other telephone functions.

Iconic messages to be transmitted and/or received iconic messages, are optionally stored for future review and/or editing in Inbox/Outbox Block (409, FIG. 4) connected to the processor (403). The processor optionally has editing capabilities, optionally functionally associated with displaying and/or navigating capabilities of the mobile device. In certain embodiments of the invention, the processor is connected with a text and/or multimedia messages Inbox incorporated in the mobile device, thus facilitating integrated notification about incoming messages. An exemplary inbound process is further illustrated in FIG. 12. In certain embodiments of the invention, the icon messaging application uses the Outbox (not shown) of the mobile device for out-bound functions.

In some embodiments of the invention a separate input and/or output box (406) is provided for the iconic messages.

In an exemplary embodiment of the invention, when a message is received, the details of the sender are saved in a contacts list, optionally being downloaded from the server. Optionally, the user is queried before such saving.

In certain embodiments of the invention the "inbox" messages are displayed in a manner similar to displaying the set icons.

The received message may be presented by the first icon of the received message, with the name and/or number of the sender displayed on the icon or next to it. Optionally, if the second icon is a text element, it may be displayed instead. Optionally, the text is truncated or shrunk to fit a space equivalent to an icon size. Optionally, if the second element is a blank, the next non-blank element is displayed. Optionally, if there is only a single element in the message, the icon and the text below it will represent the same element. In a text display, the "name" of the first icon may be displayed.

In an exemplary embodiment of the invention, the messages are displayed in a matrix form, with each element of the matrix representing one message. Optionally, if an association is provided between senders and icons or images, an SMS, MMS or other non-icon message is shown in the space reserved for an icon. Optionally, the number of concurrently displayed messages in the inbox is limited by the number of input keys in the input interface of the mobile device and each displayed message is associated with an input key in a one-to-one correspondence. Optionally, a scrolling function is provided, to scroll between first icons. In an exemplary embodiment of the invention, when in a first message, say at icon 3, a scroll right moves to the same icon location in a next message. Optionally, the messages are arranged by sender.

In an exemplary embodiment of the invention, an icon or more are used (e.g., for display) as a subject for the message.

In an exemplary embodiment of the invention, a user has the option to reply to a message by editing a received message.

Similar mechanisms are optionally applied to the Outbox and/or phrase icons. For the Outbox the phone number and/or the name of the target recipient are optionally displayed bellow the icon representing the message. For icon phrases, the text can represent the first icon name.

Optionally, the listing method of icons is a FIFO type, for example, for limited space and/or including a mechanism to ask a user if a message needs to be erased before inputting a new message. Combined methods may be provided, for example, an automatic FIFO for Inbox and Outbox, and asking the user to erase if needed for the phrase icons of a new message.

The implementation of a phone/address book optionally depends on the mobile device. Some devices already contain a phone/address book software application and allow third party programs to interface with this phone book. In such embodiments the processor (403) may be connected to a phone/address book (410) of the mobile device. In certain embodiments of the invention the processor may be also connected to a phone/address book (405) within the iconic message application. This address book may contain an address directory where receivers' addresses may be telephone numbers, emails, IP addresses, Instant Messaging addresses, etc. The user interface in conjunction with the processor may facilitate the maintenance (e.g. operations to store, copy, erase, etc.) and operation (e.g. selection of entry) of the address book (405) in a manner conventional for the mobile device. Optionally, the messaging application allows direct entry of addresses, via input methods of the telephone, so a phone\address book is optional.

In an exemplary implementation, the user is requested to enter his nick-name or/and contact details when sending a message, for example, if not otherwise available on the telephone. Alternatively or additionally to using the phone/address book, a contact list using nick names or input contact details may be used. Optionally, the nick-name is sent embedded in the message, and the recipient may enter it along with using the phone number of the sender as revealed in the message details, as the sender details for a contact list. Optionally, a "save sender" option is provided at the receiver. Optionally, missing information is provided by the server, providing such information is indicated by the sender as non-private.

In an exemplary embodiment of the invention, the messaging application allows access to telephone operation while it is active and/or vice-versa. For example, a call may be placed and/or answered while composing a message. In another example, a message may be composed while a call is being made. Optionally, multiple messages and/or message types may be composed in parallel, for example, an SMS message and an icon message.

In an exemplary embodiment of the invention, the messaging application utilizes phone settings for its operation. In one example, menu language, icon names and/or background colors are based on user preferences. In another example, the direction (e.g., left to right, right to left, top to bottom, etc.) of message display and/or entry is dependent on telephone settings. Optionally, the direction is automatically selected based on the telephone language, country and/or language of added text symbols. Optionally, an arrow or other indication indicating message reading direction is provided on the display.

In an exemplary embodiment of the invention, the portable communication device (e.g., a telephone) uses icons and/or icon sequences and/or animations as a means for communication with a user. For example, system messages, alerts and/or menus may include one or more icons.

In one example, an "options" menu is shown as a junction sign or as the "whassup" icon.

A main menu is optionally provided as follows, arranged in a 3×3 matrix:

(a) Inbox—a two icon sequence—first the Zlango icon, then a down arrow.

(b) Outbox—a two icon sequence—first the Zlango icon, then an arrow going up. An alternative is a multi-icon sequence showing the same icon (e.g., the Zlango icon), moving and slowing down and "landing" on the grid.

(c) My-box (templates)—an open box alternating with a plurality of icons, or the "mall" icon alternating with the "me" icon.

(d) Send—the Zlango icon alternating with an arrow pointing up. If dedicated icons are provided, an animation sequence showing a Zlango icon being fired out of a cannon may be used. Optionally, the animation defines the overlap and/or relative transparency of the icons.

(e) Zlap—an animation sequence showing three or more alternating icons, optionally overlaid on a screen. It is noted that the telephone may provide a graphical background for the animation, for example, that of a screen, in this case.

(f) Exit—an animation sequence showing "stop" and "?".

(g) Help—a Zlango icon sinking in a sea.

(h) Contact lists—alternating icons of various people.

(i) Save—on the background of a wire, one existing Zlango icon moving slowly and a new icon being added. This can be, for example, a three or four frame animation. Optionally, the animation defines a frame outside of which the animated icons are clipped.

As an example of message animation, in an exemplary embodiment of the invention, while a telephone is sending a message, the telephone shows a short animation of a Zlango icon or of the message itself going through a door or window.

Contact Management

In an exemplary embodiment of the invention, the system, optionally including a server (below) assists in managing contact data.

In an exemplary embodiment of the invention, when a user sends a message to a contact which is not listed in the user's contact list, the reply to the message include updated contact information. Optionally, the sender includes a code to the recipient indicating that contact information is missing. The recipient, for example, either automatically or upon permission by the human recipient, includes contact information in the reply.

In an exemplary embodiment of the invention, a similar mechanism is used for updating contact information. In an exemplary embodiment of the invention, each user can decide what information about him should be publicly available. When sending a message to such a recipient (e.g., or periodically), the sender includes an indication of the currentness of the data regarding that recipient, for example, a date stamp or a checksum of the data. If the recipient identifies that newer data is available it sends it as a same message or as a new message.

In an alternative embodiment, the server keeps track of when a message was answered and provides user data at that time. Optionally, the server also keeps track of changes in user data (e.g., using a checksum mechanism, to match a user checksum to a server checksum) and updates recipients and/or a server-database accordingly.

Exemplary Server

In an exemplary embodiment of the invention, no server is needed. Instead, the messages are sent from one mobile device to the other, with the target device analyzing the received message (e.g., a first few symbols thereof) to determine if it is a regular text message or an icon message. For example, all icon messages may start with "#$". Alternatively, when a user sees such a message start, he activates the application for viewing icon messages. Alternatively, the messages are sent as application triggering messages which cause the execution of a target application at the receiver.

Figure 5:
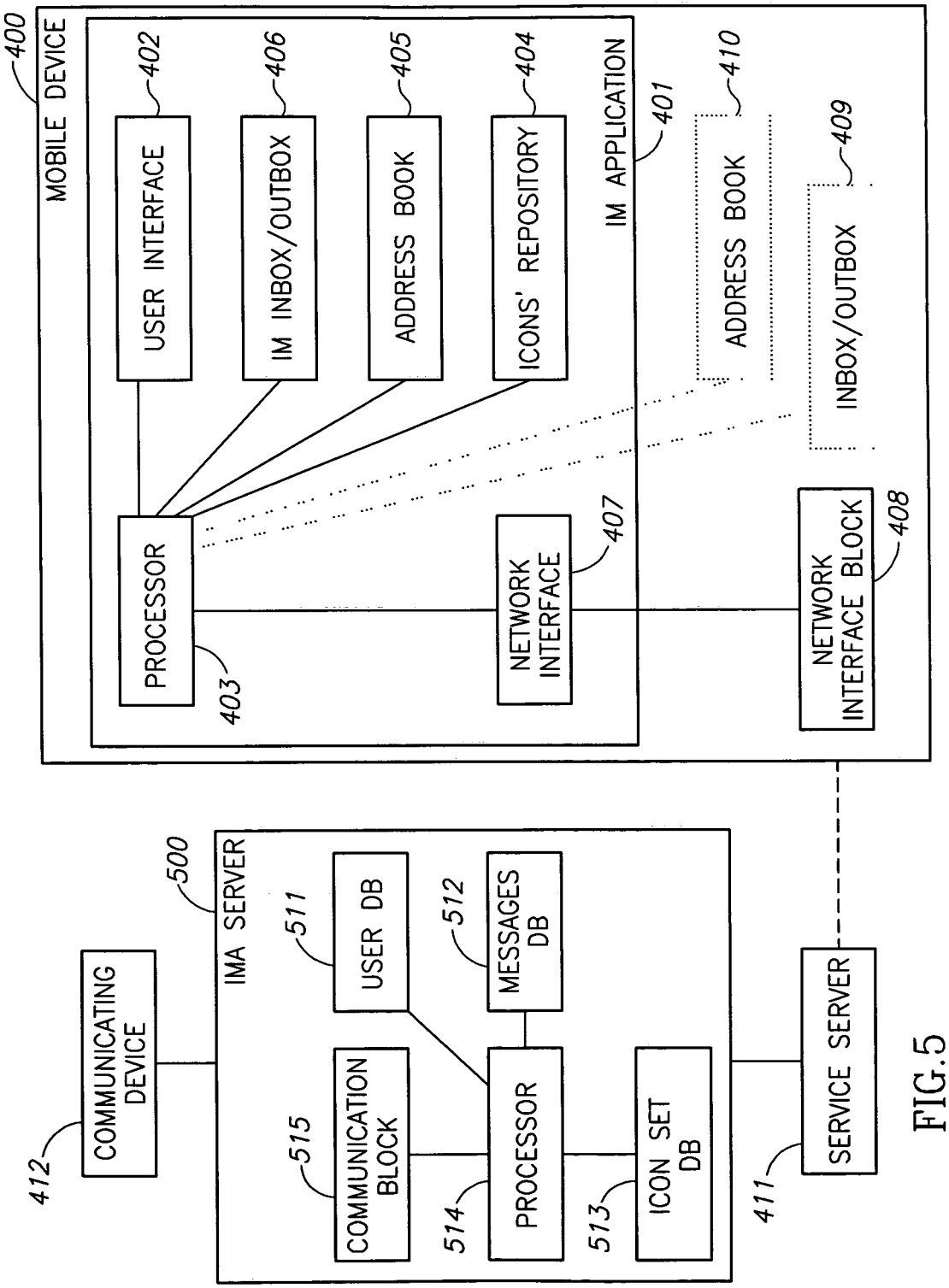
FIG. 5 illustrates a generalized block diagram of exemplary functional architecture of a computer application product for incorporation in a mobile device and the system comprising said application in accordance with certain embodiments of the invention.

In an exemplary embodiment of the invention, the application is incorporated in a system operating in a client-server mode, as illustrated in FIG. 5, where a server interfaces between client mobile devices. In the embodiment schematically illustrated in FIG. 5, by way of non-limiting example, the mobile device (400) illustrated in FIG. 4 is connected with an IMA (iconic message application) server (500) via Service Center (411). The IMA server is not necessarily a single and/or stand-alone computer and may be distributed among several different computers running several applications (e.g. SMSC, MMSC, etc.).

The IMA server optionally contains a User Database (511) for storing data related to registered users (e.g., one or more of software version, personal data, subscription information, group membership, billing information, type of device used, operator, contact lists, icons). In certain embodiments of the invention the User Database also contains data related to user groups (e.g. names of groups, users' group membership, etc.). The IMA server may contain an interface that allows users to create a new group and control membership (e.g., one or more of send invitations to others to join, approve or deny requests to join, remove members, have administrator privileges over the group, grant such privileges to others). The processor (514) optionally supports different types of processes inside the group, e.g., interactive "democratic" or centralized decisions concerning, for example, one or more of new member, new icons and icon names, and/or tailored graphical images of "common-use" icons.

The IMA server optionally contains a Message Database (512) for storing some or all of the messages sent via IMA sever. Optionally, the IMA or other computer analyzes sent messages for various purposes, for example, for acquiring combined statistics of icons used by all users. Optionally, once analyzed, the messages are discarded.

In certain embodiments of the invention, the IMA server contains an optional DB (513) which is used for centralized storage and maintenance of the data related to the iconic set (e.g., one or more of categories, set icons, ID, graphical images and/or icon names). This database may also contain different versions and customizations of the iconic set. In certain embodiments of the invention database 513 contains data related to user groups (e.g. sets of dedicated set icons for each group) in which optionally only members of a particular group are authorized to download the dedicated set icons. Authorization is optionally implemented via standard mechanisms of authorized downloading from IMA server, e.g., the applications contact the IMA server via TCP/IP with a request for downloading, the server identifies the requesting device and approves or denies the respective download.

In an embodiment providing special icons and/or users group, the server optionally manages the assignment of the icons to the specific users, for example, by using the user telephone number or other ID. Optionally, the client supports the assignment. Optionally, each group name is associated with an ID number and a special icon, message or message section can be prefixed with the ID. Optionally, message sections to be treated specially (e.g., formatting, icon group) are delimited with a "start" and an "end" symbol. Optionally, such delimitations may be nested. Optionally, the formatting prefixes or postfixes one or both delimiters. Optionally, the association of group codes or formatting codes is managed by the server. Thus, for example, a user may use 8 bits to select between 256 groups, while the server can support a substantially infinite number of groups by storing a table mapping the real group ID to the client limited subset.

The special icons groups can use dedicated keys or other selection for insertion into a message. For example, the groups can be mapped as described in conjunction with Table 1 above, while the group ID upon downloading a new icons group will be interpreted as a command to map the group into such selections means. An exemplary implementation is using keys 1-9 to select the general categories, key 0 is assigned to special categories, in which each new category added will be mapped under it (i.e. the first one will use 0-1 for selection, the second will use 0-2, etc.).

Processor 514 is optionally coupled with these databases for processing and management of the stored data. The processor is optionally coupled with a communication block (515) to facilitate communication with a server and/or other and communicating devices. Processor 514 may also perform protocol translations and use different forwarding schemes (e.g. push vs. pull as further described in FIG. 12) in order to support a multitude of different devices, with different abilities, on different networks. The processor optionally incorporates statistic tools capable of aggregating and analyzing data stored in above databases.

In certain embodiments of the invention the IMA server translates between different types of networks, such as between a CDMA mobile network to a GSM mobile network. In exemplary implantations, the message body itself is the same, but the message header is different between the various networks. An example is using a J2ME port number for the GSM J2ME implementations, versus Class ID in the CDMA BREW-based implementations. In further embodiments some clients may have different values of headers, and the server may translate between them.

In certain embodiments of the invention the IMA server may facilitate composing and originating of sending an iconic message in a manner similar to the messages originated by a mobile device. This capability may be used for sending system-originated messages of different types, e.g. for mobile advertising, personalized content services, update alerts, etc.

In certain embodiments of the invention, database (513) and/or icon repository (404) contain at least one special category (hereafter "system category") and at least one graphical image associated with this category (hereafter "system icon"). The graphical images contained in the system category may be, for example, set icons, trademarks, logos, other commercial graphical images. Optionally, these system icons are not available for a user while composing a message via mobile device, but may be included in messages originated by IMA server and/or $3^{rd}$ party server. These system icons may be received and read by the user.

The IMA server may also facilitate overall maintenance of iconic mobile communication process including, for example, one or more of subscriptions management, billing, version management, set updates and/or promotion. (The overall maintenance optionally includes push- and/or pull-upgrades of application and parts thereof incorporated in the communicating devices).

Those skilled in the art will readily appreciate that the scope of the invention is not necessarily bound by the configuration of FIGS. 4 and 5; equivalent and/or modified functionality may be consolidated or divided in another manner. Some particular details of implementing a server and/or a client in accordance with some embodiments of the invention are described in application entitled "Communications Network System and Methods for Using Same" filed in the Israel Receiving Office of the PCT, serial number PCT/IL2006/000062, and to the application entitled "Communications Network System and Methods for Using Same" filed in the Israel Patent Office, serial number 173169, and to an provisional application 60/807,855 entitled "Communications Network System and Methods for Using Same" filed on Jul. 20, 2006, the disclosures of which are incorporated herein by reference.

Exemplary Message Conversion Process

Figure 11:
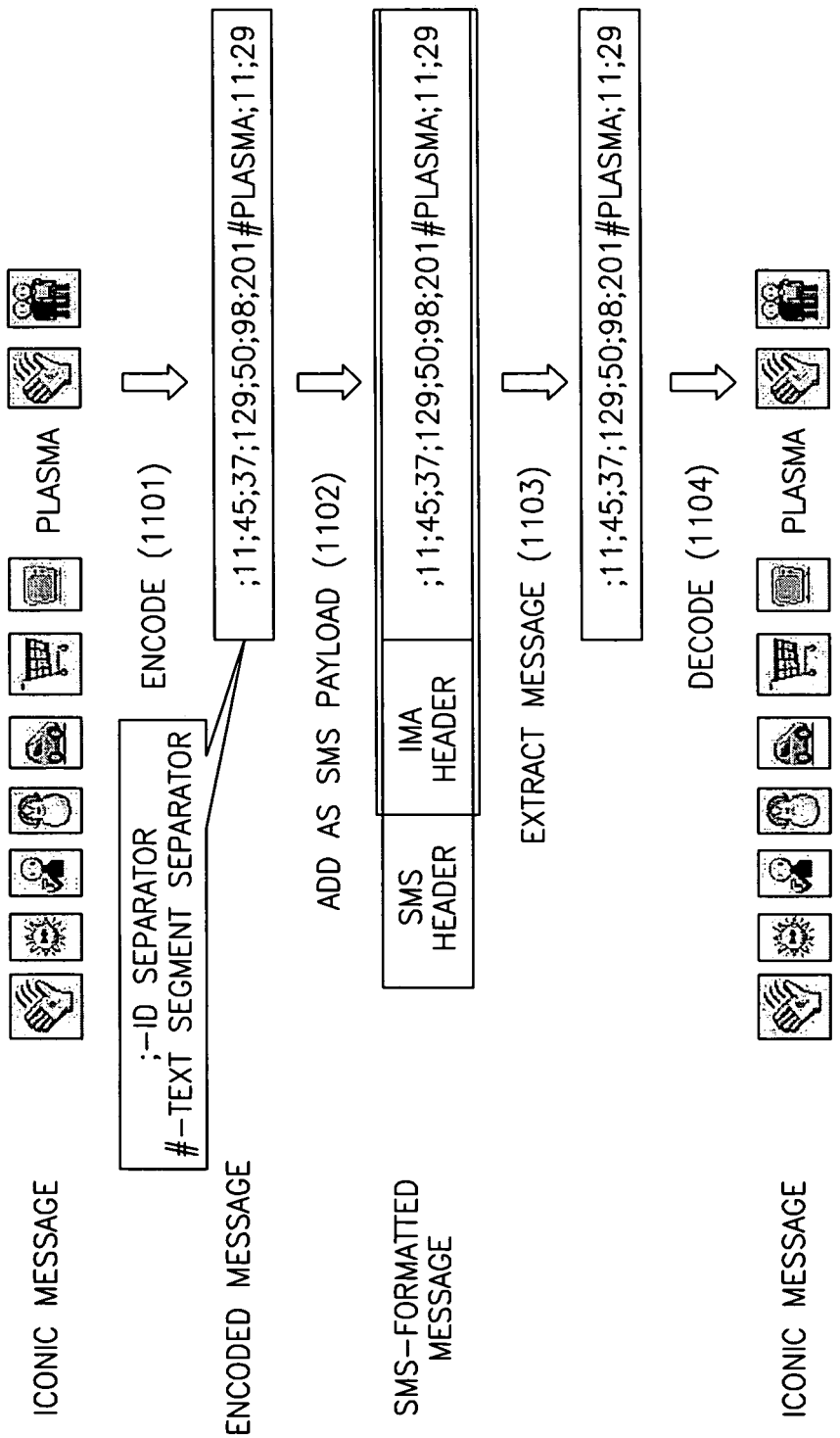
FIG. 11 illustrates a generalized flow diagram showing the principal steps of converting an iconic message in accordance with certain embodiments of the invention, implemented for SMS communication.

FIG. 11 illustrates, by way of non-limiting example, a generalized flow diagram showing the principal steps of converting an iconic message, in accordance with certain embodiments of the invention, implemented for SMS communication.

In certain embodiments of the invention, each set icon has a unique identification number (ID) assigned to the set icon and stored in the repository (404, FIG. 4). For the purpose of the example, these IDs are not necessarily as shown in table 1 and FIG. 13, but generally will be. After an iconic message is composed and a user activates its transmission, the processor facilitates encoding the message (1101). Encoding may be implemented in different ways, e.g. using ASCII-based codes with special symbols separating the numbers associated with different IDs as illustrated in FIG. 11, coding each icon's ID in a binary format of fixed length (e.g., 8 bits), or using other methods known in the art of symbol transmission and formatting.

Network Interface (407, FIG. 4) facilitates converting the encoded message into a message complying with a service transmission protocol. For example, for complying with SMS service the network interface converts an encoded message into the SMS payload (1102). For this purpose the network interface may be designed, for example, by implementing J2ME Wireless Toolkit supporting the Java Technology for the Wireless Industry specification (see, e.g., http://java.sun.com/products/j2mewtoolkit/, the disclosure of which is incorporated herein by reference). The J2ME (Java 2 Platform, Micro Edition) Wireless Toolkit is a toolbox for developing wireless applications designed to run on cell phones, mainstream personal digital assistants, and other small mobile devices. The toolkit generally includes emulation environments, performance optimization and tuning features. The toolkit may include the Wireless Messaging API (WMA) that provides platform-independent access to wireless communication resources like Short Message Service (SMS).

The message transmission for SMS communication may have different implementations for client-client and client server modes of operation. In client-client mode (illustrated in FIG. 4) the message contains a standard SMS header (e.g. as used in GSM, CDMA, etc.) including a destination phone number, and an IMA-designated port number of a mobile device (typically different from the default or other "well known" port numbers; in CDMA BREW it may be called a "Class ID"), and an encoded iconic message as the SMS payload. In a client-server mode (illustrated in FIG. 5), the message optionally contains a standard SMS header (e.g. as used in GSM, CDMA, etc.) with the destination number of the IMA server, while the SMS payload contains the IMA header (including destination URI) attached by the application to the encoded iconic message.

Destination URI may be in various formats, for example, one or more of:

a. To another phone, e.g.: tel://[phone number], e.g. tel://+972544550135;

b. To an email, e.g.: email://[email address], e.g. email://abc@aol.com;

c. Direct to an IP, e.g.: udp://[ip address]:[port], e.g. udp://127.0.0.1:8009;

d. To a cellular telephone (e.g., on a same or different message); and/or e. To an Instant Messaging user.

Optionally, an icon message can be sent to a set of contacts simultaneously. Optionally, the client and/or server determine which transport method to use for each recipient.

The SMS Center optionally recognizes the standard SMS headers, handles the rest of the message as payload and forwards it as-is to the destination device (IMA server in a case of client-server mode). IMA header is extracted by IMA server to define where to deliver the message. Upon receiving the SMS-formatted message, the operation system of the receiving device extracts the SMS header (1103) and forwards the rest of the message to the iconic message application. The SMS-formatted message is further decoded to an iconic message to be displayed in the receiving device (1104), for example as further illustrated in FIG. 12.

FIG. 12 is a schematically illustrated generalized flow diagram showing by way of non-limiting example the principal steps of iconic messages-based communication via Short Message Service (SMS) network in accordance with client-server embodiment of the invention. It should be noted that other messaging sub-systems may be used, for example, MMS, i-mode or a dedicated messaging system.

After a user has composes an iconic message, the user selects a receiver and presses "SEND" (or activates the transmitting process in any other way convenient to the mobile device and/or user) (1201). The processor (403, FIG. 4) encodes the message in a format compatible with a standard message service (e.g. as illustrated in FIG. 11 for SMS service) and via the network interface (407, FIG. 4) sends the message to the service center (e.g. SMS Center) (1202). After receiving the iconic message the service center parses the message header, recognizes iconic message per special mark (e.g. port number) and forwards the message to IMA server (1203).

Old generations Handsets J2ME implementations might be lacking a module called WMA (Wireless Messaging API, JSR 120) that provides the option of generating an SMS from the application. In such cases the client would initiate an IP (typically HTTP or WAP) session with the server and will then communicate the message to the server.

Upon receiving the message the IMA server identifies the receiver and obtains the receiver related information from the user database (1204).

If the receiver's device is not empowered by an Iconic Message Application or there is any other reason why the receiver is absent in the users' database, the IMA server may notify the sender via Service Center about delivery failure. In certain embodiments of the invention, the IMA server may translate the iconic Message to a format acceptable by the receiver (e.g. MMS) and send the re-formatted message to the receiver via the Service Center. Alternatively or additionally the server can create a WAP page with a rendered image of the message. Optionally, the WAP page is match to various common screen sizes, and using continuation links the rendered message can be divided into consecutive pages, in case the target device is limited in presenting a large page. Additionally, the target device handset may be identified by a stored profile or ID carried by the WAP transaction protocol by the UA-Prof or/and UA-Header, or based on information otherwise available to the server and/or cellular operator. Then a suitable WAP page is optionally rendered to match the target display and/or browsing capabilities. The WAP page(s) optionally contains link to download the matching client software from a download server.

Optionally, the Server notifies users who do not have a suitable handset and/or software that they can not see the message. Alternatively or additionally, the server translates the message into a text message. Alternatively or additionally, the server places a rendered message at a certain Web location and directs the target user to view the page using a suitable means such as a PC connected to the internet. Alternatively or additionally, the server sends the message over email.

Upon identifying the receiver, the IMA server optionally determines a type of receiving device contained in the users' database and translates the message format in order to fit this type. For example, if a message is sent to an e-mail address the IMA server can decode the received encoded iconic message, create an image file with the appropriate icons, and send an email message to the target email address via SMTP, with the image file as an attachment to this message (or as HTML or RTF mail). In this manner standard e-mail clients can receive iconic messages without needing installation of any specific software. Similarly, to support instant messaging, e.g. ICQ, the server may send the message via the ICQ protocol, as if it were sent from another ICQ client, etc.

Further to assist in identifying the sending handset, a client-type ID may be implanted in the software that is downloaded to the server. As part of the installation or an automated post-installation phase, the client will generate an activation message that is sent to the server and informs the server about the new supported handset. This activation message can contain the client type ID and/or other parameters such as the client software version, version, name of the operator, and a user name that is input by the user. Such an activation message may be re-transmitted for updating the server in case of various events, such as changing the user name, installing special icons packages, transferring the SIM-card in case of GSM service to a different handset, etc. Optionally, the activation message allows instant service if/when an external download server is used, and adds a significant delay in generating reports on new certified users and passing such reports to the server. Optionally, an activation message is used to prevent the software from being used without registration. Optionally, the application software requires periodic (and automatic) activation, which activation ensures that an authorized server is being used for iconic messaging and/or to prevent non-transmitting uses of the software.

On old generations J2ME handsets that are lacking a WMA (Wireless Messaging API, JSR 120), the client optionally initiates an IP (typically HTTP or WAP) session with the server to communicate the activation message.

If the iconic Message is sent to a mobile device, the IMA server optionally determines the target device and what method it can use for receiving messages. The method can be, for example, the CDMA BREW or the GSM Mobile Information Device Profile (MIDP) or another method. FIG. 12 is based on MIDP, but a similar implementation may be used for other types. The IMA server optionally determines which MIDP (1205) is supported by the receiver. These determinations are optionally by using data stored at the server or cellular operator or based on a query to the target and a response therefore. MIDP is a J2ME implementation for handheld devices (see detailed description, e.g., at www.jcp.org, the disclosure of which is incorporated herein by reference). Most of the currently available mobile devices support MIDP1 version (specification JSR-37) while the new generation supports MIDP2 version (specification JSR-118). One difference between the versions, as far as the certain embodiments of the present invention are concerned, is that MIDP 2 allows an application to register as a default handler of SMS messages that are received on a specific port, whereas MIDP 1 does not allow that. Thus, on MIDP 2 devices it is possible to send IMA messages in push mode, and have the device OS transfer them automatically to the IMA application to handle, whereas on MIDP 1 devices an IMA application can work in pull mode in order to ensure that it handles the IMA messages, and not the default messaging software on the device.

An Iconic Message to a mobile device supporting MIDP1 (but not only) is optionally stored in IMA server (1206). In certain embodiments of the invention, the server informs the receiver regarding a new message by sending a notification message (e.g., ordinary SMS sent to the receiver's device) or other alert. To get a new message, the receiver activates the iconic Message application and downloads the message (1207) from the message database (pull mode), optionally, by polling. If the receiving device supports MIDP2 version, the IMA server may send the iconic Message to a designated port of the device (1208). The iconic Message application will be automatically activated and the receiver will receive a notification and may read the iconic Message (1209) in a manner similar to a regular message.

Matching of Icon Codes, Icon Images and Icon Text and User Groups

The sender and receiver of the iconic message may have different preferences of, e.g., graphical images, to be used for the icons expressing substantially the same concept. In certain embodiments of the present invention, set icons with different appearance have different IDs and the decoding process may \include a replacement of original ID with a new ID (and, accordingly, a new graphical image) in accordance with a pre-defined correspondence. For example, if originated message contains a slot machine (ID=A) as a graphical image for "luck" while the receiver prefers a dragon (ID=B) as a graphical image for "luck", the application incorporated in the receiving device may further contain a predefined rule to replace ID=A with ID=B after decoding and before displaying. In other embodiments, the same ID is used but each associates different images with the ID.

As noted above, in some embodiments of the invention, the iconic set is used for mobile communication inside some community (e.g. stock brokers, sports fans, etc.). The members of such community (hereinafter "user group") may personalize the look and meaning of existing set icons, add and/or delete set icons, categories and sub-categories in accordance with their internal needs and preferences. For example, 'go' in FIG. 2 can mean 'walk', or 'kick' in rustlings sport aspect.

Optionally, new icons are generated with the group and voted on, alternatively or additionally, to voting on other preferences, such as word meanings. Such mechanism may also be used for system wide definitions.

Some of the textual elements such as the icons names or/and the Help text may also be different between various languages. Optionally, same languages are set as separate groups, for example to indicate different cultures, for example, Irish vs. Scottish.

Optionally, the server stores a set of "regions" or groups that exist in the system, optionally organized according to one or more of a geographical key, demographic key and/or alphabetic key. Optionally, a user can belong to multiple groups. Optionally, a group to be used for a message depends on one or more of the target recipient, icons used in the message (e.g., category 0-3, as described above) and/or is manually selected. Optionally, only a part of the message is affected by group settings. Alternatively, the whole message is, for example, modifying font type and direction according to the group.

Optionally, each handset type can have it's own matching parameters; for example stored icons sized to match its screen resolution or/and different mapping of the key's for the application functions and options controls, per the availability of such keys on the specific handset. Another set of parameters may be related to the memory structure and usage scheme of the specific handset; upon availability the user name or contact list and inbox/outbox/phrase icons and special icons if installed are better saved in a persistent memory that is not erased upon software upgrade. Optionally, such memory is used to store part of the graphics. Optionally, if the memory is shared between applications, it can also be used to separately upload graphics content, for example for special personal packages. An example for such memory is the RMS available in some J2ME handsets.

Other methods, possibly useful when a memory for storing additional graphics is available, may be used, such as uploading missing icons directly from the Sender (e.g., using SMS) or from the server (e.g., using session or an SMS). An automated mechanism may be used, in which, if an Icon or a whole category are not presented, they can be fetched form the server. Such methods may be may used to build virtual/dynamic repositories on the handsets. Optionally, this allows handsets with very limited storage memory can be used, for example, less than 200 KB for the application, less than 100 KB for the application, less than 50 KB for the application, or less than 20 KB for the application. Optionally, by using the server and/or sender as a virtual memory (e.g., paged memory downloaded upon demand), a range of handsets with different memory abilities can be supported. Optionally, the local memory is used as a cache.

As noted above, dictionaries may be used for overloading other dictionaries, especially standard dictionaries. Optionally, a message includes a code which indicates what dictionaries to use in interpreting the message. In an exemplary embodiment of the invention, the dictionaries are used to store instructions for message/icon modification, and thus include records matching codes (e.g., hints) and instructions and/or images. Optionally, all the icons are provided as dictionaries, including the basic icon set included with a client software package.

Additional Applications

In certain embodiments of the invention the iconic set may be used for mobile advertising, mobile content services, mobile games, and/or other activities that are not pure person to person messages.

In an exemplary embodiment of the invention, a promoter can send to a service provider a list of names a message should be sent to. This message is then sent to the clients. Optionally, dedicated icons for the promoter may be added to the icon set, for example, on a temporary or permanent basis. Optionally, the icons IDs are added by the server to exiting message traffic. Alternatively or additionally, the icons cannot be seen and/or entered by a user.

Optionally, the client application supports surfing to a web or WAP or other external data source, responsive to the icon. Optionally, such associations are stored at the client and/or server.

In an exemplary embodiment of the invention, a slideshow or other animation can be used as a screen saver. Optionally, a screen-saver mechanism on the mobile device activates the client application in a view mode and when a key is pressed, control is returned to the mobile device and not the application.

Optionally, the server or other provider can convert an animation into a JAVA or other stand-alone executable.

In an exemplary embodiment of the invention, a ring-tone is created by reading out of messages by a known person, such as an actor. Optionally, whole messages are read out. Alternatively, individual icons are read out and assonated audio files are available for download. Optionally, such an icon message may be sent to a voice mailbox.

In another example of promoting the icon set, games may be provided where the icons serve as play pieces. Optionally, a user can start a game form an existing message, with the pieces shown serving as play pieces for the instant play.

In an exemplary embodiment of the invention, icon communication is used for mass cooperation. One potential advantage over polling is that while a wide range of responses is available, the number of different icons possible (e.g., in a one icon response) is quite limited. This is in contrast to language based polls where a poll typically gives a limited list of options or allows free-hand answers, even if only a single word, that can easily result in thousands of possibilities for a large poll. Using icons, while the response set is bounded, a user can succinctly express emotion and/or opinion.

In an exemplary embodiment of the invention, multiple users can combine to send a single message. For example, three people at a football match, creating a combined message with three telephones: (user 1): Referee (user 2): Go (user 3): Home.

In one example, during a sports even, the audience (e.g., at the game and/or at home) can select an icon or two to indicate their instant feeling (e.g., a response to a goal). The most common icon can be used as the representative response.

In an exemplary embodiment of the invention, icon messages are used by users to express emotions, for example, while watching sport events. Optionally, for a given sports event, a user may download (e.g., form the internet or from a cellular provider or via memory card) a set of suitable icons, for example, the names of team players and "referee". Optionally, the visuals are adapted to the particular match. Optionally, shortcuts to player icons are provided according to shirt numbers of the players.

Optionally, for example to enhance ambiance, the "standard" icon set is modified to fit the mood of a match, for example, replacing people's heads with soccer balls.

Optionally, a set of icons, animations, sounds and/or background colors are packaged as a theme which are optionally downloadable. Optionally, a user can edit such a theme set. Optionally, a user can select when to activate such a theme, for example, at a time and/or place near a football match. Optionally, the theme includes default setting and/or message templates.

In an exemplary embodiment of the invention, a theme includes a set of rules matching a background color (or animation) of a message to contents of the message. For example, the color may depend on one or more of sender ID, recipient ID, icons included in image and/or time of day. Optionally, a theme is selected to match user vision limitations, for example, ensuring enhanced contrasts (e.g., by color selection and/or icon design). In another example, larger icons (and fewer icons at a time) are shown. Optionally, a theme is used to express a setting, for example, a more "respectable" setting, with fewer colors, for a businessman.

Optionally, a billboard is provided at the sport event and/or as part of a TV display on which an indication of the user's messages are displayed, for example, an opinion of the referee or of a current ball holder.

In an exemplary embodiment of the invention, a spectator battle is provided, in which spectators of the billboard send messages to the billboard. For example, the billboard can show two figures, with spectators choosing if to support one figure or the other. The figures may represent teams. Optionally, special icons for moves by the figures (e.g., kicks) are provided. Optionally, the majority icon message is followed.

FIG. 14 shows a configuration 1400 which may be used for example for a billboard, in accordance with an exemplary embodiment of the invention.

A telephone 1402 may directly control an external display 1404, such as a billboard or a blackboard, via a link 1406. Optionally, the display comprises a computer screen, for example, in a room. Optionally, the display comprises a personal computer. Examples of direct links are Bluetooth and IR.

In an exemplary embodiment of the invention, the display instructions are direct iconic messages. Alternatively or additionally, an intermediate mediator system 1408 (e.g., a server) interprets the instructions into display commands. Optionally, the icons are available on server 1408 and/or display 1404. Optionally, server 1408 mediates for multiple telephones, for example, telephone 1402 and an additional telephone 1410.

Another example of a display device is a billboard as shown, for example at train stations, showing arrival and departure times. Optionally, the control consists of setting one or more icons which are to be shown while the displayed data (e.g., time tables) is being updated. Optionally, the displayed icons are shown as image sequences.

Another example of a display is an audio display, which, for example, sounds out the icons or music sounds with them.

Optionally, the server and/or client device communicate with multiple displays. In the example of a server, the server may control the displays to show a coherent message, for example, some icons on a first display and more icons with matching animation timing in a second display.

Another example of a display is a worn display. Optionally, this display is not an image display. A particular example of a controlled worn display is a small wireless sparkler 1412 which includes a receiver 1414, for example, a Bluetooth receiver and circuitry 1416 which selectively powers a light (e.g., a LED) 1418. Optionally, the sparkler is shaped as a plug to be inserted into pre-formed holes in an upper side of a shoe. Optionally, specific sparkle instructions are defined for different icons.

In an exemplary embodiment of the invention, a chat application is provided, where users can exchange icon messages with each other and/or be located in a chat room. Optionally, the room environment is supported by the server or by a separate server. Optionally, icon messages are translated into text for non-supporting telephones. Optionally, each user sees the chat room in his own language. Optionally, text messages are translated into icon messages on the fly.

Alternatively or additionally, icons are used for posting messages on a community page. Optionally, multiple communities are supported, for example as known in the art of on-lien communities. Optionally, the community page is a WAP site. Optionally, a service provider monitors and/or filters content on the site. Optionally, analysis of traffic on the site is used by the service provider to update icon preferences.

In an exemplary embodiment of the invention, the messaging application screens are provided as WAP (or XML or HTML or other tagged language) pages and a user selects categories or icons by entering numbers or selecting a line or URL representing a category or icon. For example, each image of an icon may have the icon name near it, which name also serves as a URL.

In an exemplary embodiment of the invention, the iconic language is used for multi-user games on the internet and/or between cellular telephones. A particular advantage of the icon language is that players can chat as they play without a shared human language. Optionally, the instructions, menu and/or alerts for the game are provided as iconic images and/or animations.

In an exemplary embodiment of the invention, an existing software is internationalized by replacing text display instructions with icon display instructions. Optionally, the icons used for replacement are personalized, for example, using a dictionary as described above. In some embodiments of the invention, the personalization is only to the visualization of the icons, not to the series of symbols used.

In an exemplary embodiment of the invention, an automatic translation from text to icon message is provided. Optionally, words that do not exist in the icon set, such as "the" and "by" are deleted. Then, existing text sequences are translated using a dictionary. Words not in the dictionary are optionally provided as text. For multi-lingual uses, a direct language-to-language translation may be used.

In an exemplary embodiment of the invention, one or more personalized dictionaries are provided in which text words are translated in a non-standard way, for example, the name of a common enemy may be translated as the "hate" icon. In some embodiments, a word is replaced by more than one icon, for example, two, three or more. Optionally, a word is replaced by a series of icons, each representing one letter of the word. In another example, only part of a word is replaced by an icon.

In an exemplary embodiment of the invention, a plurality of visuals are available for a symbol or word and the visual is selected randomly.

In an exemplary embodiment of the invention, the iconic set is used as a translation tool. A user enters a message in the icon set. Then the user requests translation into a target language, for example, using a locally stored dictionary or using a server. This message is shown to a target user. A potential advantage of using an iconic set is that the original message is distilled by the user in order to express it in the icon set. Then ambiguity of translation may be reduced. Optionally, idioms (intentional or not) may be reduced in this manner.

While the above apparatus and methods have been described focusing on iconic sets, the above methods may also be used for other data, for example data that is transferred using the SMS or MMS protocol. One example is transmitting of formatted text (e.g., including size, font, angulation, etc.). Another example is arranging a chess board, in which each chess piece is indicated by an icon, which is arranged in an 8×8 matrix. Optionally, each such icon has associated therewith a screen position. Another example is building a basket-ball team, where a user sends a message including only five icons, out of a set of 15 sent to the user. This message may be used to track spectator desires in some games.

In another example, icons or pictures are used. For example, a wife sending her husband (or child) to do shopping, prepares a list which includes icons or images of the products to buy. Optionally, these images are captured at home or in the store (or downloaded).

Personal to business applications may be provided as well, for example, a user sending a shopping list using a message composed of pictures, codes (where known) and text (when codes and pictures/icons) not available. Another example, is voting on a "best player" in a sports match, for example, by entering the player number or icon.

An example of a business to personal application is messages from a bank or broker (e.g., an icon indicating a recommendation for a three-letter stock indicator).

An example of a game is "pass", where a user needs to send an icon message to another user not previously in the chain, for example within a time limit. The server can watch the chain and make sure it does not loop (e.g., by rejecting addresses that are in a chain. Optionally, the chain has a theme, for example "supporters of Manchester United".

The above mechanism of determining most used icons and generating caches may also be used for other data on cellular telephones, for example, text fonts and/or emoticons. Optionally, an on-going optimization process is provided. Optionally, icons that are not used often enough are discarded from the set. Similarly, icons and/or sub-categories may change in level and/or category according to their use.

In an exemplary embodiment of the invention, iconic communication and/or user interface is used for non TextSMS applications, for example, for an instant messenger application and/or as an interface when using a personal computer.

In an exemplary embodiment of the invention, peer-to-peer networking is used to propagate the client software and/or dictionaries and/or other portions thereof. In an exemplary embodiment of the invention, a telephone can broadcast (e.g., using Bluetooth or other short range wireless link) a desire to download dictionaries and/or other forms of animation and/or graphics or images. Alternatively or additionally, a telephone can broadcast a desire to share such dictionaries. A user, identifying a desire to download or a desire to upload may selectively approve the upload. Optionally, the user is provided, via the client with the ability to sample the offered dictionary or other data. Optionally, the dictionary is downloaded as a restricted dictionary, for example, as a dictionary which the software client refuses to transmit on or as a dictionary which is automatically deleted after a while. Optionally, if a user decides to accept the dictionary, the sender is optionally reimbursed by transfer of funds between the accounts of the sender and the receiver.

Optionally, a server is used to track the various accounts and/or rights to access content of different users.

In an exemplary embodiment of the invention, dictionaries, icon lists and/or other information are sent using cellular messaging methods, for example, MMS or SMS. In an exemplary embodiment of the invention for MMS, the images are transferred as parts of the MMS image and data regarding the symbols is transmitted using color variations to encode data. In SMS, a hexadecimal dump may be sent. These methods may also be used for other communication methods, such as ringtone messages, e-mails with pictures and instant messages.

The above mechanism of groups may be extended to fields other than icon sets. For example, user display settings, font settings and/or colors (or formatting instructions) may be supported by groups. The above mechanism of translating at the receiver based on the group he belongs to may be used as well.

PC-Type Interfaces

In an exemplary embodiment of the invention, the interfaces provided for more robust devices, such as PC computers are different from those provided to cellular telephones, for example, to take advantage of larger displays, keyboards and/or better processing power.

In an exemplary embodiment of the invention, when entering icons in a PC computer, stickers are provided to a user to stick onto keyboard buttons and indicate which button will generate which icon. Optionally, a keyboard button is mapped to multiple icons. Alternatively or additionally, the numeric key-pad is used in lieu of the cellular telephone keypad. Optionally, the layout of icons (or screen mapping) is maintained to be compatible with those of a cellular telephone, even though the arrangement of numbers is different. Alternatively or additionally, an icon is selected by entering its name (or a synonym thereof). Optionally, word processing software is provided with a pop-up menu suggesting to replace a word with an icon and/or providing translation of the words one by one into icons. Optionally, words that have a corresponding icon, are marked accordingly. Alternatively or additionally, a thesaurus tool is provided to match up words and icons. Alternatively or additionally, a separate application is provided which identifies selected words on the screen and can recommend a replacement icon. Such technology is in use currently for translation and for voice read-out, and can use, for example, OCR from the screen or hooking of the windows display function calls. Alternatively or additionally, icons are selected by mouse, for example, from a 3×3 matrix or from a larger matrix. As shown below, one or more levels may be collapse into a single level and displayed simultaneously on a PC display.

Figure 17A:
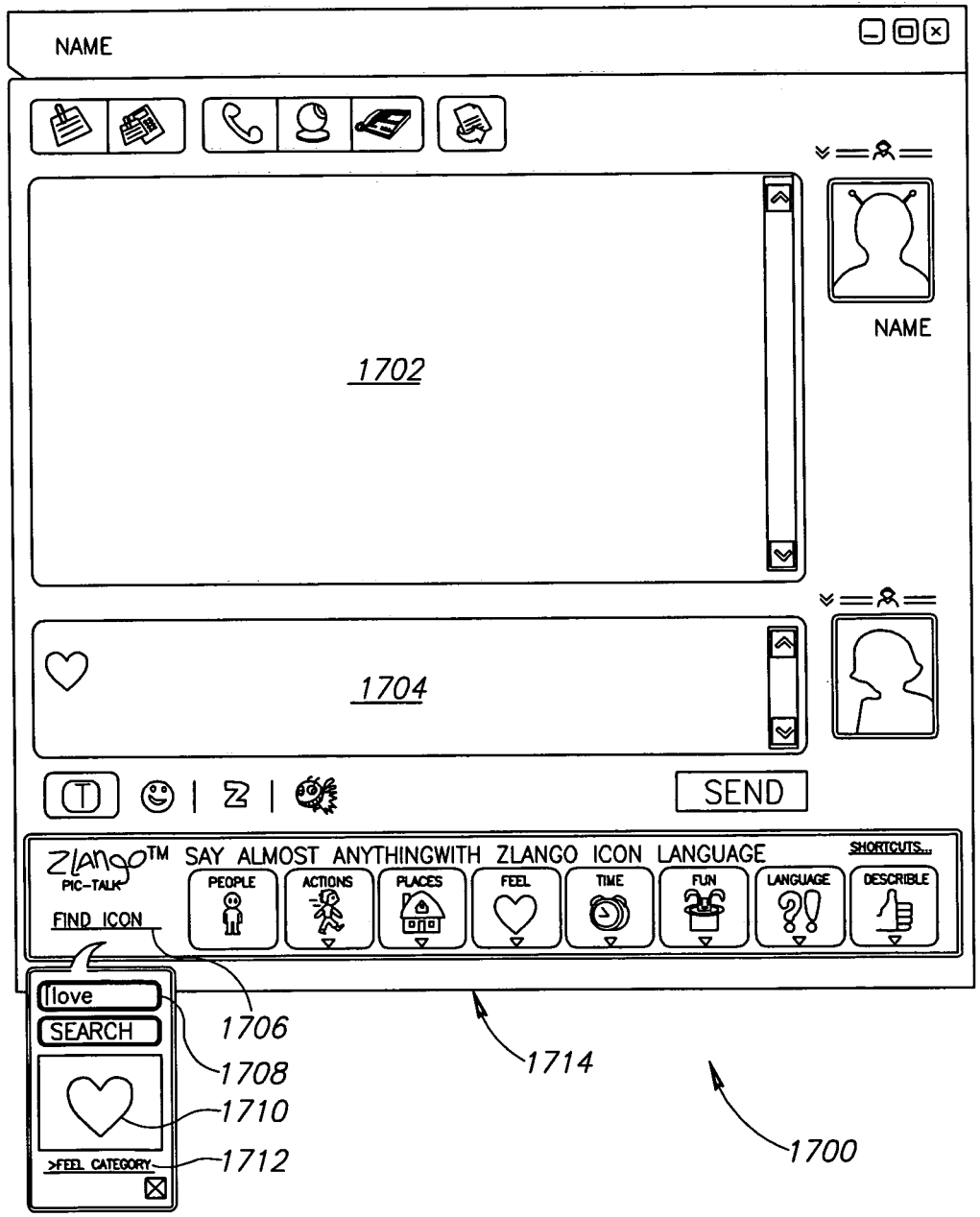
FIGS. 17A-17B illustrate exemplary interfaces for usage with an instant messaging application, in accordance with an exemplary embodiment of the invention.
Figure 17B:
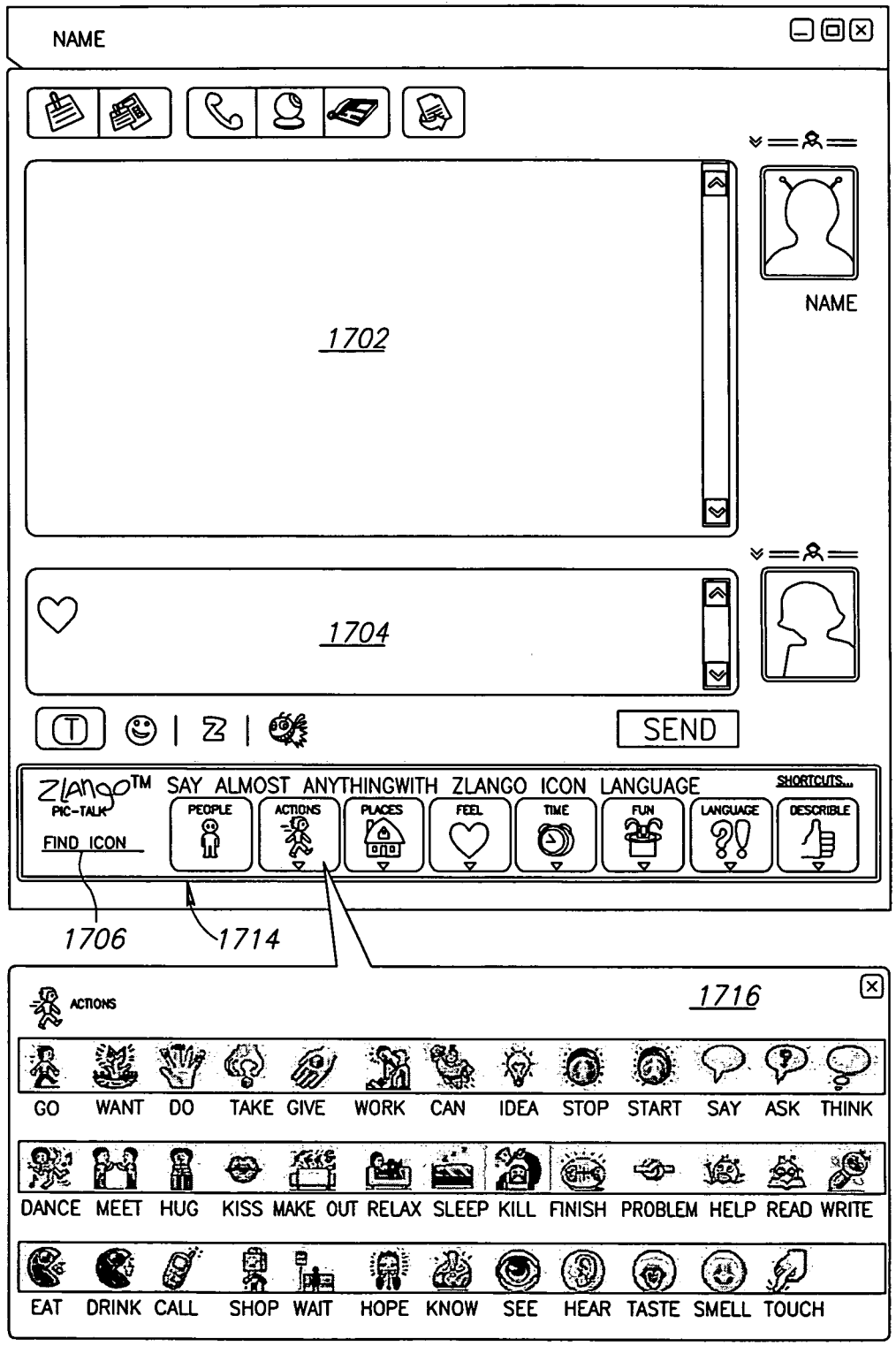

FIGS. 17A-17B illustrate exemplary interfaces for usage for icon entry on a PC computer, for example with an instant messaging application, in accordance with an exemplary embodiment of the invention.

In the example shown a window 1702 is provided for conversation and a window 1704 is provided for composing a new message, for example a mixed icon and text message.

Various functional buttons are shown as well, in particular (FIG. 17A), a search button 1706. When pressed, this button opens a search window including a text entry field 1708 for entering a name or a category of icon being searched for, a control 1712 for showing a category of a found icon and a graphical display 1710 of the found icon. Fixed category buttons 1714 are shown as well.

FIG. 17B shows the effect of selecting such a fixed category button 1714, in that a window 1716 is opened including all the icons in that category. It should be noted that in a PC computer 10, 20, 30 or more icons can be shown simultaneously, together with identifying text. Similarly, a rollover text display function in a PC computer can be easier to use than in a mobile device, due to the size and/or stability of the interface.

Not shown are, for example, optional template buttons, personal icon sets, themes, animation generation tools and displaying of icon name alternatives.

General

It is to be understood that the invention is not necessarily limited in its application to the particular details set forth in the description contained herein or illustrated in the drawings. The invention is capable of other embodiments and of being practiced and carried out in various ways. Hence, it is to be understood that the phraseology and terminology employed herein are for the purpose of description and should not be regarded as necessarily limiting.

It will also be understood that the invention further contemplates a machine-readable memory and/or circuitry and/or firmware tangibly embodying a program of instructions executable by a machine for executing the method of the invention. Also contemplated is a suitably programmed general purpose machine.

Those skilled in the art will readily appreciate that various modifications and changes can be applied to the embodiments of the invention as hereinbefore described without departing from its scope, defined in and by the appended claims.

In the above detailed description, numerous specific details are set forth in order to provide a thorough understanding of the invention. However, it will be understood by those skilled in the art that the present invention may be practiced without these specific details. In other instances, well-known methods, procedures, components and circuits have not necessarily been described in detail so as not to obscure the present invention.

Unless specifically stated otherwise, as apparent from the above description, it is appreciated that throughout the specification discussions utilizing terms such as, "processing", "computing", "calculating", "determining", or the like, refer to the action and/or processes of a computer or computing system, or processor or similar electronic computing device, that manipulate and/or transform data represented as physical, such as electronic, quantities within the computing system's registers and/or memories into other data, similarly represented as physical quantities within the computing system's memories, registers or other such information storage, transmission or display devices. In some cases, such actions may be carried by a user, for example, deciding on an icon to insert.

The term 'mobile device' used in this patent specification should be expansively construed to cover any kind of mobile device with communications capabilities and includes cellular phones, two-way pagers, radio telephones, PDA, TV-remote control devices, DECT, and wireless information devices. There is a particular emphasis on some types of mobile devices, such as those with limited screen, memory and/or input abilities, in some embodiments of the invention. The term includes devices able to communicate using mobile radio such as GSM or UMTS and any other wireless communications standard, system and/or protocol, e.g. Bluetooth and WiFi. According to some embodiments of the present invention, the mobile device may communicate with another mobile device or with other devices (e.g. personal computers) via various networks such as, e.g. cellular networks, broadband networks, fixed line network, data communication networks (such as LAN and WAN) and Internet networks, and/or within various services (e.g. messaging services like SMS, MMS, instant messaging, IMS and others, mobile advertising and mobile-content service).

Embodiments of the present invention may use terms such as, processor, computer, apparatus, system, sub-system, module, unit, device (in single or plural form) for performing the operations herein. This may be specially constructed for the desired purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, magnetic-optical disks, read-only memories (ROMs), random access memories (RAMs), electrically programmable read-only memories (EPROMs), electrically erasable and programmable read only memories (EEPROMs), magnetic or optical cards, or any other type of media suitable for storing electronic instructions, and capable of being coupled to a computer system bus.

Where a single device is described, multiple devices may be provided. For example, a server can comprise multiple servers at a same or distributed locations, and operated by a same or different operators. Conversely, multiple components may be combined into a single component.

The processes/devices (or counterpart terms specified above) and displays presented herein are not necessarily inherently related to any particular computer or other apparatus. Various general purpose systems may be used with programs in accordance with the teachings herein, or it may prove convenient to construct a more specialized apparatus to perform the desired method. In addition, embodiments of the present invention are not described with reference to any particular programming language. It will be appreciated that a variety of programming languages may be used to implement the teachings of the inventions as described herein. Currently, particular languages are used for cellular telephones, but this should not be considered an essential limitation for all embodiments.

Where software is described as including components, it should be noted that components can be combined and/or implemented in various ways and single components may be broken apart, without leaving the spirit of some embodiments of the invention.

It should be understood that features and/or steps described with respect to one embodiment may be used with other embodiments and that not all embodiments of the invention have all of the features and/or steps shown in a particular figure or described with respect to one of the embodiments. Section heads are provided for ease of navigation and do not necessarily limit the disclosure therein to the subject of the section title.

It is noted that some of the above described embodiments may describe the best mode contemplated by the inventors and therefore may include structure, acts or details of structures and acts that may not be essential to the invention and which are described as examples. Structure and acts described herein are replaceable by equivalents which perform the same function, even if the structure or acts are different, as known in the art. Therefore, the scope of the invention is limited only by the elements and limitations as used in the claims. When used in the following claims, the terms "comprise", "include", "have" and their conjugates mean "including but not limited to".

The invention claimed is:

1. A method of remotely controlling an external device over a communications network using a personal communication device, comprising:

providing an external device for linking to a communications network;

activating on the personal communication device having a messaging user interface which allows a user to input both a textual segment and to select at least one icon from a series of icons, said textual segment and at least one icon are in a format compatible with a message service standard;

composing an iconic message using both said at least one icon and said textual segment from said messaging user interface;

transmitting said iconic message over said communications network from said personal communication device to instruct said external device which is located remotely from said personal communication device; and wherein a non-display function of said external device is automatically operated according to at least one instruction encoded by said iconic message from said personal communication device transmitted over said communications network.

2. A method according to claim 1, wherein transmitting comprises transmitting directly from said personal communication device to said external device.

3. A method according to claim 1, wherein said transmitting comprises transmitting to a mediator system.

4. A method according to claim 1, wherein said external device includes a non-display device operated, in response to said at least one instruction.

5. A method according to claim 1, wherein said iconic message comprises at least one icon and a number indicative of time.

6. A method according to claim 1, wherein said at least one instruction comprises an instruction associated with at least one icon of said processed iconic message.

7. A method according to claim 1, wherein said external device display images in response to said at least one instruction.

8. A method according to claim 1, wherein said external device comprises a visual display.

9. A method according to claim 1, wherein said external device comprises an audio display.

10. A method according to claim 1, wherein said external device comprises a worn display.

11. A method according to claim 1, wherein said external device comprises a networked site accessible by a plurality of personal communication devices.

12. A method according to claim 11, wherein said site comprises a web site.

13. A method according to claim 11, wherein said site comprises a WAP site.

14. A method according to claim 1 wherein said series of icons are selected from a theme that includes at least one of an icon, an animation, a sound, a background color, or any combination thereof.

15. A method according to claim 14 wherein said theme set includes any one or any combination of a set of icons, animations, sounds, and background colors.

16. A method according to claim 14, wherein said theme is editable by a user of said personal communication device.

17. A method according to claim 1 wherein said set of rules matches a background color of said displayed contents to said content of the iconic message.

18. A method according to claim 1 wherein said set of rules matches an animation in said displayed contents to said contents of the iconic message.

19. A method according to claim 1, wherein said iconic message is at least partly composed using voice input.

20. A method according to claim 1, wherein said iconic message is at least partly composed using at least one of handwriting and other manually input marks.

21. A method according to claim 1, wherein said non display function is a microwave operation function.

22. A method according to claim 1, wherein said non display function is an alarm clock.

23. A method of transmitting from a first communication device to a remote second communication device an iconic message over a communications network, comprising:

providing at least one icon from a series of icons and a textual segment as said iconic message to be transmitted from said first communication device to said second communication device in a format compatible with a message service standard, over said communications network; and, automatically including in said iconic message transmitted by said first communication device over said communications network a modifying mechanism for enabling said second communication device to automatically operate a non-display function of said second communication device based on a combination of said iconic message and said textual segment.

24. A method according to claim 23, adding said modifying mechanism to said iconic message prior to a sending of said iconic message.

25. A method according to claim 23, wherein said second communication device is a non-display device.

26. A method according to claim 23, wherein said second communication device is operated in response to an identification of another object in said iconic message.

27. A method according to claim 26, wherein said another object comprises an alphanumerical character.

28. A method according to claim 23, wherein said second communication device is operated to generate a behavior code according to said iconic message.

29. A method according to claim 23, comprising downloading to said second communication device a new visualization from a server based on said iconic message.

30. A method according to claim 23, wherein said series of icons forms part of an iconic language with fewer than 1000 symbols.

31. A method according to claim 23 wherein said modifying mechanism includes one or more hints.

32. A method according to claim 31 wherein said hints include one or more non-displayable symbol codes.

* * * * *